United States Patent [19]

Tabata et al.

[11] Patent Number: 5,527,233

[45] Date of Patent: Jun. 18, 1996

[54] HYDRAULIC CONTROL APPARATUS FOR CONTROLLING AN ENGAGING STATE OF A LOCK-UP CLUTCH OF AN AUTOMATIC TRANSMISSION

[75] Inventors: Atsushi Tabata, Okazaki; Yasuo Hojo, Nagoya; Masato Kaigawa, Toyota; Hiromichi Kimura, Okazaki; Katsumi Kono, Toyota; Ryoji Habuchi, Aichi-ken; Akira Fukatsu, Anjo; Masahiko Ando, Okazaki; Yoshihisa Yamamoto, Nishio; Mamoru Niimi, Anjo, all of Japan

[73] Assignees: Toyota Jidosha Kabushiki Kaisha, Toyota; Aisin Aw Co., Ltd., Anjo, both of Japan

[21] Appl. No.: 231,658

[22] Filed: Apr. 25, 1994

[30] Foreign Application Priority Data

Apr. 26, 1993 [JP] Japan ................................. 5-123430
Jun. 1, 1993 [JP] Japan ................................. 5-156081
Jul. 28, 1993 [JP] Japan ................................. 5-185991

[51] Int. Cl.⁶ .................................................. F16H 61/58
[52] U.S. Cl. .......................... 477/62; 477/906; 192/3.31
[58] Field of Search ............................ 192/3.31; 477/64, 477/906, 166, 168, 174, 175, 180, 62

[56] References Cited

U.S. PATENT DOCUMENTS

| | | |
|---|---|---|
| 4,428,259 | 1/1984 | Kubo et al. . |
| 4,428,467 | 1/1984 | Hiramatsu . |
| 4,441,385 | 4/1984 | Taga et al. ............................ 477/64 |
| 4,993,527 | 2/1991 | Benford et al. ....................... 477/62 |
| 5,010,991 | 4/1991 | Tsukamoto et al. .................. 192/3.3 |
| 5,067,603 | 11/1991 | Kato et al. ............................ 477/62 |
| 5,119,698 | 6/1992 | Sugaya et al. ........................ 477/49 |
| 5,154,100 | 10/1992 | Yamada et al. . |
| 5,186,294 | 2/1993 | Nitz et al. . |
| 5,251,734 | 10/1993 | Benford et al. ..................... 192/3.3 |
| 5,383,379 | 1/1995 | Niiyama ............................. 192/3.28 |

FOREIGN PATENT DOCUMENTS

| | | |
|---|---|---|
| 0370425 | 5/1990 | European Pat. Off. . |
| 0412711 | 2/1991 | European Pat. Off. . |
| 0533419 | 3/1993 | European Pat. Off. . |
| 2552188 | 3/1985 | France . |

*Primary Examiner*—Charles A. Marmor
*Assistant Examiner*—Sherry Estremsky
*Attorney, Agent, or Firm*—Oblon, Spivak, McClelland, Maier & Neustadt

[57] ABSTRACT

A hydraulic control apparatus for an automatic transmission of a motor vehicle, the transmission including a lock-up clutch, the apparatus including a lock-up clutch switching valve device which is operable for selectively placing the lock-up clutch in a fully released, a partially engaged, and a fully engaged state thereof; a hydraulic pressure producing device which produces a hydraulic pressure; an abnormality detecting device which detects an abnormality of at least one of the lock-up clutch and the lock-up clutch switching valve device; and a control device which, when the abnormality detecting device detects the abnormality, operates the hydraulic pressure producing device for one of (a) applying the hydraulic pressure, and (b) inhibiting the hydraulic pressure from being applied, to at least one of the lock-up clutch and the lock-up clutch switching valve device for forcibly placing the lock-up clutch in one of the fully released and fully engaged states thereof.

9 Claims, 29 Drawing Sheets

FIG. 3

|      | C0 | C1 | C2 | B0 | B1 | B2 | B3 | B4 | F0 | F1 | F2 |
|------|----|----|----|----|----|----|----|----|----|----|----|
| N    |    |    |    | ◌  |    |    |    |    |    |    |    |
| Rev  |    |    | ○  | ○  |    |    |    | ○  |    |    |    |
| 1st  | ○  | ○  |    |    |    |    |    | ●  | ○  |    | ○  |
| 2nd  | ●  | ○  |    |    |    |    | ○  |    | ○  |    |    |
| 3rd  | ○  | ○  |    |    | ●  | ○  |    |    | ○  | ○  |    |
| 4th  | ○  | ○  | ○  |    |    | △  |    |    | ○  |    |    |
| 5th  |    | ○  | ○  | ○  |    | △  |    |    |    |    |    |

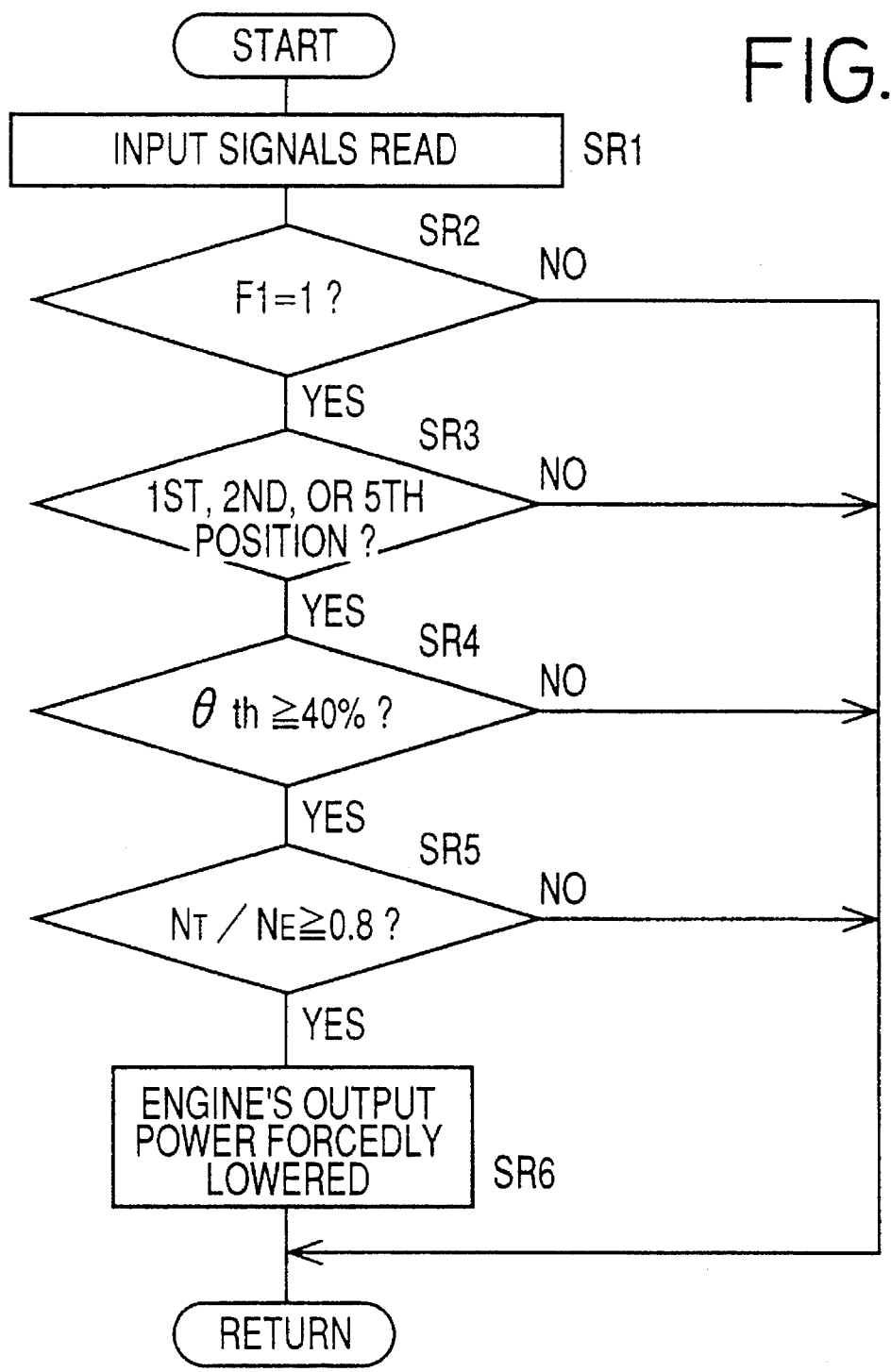

| POSITIONS | | SOLENOIDS | | | | | | CLUTCHES | | | BRAKES | | | | |
|---|---|---|---|---|---|---|---|---|---|---|---|---|---|---|---|
| | | No.1 (S1) | No.2 (S2) | No.3 (S3) | No.4 (S4) | SLU | SLN | C1 | C2 | C0 | B1 | B2 | B3 | B4 | B0 |
| P | | ○ | × | × | × | × | × | × | × | × | × | × | × | ○ | × |
| R | (V<20) | × | × | × | ○ | × | × | × | ○ | × | × | × | × | ○ | ○ |
| R | (V≥20) | ○ | ○ | × | ○ | × | × | × | ○ | × | × | × | × | × | × |
| N | | ○ | × | × | × | × | × | × | × | × | × | × | × | ○ | × |
| D·3·2·(L) | 1ST N.D.* | ○ | × | ○ | ○ | × | ○ | ○ | × | ○ | × | × | × | ○ | × |
| | 1ST E/G* | ○ | × | ○ | × | × | × | ○ | × | ○ | × | × | ○ | ○ | × |
| | 2ND N.D. | ○ | ○ | ○ | ○ | × | ○ | ○ | × | ○ | × | × | ○ | × | × |
| | 2ND E/G | × | ○ | ○ | × | × | × | ○ | × | ○ | × | × | ○ | × | × |
| | 3RD N.D. | × | ○ | ○ | ○ | ◎ | ○ | ○ | × | ○ | × | ○ | × | × | × |
| | 3RD E/G | × | ○ | ○ | × | ◎ | ○ | ○ | × | ○ | ○ | ○ | × | × | × |
| | 4TH | × | × | ○ | ○ | ◎ | × | ○ | ○ | ○ | × | ○ | × | × | × |
| | 5TH | × | × | × | ○ | ◎ | × | ○ | ○ | × | × | ○ | × | × | ○ |
| NOTES | | ○ ON ; L-UP* ON <br> × OFF ; L-UP* OFF <br> ◎ ON | | | | | | ENGAGED <br> RELEASED | | | | | | | |

FIG. 10

\* N.D. : NORMAL DRIVING
\* E/G : ENGINE BRAKE APPLIED
\*L-UP : LOCK-UP CLUTCH 24

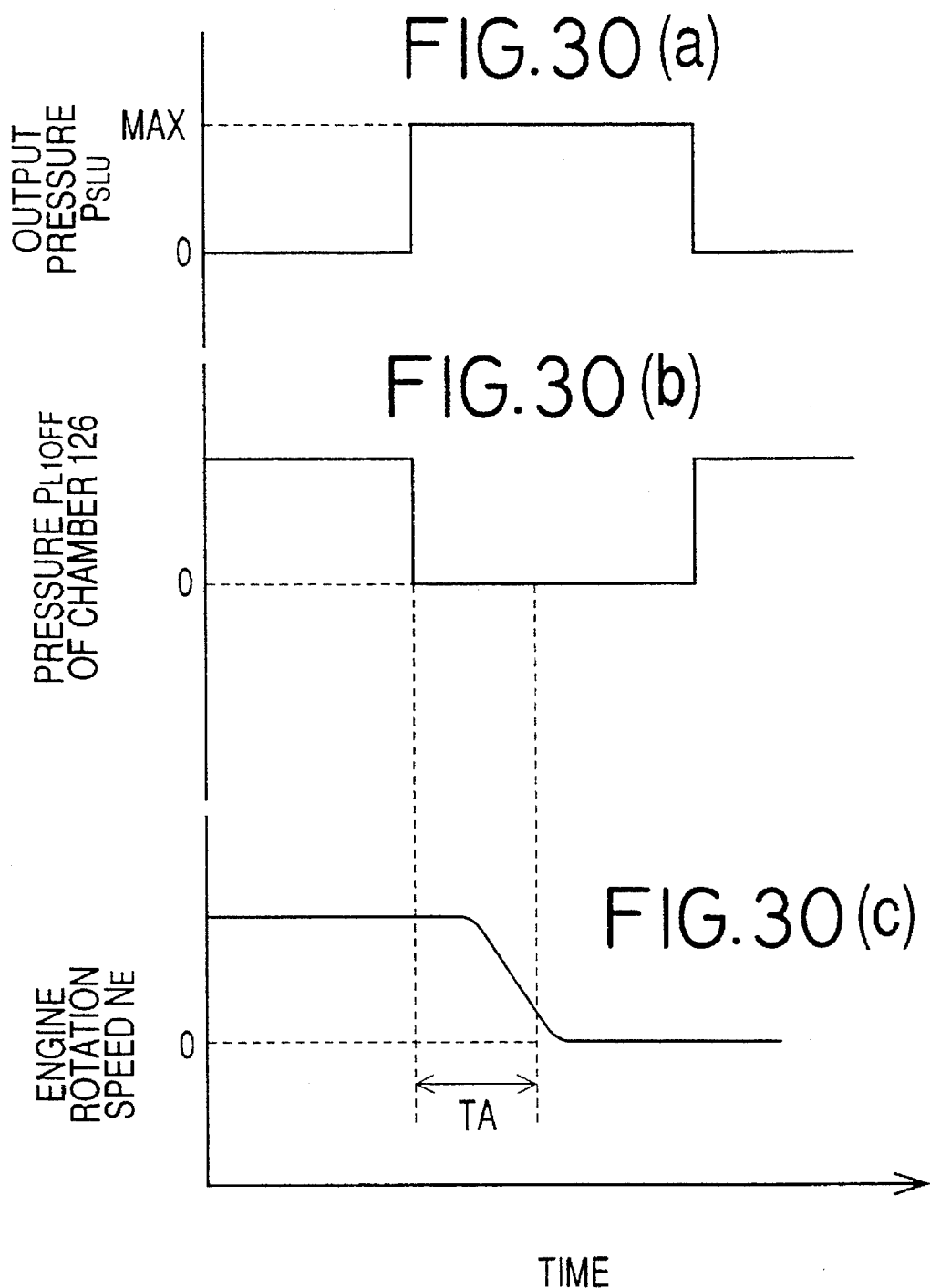

HYDRAULIC CONTROL APPARATUS FOR CONTROLLING AN ENGAGING STATE OF A LOCK-UP CLUTCH OF AN AUTOMATIC TRANSMISSION

BACKGROUND OF THE INVENTION

1. Field of the Invention

The present invention relates to a hydraulic control apparatus for an automatic transmission of a motor vehicle.

2. Related Art Statement

There is known a hydraulic control apparatus for an automatic transmission of a motor vehicle, the transmission including a lock-up clutch. U.S. Pat. No. 5,010,991 discloses an example of the hydraulic control apparatus. The disclosed apparatus includes a lock-up clutch switching valve device which is operable for selectively placing the lock-up clutch in a fully released, a partially engaged, and a fully engaged state thereof.

In the above-mentioned conventional hydraulic control apparatus, the lock-up clutch switching valve device includes (a) a lock-up relay valve which is switchable between a first or RELEASE position thereof where the lock-up relay valve permits the lock-up clutch to be placed in the fully released state thereof and a second or ENGAGE position thereof where the lock-up relay valve permits the lock-up clutch to be placed in one of the fully engaged and partially engaged states thereof; (b) a lock-up control valve which is operable for regulating a hydraulic pressure of a first or RELEASE fluid chamber of the lock-up clutch while the lock-up relay valve is switched to the ENGAGE position thereof, and thereby controlling the degree of engagement of the lock-up clutch, i.e., amount of slipping of the clutch; (c) a linear solenoid valve which is operable for producing an output pressure (i.e., "signal" pressure) to control the degree of engagement of the lock-up clutch; and (d) a solenoid-operated relay valve which is switchable between a first or CONTROL-PERMIT position thereof where the solenoid-operated relay valve permits the output pressure of the linear solenoid valve to be applied to the lock-up relay valve for switching the lock-up relay valve to the ENGAGE position thereof and also to the lock-up control valve for controlling the degree of engagement of the lock-up clutch, and a second or CONTROL-INHIBIT position thereof where the solenoid-operated relay valve inhibits the output pressure of the linear solenoid valve from being applied to the lock-up relay valve for switching the lock-up relay valve to the RELEASE position thereof and also from being applied to the lock-up control valve for placing the lock-up clutch in the fully released state thereof, the solenoid-operated relay valve being switched to the CONTROL-PERMIT position when the automatic transmission is operated in one of a plurality of prescribed speed positions of the transmission or a higher speed position. The hydraulic control apparatus additionally includes a control device which switches the solenoid-operated relay valve to the CONTROL-PERMIT position when the transmission is operated in the one or higher speed position thereof, for controlling the degree of engagement of the lock-up clutch or placing the lock-up clutch in the fully engaged state thereof.

However, in the conventional hydraulic control apparatus, the various valves (a) to (d) of the lock-up clutch switching valve device may suffer from abnormality because of, e.g., disorder of (c) the linear solenoid valve or (a) the lock-up relay valve. In that case, the lock-up clutch may erroneously be placed in the fully engaged or partially engaged state while the clutch should be placed in the fully released state. This leads to deteriorating the durability or life expectancy of the lock-up clutch.

SUMMARY OF THE INVENTION

It is therefore an object of the present invention to provide a hydraulic control apparatus for an automatic transmission of a motor vehicle, which apparatus effectively prevents the durability of the lock-up clutch from being lowered because of the occurrence of abnormality to the lock-up clutch or the lock-up clutch switching valve device of the apparatus.

The above object may be achieved according to a first aspect of the present invention, which provides a hydraulic control apparatus for an automatic transmission of a motor vehicle, the transmission including a lock-up clutch, the apparatus comprising a lock-up clutch switching valve device which is operable for selectively placing the lock-up clutch in a fully released, a partially engaged, and a fully engaged state thereof; a hydraulic pressure producing device which produces a hydraulic pressure; an abnormality detecting device which detects an abnormality of at least one of the lock-up clutch and the lock-up clutch switching valve device; and a control device which, when the abnormality detecting device detects the abnormality, operates the hydraulic pressure producing device for one of (a) applying the hydraulic pressure, and (b) inhibiting the hydraulic pressure from being applied, to at least one of the lock-up clutch and the lock-up clutch switching valve device for forcibly placing the lock-up clutch in one of the fully released and fully engaged states thereof.

In the hydraulic control apparatus constructed as described above, when the abnormality detecting device detects the abnormality, the control device operates the hydraulic pressure producing device for one of (a) applying the hydraulic pressure, and (b) inhibiting the hydraulic pressure from being applied, to at least one of the lock-up clutch and the lock-up clutch switching valve device for forcibly placing the lock-up clutch in one of the fully released and fully engaged states thereof. Therefore, the present hydraulic control apparatus effectively prevents the lock-up clutch from being placed in the partially-engaged state while the clutch should be placed in one of the fully released and fully engaged states. Thus, the present control apparatus has eliminated the problem that the durability of the lock-up clutch is deteriorated due to the occurrence of abnormality to the lock-up clutch or the lock-up clutch switching valve device.

According to a preferred feature of the first aspect of the invention, the abnormality detecting device comprises lock-up clutch error detecting means for detecting, as the abnormality, an operational error of the lock-up clutch. In this case, the lock-up clutch error detecting means may detect the operational error of the lock-up clutch by identifying that the lock-up clutch is placed in one of the fully engaged and partially engaged states thereof while the lock-up clutch switching valve device is operated for placing the lock-up clutch in the fully released state thereof. Alternatively, the lock-up clutch error detecting means may detect the operational error of the lock-up clutch by identifying that the lock-up clutch is placed in one of the fully released and partially engaged states thereof while the lock-up clutch switching valve device is operated for placing the lock-up clutch in the fully engaged state thereof.

According to another feature of the first aspect of the invention, the control device comprises first means for operating, when the lock-up clutch error detecting means detects the operational error of the lock-up clutch, the hydraulic pressure producing device for one of (a) applying the hydraulic pressure, and (b) inhibiting the hydraulic pressure from being applied, to the lock-up clutch switching valve device for forcibly switching the lock-up clutch switching valve device and thereby placing the lock-up clutch in the fully released state thereof.

According to yet another feature of the first aspect of the invention, the control device comprises second means for operating the hydraulic pressure producing device for one of (a) applying the hydraulic pressure, and (b) inhibiting the hydraulic pressure from being applied, to the lock-up clutch for forcibly placing the lock-up clutch in the fully released state thereof.

According to a further feature of the first aspect of the invention, the control device comprises third means for forcibly lowering an output power of an engine of the motor vehicle and thereby placing the lock-up clutch in the fully engaged state thereof.

According to another feature of the first aspect of the invention, the lock-up clutch switching valve device comprises a lock-up relay valve which is switchable between a first position thereof where the lock-up relay valve permits the lock-up clutch to be placed in the fully released state thereof and a second position thereof where the lock-up relay valve permits the lock-up clutch to be placed in one of the fully engaged and partially engaged states thereof, the abnormality detecting device comprising lock-up relay valve disorder detecting means for detecting, as the abnormality, a disorder of the lock-up relay valve by identifying that the lock-up relay valve is stuck to the second position thereof, the control device comprising fourth means for operating, when the lock-up relay valve disorder detecting means detects the disorder of the lock-up relay valve, the hydraulic pressure producing device for one of (a) applying the hydraulic pressure, and (b) inhibiting the hydraulic pressure from being applied, to the lock-up clutch for forcibly placing the lock-up clutch in the one of the fully released and fully engaged states thereof.

According to a second aspect of the present invention, there is provided a hydraulic control apparatus for an automatic transmission of a motor vehicle, the transmission including a lock-up clutch, the apparatus comprising a lock-up clutch switching valve device which is operable for selectively placing the lock-up clutch in an engaged and a released state thereof; a solenoid valve which is operable for producing a hydraulic pressure in one of a plurality of prescribed speed positions of the automatic transmission; a shift valve which is switchable from a first position thereof to a second position thereof for shifting the transmission from the one speed position thereof to another of the speed positions thereof; the hydraulic pressure of the solenoid valve being applied to the lock-up clutch switching valve device via the shift valve switched to the second position thereof; a lock-up clutch error detecting device which detects an operational error of the lock-up clutch; and a control device which, when the lock-up clutch error detecting device detects the operational error of the lock-up clutch, switches the shift valve to the second position thereof and operates the solenoid valve to apply the hydraulic pressure to the lock-up clutch switching valve device via the shift valve switched to the second position thereof for forcibly switching the lock-up clutch switching valve device and thereby placing the lock-up clutch in the released state thereof.

In the hydraulic control apparatus constructed as described above, the solenoid valve which primarily is used in one of the speed positions of the transmission, is secondarily utilized in another speed position for forcibly placing the lock-up clutch in the released state upon detection of an operational error of the clutch. Therefore, it is not necessary to newly employ an exclusive solenoid valve for achieving the same function. Thus, the present hydraulic control apparatus enjoys a reduced occupied space, a decreased weight, and a lower production cost, in addition to the same advantages as those with the above-described apparatus in accordance with the first aspect of the invention.

According to a third aspect of the present invention, there is provided a hydraulic control apparatus for an automatic transmission of a motor vehicle, the transmission including a lock-up clutch, the apparatus comprising a lock-up clutch switching valve which is operable for selectively placing the lock-up clutch in an engaged and a released state thereof; an accumulator back-pressure control solenoid valve which is operable for producing an accumulator back-pressure control pressure in one of a plurality of prescribed speed positions of the automatic transmission; a selector valve which is switchable from a first position thereof to a second position thereof when the transmission is shifted from the one speed position thereof to another of the speed positions thereof; the control pressure of the solenoid valve being applied to the lock-up clutch switching valve via the selector valve switched to the second position thereof; a lock-up clutch error detecting device which detects an operational error of the lock-up clutch by identifying that the lock-up clutch is placed in the engaged state thereof while the lock-up clutch switching valve is operated for placing the lock-up clutch in the released state thereof; and a control device which, when the lock-up clutch error detecting device detects the operational error of the lock-up clutch, shifts the transmission to the another speed position thereof, switches the selector valve to the second position thereof, and operates the solenoid valve to apply the output pressure to the lock-up clutch switching valve via the selector valve switched to the second position thereof for forcibly switching the lock-up clutch switching valve and thereby placing the lock-up clutch in the released state thereof.

In the hydraulic control apparatus constructed as described above, the solenoid valve which primarily is used for the accumulator back-pressure control in one of the speed positions of the transmission, is secondarily utilized in another speed position for forcibly placing the lock-up clutch in the released state upon detection of an operational error of the clutch. Therefore, it is not necessary to newly employ an exclusive solenoid valve for achieving the same function. Thus, the present hydraulic control apparatus enjoys a reduced occupied space, a decreased weight, and a lower production cost, in addition to the same advantages as those with the above-described apparatus in accordance with the first aspect of the invention. In this case, the selector valve may be supplied via an orifice with a pressurized working fluid which is used by a brake or clutch associated with the transmission, for establishing the highest speed position of the transmission, so that the working fluid may switch the selector valve to the second position thereof after the engaging of the brake or clutch has been completed.

According to a fourth aspect of the present invention, there is provided a hydraulic control apparatus for an automatic transmission of a motor vehicle, the transmission including a lock-up clutch, the apparatus comprising a lock-up clutch switching valve which is operable for selectively placing the lock-up clutch in an engaged and a released state thereof; a first solenoid valve which is operable for producing a first hydraulic pressure in one of a plurality of prescribed speed positions of the automatic transmission; a second solenoid valve which is operable for producing a second hydraulic pressure in another of the speed positions of the transmission; a shift valve which is switchable from a first position thereof to a second position thereof for shifting the transmission from the one speed position thereof to a higher one of the speed positions thereof; the first hydraulic pressure of the first solenoid valve being applied to the lock-up clutch switching valve via the shift valve switched to the second position thereof, the second hydraulic pressure of the second solenoid valve being applied to the lock-up clutch switching valve via the shift valve switched to the first position thereof; a lock-up clutch error detecting device which detects an operational error of the lock-up clutch by identifying that the lock-up clutch is placed in the engaged state thereof while the lock-up clutch switching valve is operated for placing the lock-up clutch in the released state thereof; and a control device which, when the lock-up clutch error detecting device detects the operational error of the lock-up clutch, operates the first solenoid-operated valve to apply the first hydraulic pressure to the lock-up clutch switching valve via the shift valve switched to the second position thereof in the higher speed position of the transmission, and operates the second solenoid valve to apply the second hydraulic pressure to the lock-up clutch switching valve via the shift valve switched to the first position thereof in the one speed position of the transmission, for forcibly switching the lock-up clutch switching valve and thereby placing the lock-up clutch in the released state thereof.

In the hydraulic control apparatus constructed as described above, the first and second solenoid valves which primarily are used in a first and a second speed position of the transmission, respectively, are secondarily utilized reversely in the second and first speed positions, respectively, for forcibly placing the lock-up clutch in the released state upon detection of an operational error of the clutch. Therefore, it is not necessary to newly employ an exclusive solenoid valve for achieving the same function. Thus, the present hydraulic control apparatus enjoys a reduced occupied space, a decreased weight, and a lower production cost, in addition to the same advantages as those with the above-described apparatus in accordance with the first aspect of the invention. Additionally, since the shift valve which is operable for shifting the transmission between the first and second speed positions, is utilized for applying the first or second hydraulic pressure of the first or second solenoid valve to the lock-up clutch switching valve, it is not necessary to shift up the transmission for forcibly placing the lock-up clutch in the released state.

According to a fifth aspect of the present invention, there is provided a hydraulic control apparatus for an automatic transmission of a motor vehicle, the transmission including a lock-up clutch, the apparatus comprising a lock-up clutch switching valve which is operable for selectively placing the lock-up clutch in an engaged and a released state thereof; a switching pressure producing device which produces a switching pressure; a selector valve which is switchable between a first position thereof where the selector valve permits one of (a) applying the switching pressure, and (b) inhibiting the switching pressure from being applied, to the lock-up clutch switching valve for placing the lock-up clutch in the released state thereof and a second position thereof where the selector valve permits the other of (a) applying the switching pressure, and (b) inhibiting the switching pressure from being applied, to the lock-up clutch switching valve for placing the lock-up clutch in the engaged state thereof, the selector valve being disposed in a fluid passage connecting the switching pressure producing device and the lock-up clutch switching valve; a lock-up clutch error detecting device which detects an operational error of the lock-up clutch by identifying that the lock-up clutch is placed in the engaged state thereof while the lock-up clutch switching valve is operated for placing the lock-up clutch in the released state thereof; and a control device which, when the lock-up clutch error detecting device detects the operational error of the lock-up clutch, switches the selector valve to the first position thereof for forcibly switching the lock-up clutch switching valve and thereby placing the lock-up clutch in the released state thereof.

In the hydraulic control apparatus constructed as described above, the selector valve is employed for forcibly placing the lock-up clutch in the released state upon detection of an operational error of the clutch. Thus, it is not necessary to newly employ an exclusive solenoid valve for achieving the same function. Additionally, the present hydraulic control apparatus enjoys the same advantages as those with the above-described apparatus in accordance with the first aspect of the invention. In this case, the selector valve may be supplied with an output pressure of a solenoid valve which is used in one of the speed positions of the transmission, so that the selector valve may be switched to the first position by the output pressure supplied from the solenoid valve operated in another of the speed positions of the transmission.

According to a sixth aspect of the present invention, there is provided a hydraulic control apparatus for an automatic transmission of a motor vehicle, the transmission including a lock-up clutch having a first and a second fluid chamber, the apparatus comprising a lock-up relay valve which is switchable between a first position where the lock-up relay valve permits a working fluid to be supplied to the first fluid chamber of the lock-up clutch and permits the lock-up clutch to be placed in a fully released state thereof and a second position where the lock-up relay valve permits the working fluid to be supplied to the second fluid chamber of the lock-up clutch and permits the lock-up clutch to be placed in one of a fully engaged and a partially engaged state thereof; a lock-up control valve which is operable for regulating a hydraulic pressure of the first fluid chamber of the lock-up clutch and thereby controlling a degree of the engagement of the lock-up clutch; a lock-up relay valve disorder detecting device which detects a disorder of the lock-up relay valve by identifying that the lock-up relay valve is stuck to the second position thereof; a vehicle speed sensor which detects a running speed of the motor vehicle; and a control device which, when the lock-up relay valve disorder detecting device detects the disorder of the lock-up relay valve and simultaneously when the vehicle running speed detected by the vehicle speed sensor is higher than a reference value, operates the lock-up control valve to decrease the hydraulic pressure of the first fluid chamber of the lock-up clutch for forcibly placing the lock-up clutch in the fully engaged state thereof.

In the hydraulic control apparatus constructed as described above, when the lock-up relay valve disorder detecting device detects the disorder of the lock-up relay valve and simultaneously when the vehicle running speed detected by the vehicle speed sensor is higher than a reference value, the control device operates the lock-up control valve to decrease the hydraulic pressure of the first fluid chamber of the lock-up clutch for forcibly placing the lock-up clutch in the fully engaged state thereof. Therefore, the present hydraulic control apparatus enjoys the same advantages as those with the above-described apparatus in accordance with the first aspect of the invention. When the vehicle running speed detected by said vehicle speed sensor is not higher than the reference value, the control device may operate the lock-up control valve to increase the hydraulic pressure of the first fluid chamber of the lock-up clutch for forcibly placing the lock-up clutch in one of the fully released and partially engaged states thereof. In the latter case, the motor vehicle can be driven normally.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings in which:

FIG. 3 is a view of a table representing the relationship between the positions of the automatic transmission of FIG. 2 and the combinations of engaged or released states of the clutches and brakes employed;

FIG. 9 is a flow chart representing another control routine carried out by the transmission control device of the control apparatus of FIG. 1;

FIG. 10 is a table corresponding to the table of FIG. 3, for use in a hydraulic control apparatus as a second embodiment of the invention;

FIG. 30 is a time chart explaining the operation carried out at Step SS506 of FIG. 29.

DETAILED DESCRIPTION OF THE PREFERRED EMBODIMENTS

Figure 1:
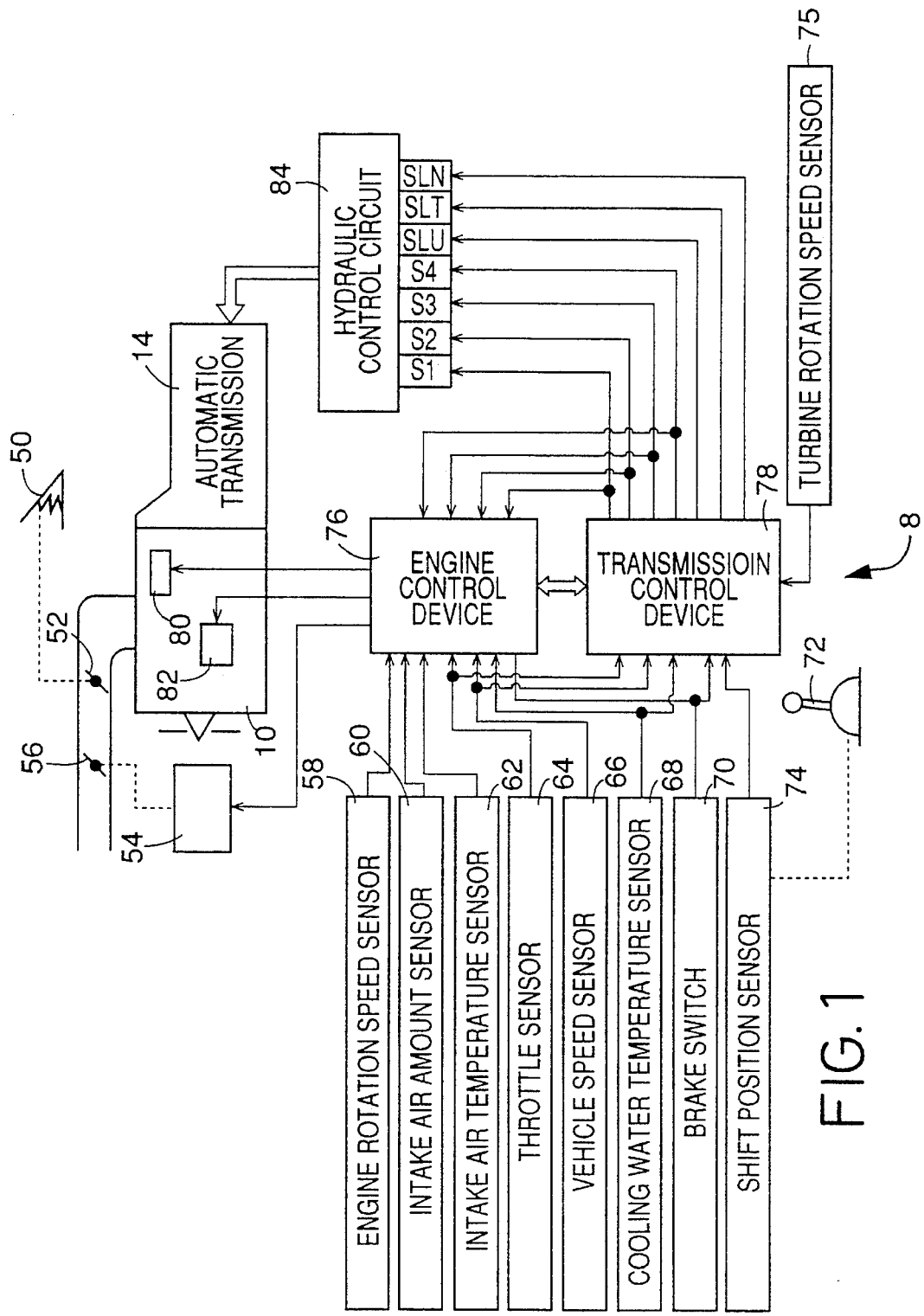
FIG. 1 is a diagrammatic view of an electronic arrangement of a hydraulic control apparatus as a first embodiment of the present invention.

Referring first to FIG. 1, there is shown a hydraulic control apparatus 8 for an automatic transmission 14 of a motor vehicle, to which the present invention is applied.

Figure 2:
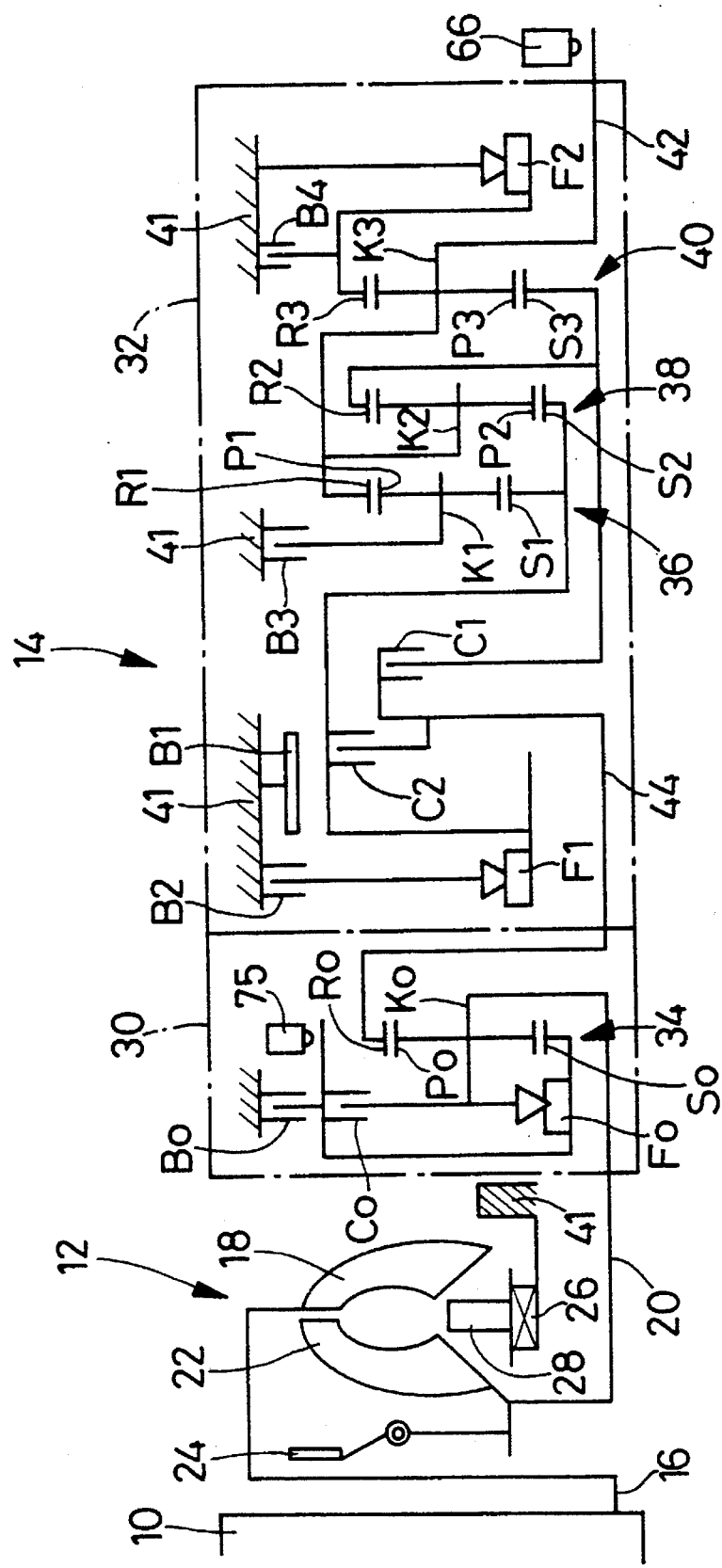
FIG. 2 is a view of the skeleton of an automatic transmission of a motor vehicle which is controlled by the hydraulic control apparatus of FIG. 1 to carry out shifting up and down among various positions.

FIG. 2 shows the skeleton of the automatic transmission 14. The output power of an engine 10 is input via a torque converter 12 to the transmission 14, and the power is transmitted via a differential gear device and an axle (both not shown) to drive wheels of the motor vehicle.

The torque converter 12 includes: a pump impeller 18 connected to a crank shaft 16 of the engine 10; a turbine runner 22 connected to an input shaft 20 of the transmission 14; a lock-up clutch 24 for directly connecting the pump impeller 18 and the turbine runner 22; and a stator 28 which is inhibited by a one-way clutch 26 from rotating in one of opposite directions, i.e., is allowed to rotate only in the other direction.

The automatic transmission 14 has: a first gear device 30 which selectively establishes a high and a low drive position; and a second gear device 32 which selectively establishes one reverse drive position and four forward drive positions. The first gear device 30 includes: an HL (high and low) planetary gear set which has a sun gear So, a ring gear Ro, a carrier Ko, and a planetary gear Po rotatably supported by the carrier Ko and engaged with the sun gear So and ring gear Ro; a clutch Co and a one-way clutch Fo each provided between the sun gear So and carrier Ko; and a brake Bo provided between the sun gear So and a housing 41.

The second gear device 32 includes: a first planetary gear set 36 which has a sun gear S1, a ring gear R1, a carrier K1, and a planetary gear P1 rotatably supported by the carrier K1 and engaged with the sun gear S1 and ring gear R1; a second planetary gear set 38 which has a sun gear S2, a ring gear R2, a carrier K2, and a planetary gear P2 rotatably supported by the carrier K2 and engaged with the sun gear S2 and ring gear R2; and a third planetary gear set 40 which has a sun gear S3, a ring gear R3, a carrier K3, and a planetary gear P3 rotatably supported by the carrier K3 and engaged with the sun gear S3 and ring gear R3.

The sun gears S1 and S2 are integrally connected to each other; the ring gear R1, carrier K2, and carrier K3 are integrally connected to one other; and the carrier K3 is connected to an output shaft 42 of the transmission 14. The ring gear R2 and sun gear S3 are integrally connected to each other. A clutch C1 is provided between the integrally connected ring gear and sun gear R2, S3 and an intermediate shaft 44; and a clutch C2 is provided between the integrally connected sun gears S1, S2 and the intermediate shaft 44. A band-type brake B1 for preventing rotation of the sun gears S1, S2 is fixed to the housing 41. Between the integrally connected sun gears S1, S2 and the housing 41, there are provided a one-way clutch F1 and a brake B2 in parallel with each other. The one-way clutch F1 is placed in an engaged state when the sun gears S1, S2 are rotated in the reverse direction opposite to the direction of rotation of the input shaft 20.

A brake B3 is provided between the carrier K1 and the housing 41; and a brake B4 and a one-way clutch F2 are provided between the ring gear R3 and the housing 41. The one-way clutch F2 is placed in an engaged state when the ring gear R3 is rotated in the reverse direction opposite to the direction of rotation of the input shaft 20.

In the present embodiment, the automatic transmission 14 is selectively operated in one of a single reverse drive position ("Rev") and five forward drive positions ("1st", "2nd", "3rd", "4th", and "5th" positions) according to the table shown in FIG. 3 in which the symbol "N" represents a neutral position. In the table of FIG. 3, the symbol "○" (white circle) represents an engaged state; the symbol "●" (black circle) represents an engaged state upon application of engine brake to the vehicle; the symbol "△" (white triangle) represents an engaged state in which, however, no torque is transmitted; and the blank (no indication) represents a released state. As can be seen from the table, the brake B3 is placed in the engaged state when the first-speed ("1st") position is shifted up to the second-speed ("2nd") position and the same is placed in the released state when the 2nd position is shifted up to the third-speed ("3rd") position. Meanwhile, the brake B2 is placed in the engaged state when the 2nd position is shifted up to the 3rd position. Thus, at the time of shifting up from the 2nd position to the 3rd position, the releasing of brake B3 and the engaging of brake B2 simultaneously take place (this is so-called "clutch-to-clutch" control).

Referring back to FIG. 1, a first and a second throttle valve 52, 56 are provided in the intake pipe of the engine 10. The first throttle valve 52 is operated by an accelerator pedal 50, and the second throttle valve 56 is operated by a throttle actuator 54. The present hydraulic control apparatus 8 includes: an engine rotation speed sensor 58 for detecting a rotation speed, $N_E$, of the engine 10; an engine intake air amount sensor 60 for detecting an intake air amount, Q, of the engine 10; an engine intake air temperature sensor 62 for detecting an intake air temperature, $TH_a$, of the engine 10; a throttle sensor 64 for detecting an opening angle, $\theta_{th}$, of the first throttle valve 52; a vehicle speed sensor 66 for detecting a running speed, V, of the motor vehicle based on, e.g., a rotation speed of the output shaft 42; an engine cooling water temperature sensor 68 for detecting a cooling water temperature, $TH_w$, of the engine 10; a brake switch 70 for detecting whether or not a brake pedal (not shown) is being operated; and a shift position sensor 74 for detecting which position, $P_{sh}$, is currently being selected by a shift lever 72. The engine rotation speed sensor 58, engine intake air amount sensor 60, and engine intake air temperature sensor 62 supply respective electric signals indicative of the detected engine rotation speed $N_E$, engine intake air amount Q, and engine intake air temperature $TH_a$, each to an electronic engine control device 76. The throttle sensor 64, vehicle speed sensor 66, engine cooling water temperature sensor 68, and brake switch 70 supply respective electric signals indicative of the detected first throttle valve opening angle $\theta_{th}$, vehicle running speed V, engine cooling water temperature $TH_w$, and operation or non-operation, BK, of the brake pedal, each to the engine control device 76 and an electronic transmission control device 78. The shift position sensor 74 supplies an electric signal indicative of the detected shift lever position $P_{sh}$, to the transmission control device 78. Further, the hydraulic control apparatus 8 includes a turbine rotation speed sensor 75 for detecting a rotation speed, $N_T$, of the turbine runner 22 of the torque converter 12. The turbine rotation speed sensor 75 supplies an electric signal indicative of the detected turbine rotation speed $N_T$, to the transmission control device 78. However, the transmission control device 78 can obtain the information about the engine rotation speed $N_E$, intake air amount Q, and intake air temperature $TH_a$, as needed, from the engine control device 76 as shown in FIG. 1.

The engine control device 76 is constituted by a so-called microcomputer including a central processing unit (CPU), a random access memory (RAM), a read only memory (ROM), and an input and output (I/O) interface. The CPU of the engine control device 76 processes input signals according to the control programs pre-stored in the ROM by utilizing the temporary-storage function of the RAM, for carrying out various engine control operations. For example, the control device 76 supplies respective control signals to a fuel injection valve 80 for regulating the amount of injection of fuel into the intake pipe of the engine 10, to an igniter 82 for controlling the timing of ignition of the fuel, to a by-pass valve (not shown) for controlling the idling speed of the engine 10, and to the throttle actuator 54 for controlling the opening angle of the second throttle valve 56, i.e. for traction control.

Like the engine control device 76, the transmission control device 78 is constituted by a so-called microcomputer including a CPU, a RAM, a ROM, and an I/O interface. The CPU of the transmission control device 78 processes input signals according to the control programs pre-stored in the ROM by utilizing the temporary-storage function of the RAM, for carrying out various transmission control operations, i.e., operating various ON/OFF solenoid valves, S1, S2, S3, S4, and linear solenoid valves, SLT, SLN, SLU, of a hydraulic control circuit 84. For example, the control device.78 operates the linear solenoid valve SLT for producing an output pressure, $P_{SLT}$, corresponding to the opening angle $\theta_{th}$ of the first throttle valve 52; operates the linear solenoid valve SLN for producing an output pressure, $P_{SLN}$, to control the back pressures of accumulators (not shown) associated with the automatic transmission 14; and operates the linear solenoid valve SLU for producing an output pressure, $P_{SLU}$, to control the amount of slipping of the lock-up clutch 24, i.e., degree of engagement of the clutch 24 (described in detail later).

The transmission control device 78 selects an appropriate one of the various shift positions of the automatic transmission 14 and an appropriate degree of engagement of the lock-up clutch 24, according to a set of shift patterns (FIG. 7) pre-stored in the ROM, based on the current first throttle valve opening angle $\theta_{th}$ and vehicle running speed V, and operates the solenoid valves S1, S2, S3 for establishing the selected shift position of the transmission 14 and the selected engagement degree of the lock-up clutch 24. Meanwhile, the control device 78 operates the solenoid valve S4 when the engine brake is applied to the vehicle.

The lock-up clutch 24 is placed in a fully released state when the automatic transmission 14 is operated in the 1st or 2nd position, and the same 24 is placed in a fully engaged state when the transmission 14 is operated in the 5th position. When the transmission is operated in the 3rd or 4th position, the lock-up clutch 24 is selectively placed, by the hydraulic control circuit 84 or transmission control device 78, in an appropriate one of the fully released state, partially engaged or slipping state, and fully engaged state, based on the current first throttle valve opening angle $\theta_{th}$ and vehicle running speed V. If the control device 78 selects the slipping state of the lock-up clutch 24 as being appropriate for the current running conditions of the motor vehicle, the same 78 controls the hydraulic control circuit 84 for placing the lock-up clutch 24 in the slipping state, thereby absorbing the variation of rotation of the engine 10 and minimizing the loss of rotation of the torque converter 12.

Figure 4:
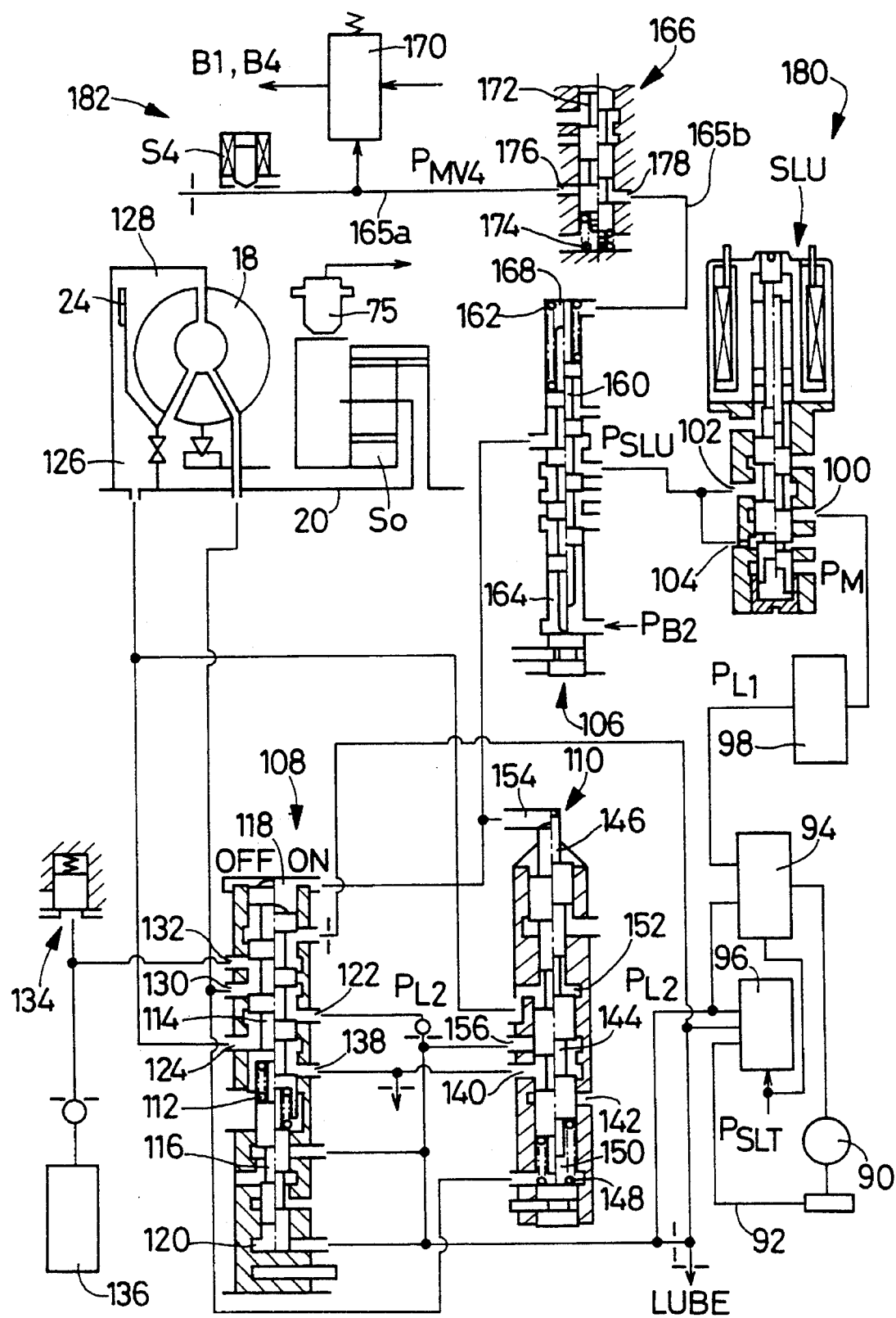
FIG. 4 is a view of a pertinent part of a hydraulic control circuit of the hydraulic control apparatus of FIG. 1.

FIG. 4 shows a part of the hydraulic control circuit 84 which part relates to the present, first embodiment. A fluid pump 90 is operated or rotated together with the pump impeller 18 by the crank shaft 16, so as to formulate a working fluid (e.g., oil) returned to a return passage 92 or a fluid reservoir (not shown), into a pressurized working fluid. A first pressure regulator valve 94 of a relief type formulates the working fluid supplied from the fluid pump 90, into a first line pressure, $P_{L1}$ corresponding to the output pressure $P_{SLT}$ (of the linear solenoid valve SLT) corresponding to the first throttle valve opening angle $\theta_{th}$. Thus, the first line pressure $P_{L1}$ corresponds to the opening angle $\theta_{th}$. A second pressure regulator valve 96 of a relief type formulates the working fluid flowing from the first valve 94, into a second line pressure, $P_{L2}$, which is lower than the first line pressure $P_{L1}$ and corresponds to the opening angle $\theta_{th}$. A solenoid-operated modulator valve 98 formulates the first line pressure $P_{L1}$ variable with the opening angle $\theta_{th}$, into a modulator pressure $P_M$ having a prescribed pressure level.

Figure 5:
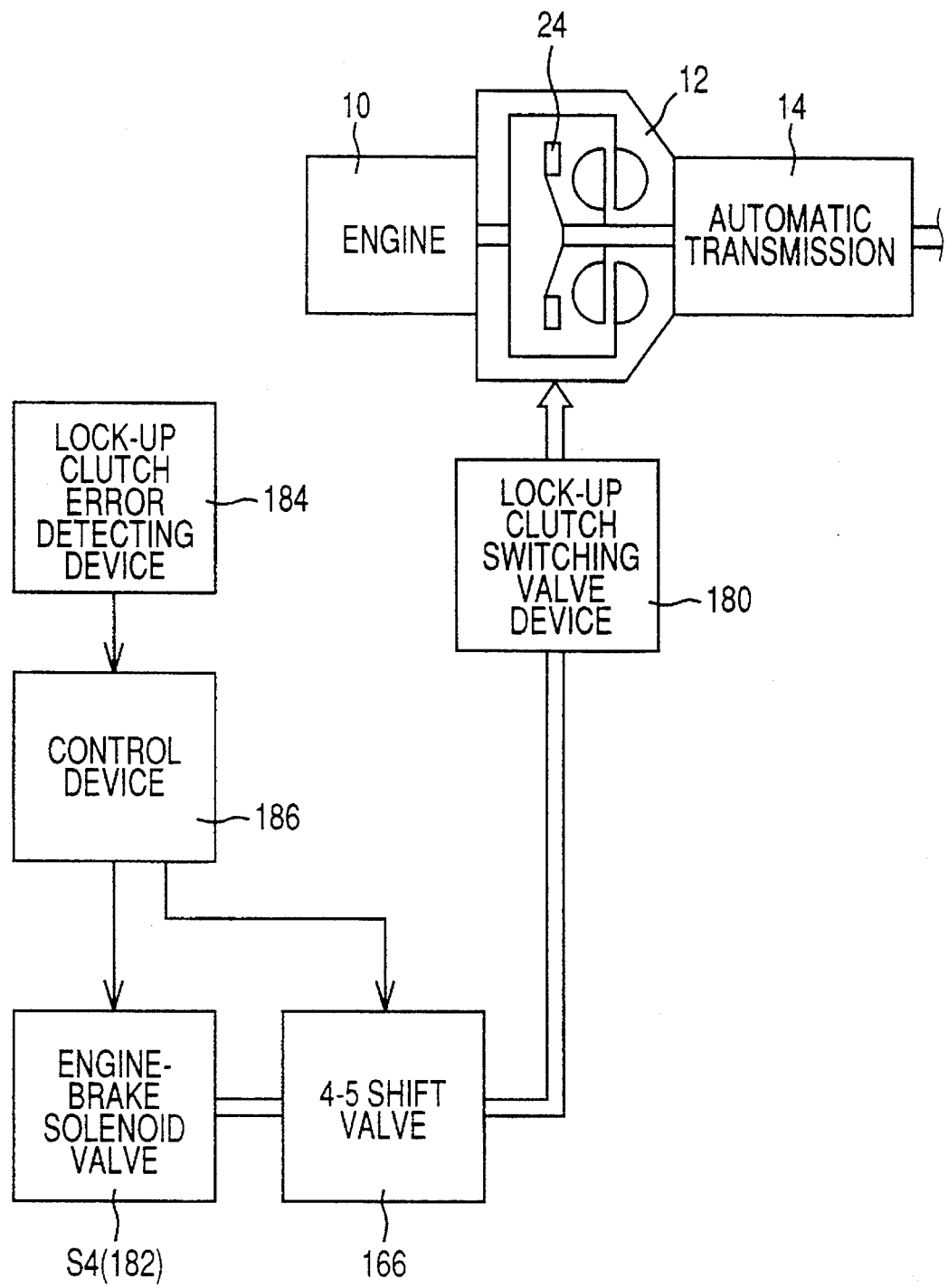
FIG. 5 is a diagrammatic view of important elements of the hydraulic control apparatus of FIG. 1.

The linear solenoid valve SLU has a supply port 100 receiving the modulator pressure $P_M$; an output port 102; and a feed-back port 104. The transmission control device 78 controls the valve SLU to formulate the received modulator pressure $P_M$ into the output pressure $P_{SLU}$, which is supplied via a solenoid-operated relay valve 106 to a lock-up relay valve 108 and a lock-up control valve 110. In the present embodiment, the linear solenoid valve SLU, solenoid-operated relay valve 106, lock-up relay valve 108, and lock-up control valve 110 cooperate with each other to serve as a lock-up clutch switching valve device 180 (FIG. 5).

The lock-up relay valve 108 has: a first and a second spool 114, 116 which are abutable on each other; a spring 112 provided between the first and second spools 114, 116; a fluid chamber 118 which is provided at one end of the first spool 114 and receives the output pressure $P_{SLU}$ to bias the first spool 114 toward an ENGAGE ("ON") position of the relay valve 108, i.e., position of the right-half first spool 114 as seen in FIG. 4; and a fluid chamber 120 which receives the second line pressure $P_{L2}$ to bias the first and second spools 114, 116 toward a RELEASE ("OFF") position of the relay valve 108, i.e., position of the left-half first spool 114 as seen in FIG. 4. While the first spool 114 is placed in the RELEASE position, the second line pressure $P_{L2}$ received at an input port 122 is supplied via a RELEASE port 124 to a RELEASE fluid chamber 126 of the torque converter 12 and simultaneously the working fluid in an ENGAGE fluid chamber 128 of the torque converter 12 is discharged via an ENGAGE port 130 and a discharge port 132 of the relay valve 108 to a cooler by-pass valve 134 or a fluid cooler 136. On the other hand, while the first spool 114 is placed in the ENGAGE position, the second line pressure $P_{L2}$ received at the input port 122 is supplied via the ENGAGE port 130 to the ENGAGE fluid chamber 128 of the torque converter 12 and simultaneously the working fluid in the RELEASE fluid chamber 126 is discharged via the RELEASE port 124 and a discharge port 138 of the relay valve 108 and subsequently via a control port 140 and a discharge port 142 of the lock-up control valve 110.

In the event that the output pressure $P_{SLU}$ is not higher than a prescribed pressure level, the first spool 114 is moved to the RELEASE position because of the thrust due to the second line pressure $P_{L2}$, so as to place the lock-up clutch 24 in the full-released state. On the other hand, in the event that the output pressure $P_{SLU}$ is greater than the prescribed pressure level, the first spool 114 is moved to the ENGAGE position because of the thrust due to the output pressure $P_{SLU}$, so as to place the lock-up clutch 24 in the full-engaged state or the partial-engaged (i.e., slipping) state. The full engagement, or degree of partial engagement (i.e., amount of slipping) of the lock-up clutch 24 is controlled by the lock-up control valve 110 which is operated according to the level or magnitude of the output pressure $P_{SLU}$ of the linear solenoid valve SLU.

While the lock-up relay valve 108 is placed in the ENGAGE position, the lock-up control valve 110 controls the slipping amount of the lock-up clutch 24 according to the output pressure $P_{SLU}$ of the linear solenoid valve SLU. The control valve 110 has: a spool 144; a plunger 146 which is abutable on the spool 144 for giving thrust to move the spool 144 to a DISCHARGE position of the control valve 110, i.e., position of the left-half spool 144 as seen in FIG. 4; a spring 148 for giving thrust to move the spool 144 to a SUPPLY position of the control valve 110, i.e., position of the right-half spool 144 as seen in FIG. 4; a fluid chamber 150 in which the spring 148 is accommodated and which receives the hydraulic pressure from the ENGAGE fluid chamber 128 of the torque converter 12 to bias the spool 144 toward the SUPPLY position; a fluid chamber 152 which is provided between the spool 144 and the plunger 146 and receives the hydraulic pressure from the RELEASE fluid chamber 126 of the torque converter 12 to bias the spool 144 toward the DISCHARGE position; and a fluid chamber 154 which is provided at one end of the plunger 146 and receives the output pressure $P_{SLU}$. While the spool 144 is placed in the DISCHARGE position, the control port 140 communicates with the discharge port 142, thereby increasing the engaging torque of the lock-up clutch 24. On the other hand, while the spool 144 is placed in the SUPPLY position, the control port 140 communicates with a supply port 156 receiving the second line pressure $P_{L2}$, so that the second line pressure $P_{L2}$ is supplied to the RELEASE fluid chamber 126 of the torque converter 12, thereby reducing the engaging torque of the lock-up clutch 24.

Thus, the lock-up control valve 110 controls the pressure difference between the hydraulic pressures of the ENGAGE and RELEASE fluid chambers 128, 126 of the torque converter 12, i.e., engaging torque of the lock-up clutch 24, according to the output pressure $P_{SLU}$ of the linear solenoid valve SLU. As the output pressure $P_{SLU}$ increases over the above-mentioned prescribed pressure level, the engaging torque of the lock-up clutch 24 increases, so that the lock-up clutch 24 is placed in the full-engaged state, i.e., fully engages a member connected to the crank shaft 16. For placing the lock-up clutch 24 in the full-released state, the linear solenoid valve SLU is operated by the transmission control valve 78 to decrease the output pressure $P_{SLU}$ down to below the prescribed pressure level. Meanwhile, for placing the lock-up clutch 24 in the full-engaged state, the linear solenoid valve SLU is operated to increase the output pressure $P_{SLU}$ up to a maximum or upper-limit pressure level. For placing the lock-up clutch 24 in the partial-engaged or slipping state, the linear solenoid valve SLU is operated so that the output pressure $P_{SLU}$ falls within the pressure range from the prescribed level to the maximum level.

The solenoid relay valve 106 is for supplying, upon application of an engaging pressure, $P_{B2}$, to the brake B2 of the automatic transmission 14, the output pressure $P_{SLU}$ of the linear solenoid valve SLU to the lock-up relay valve 108 and the lock-up control valve 110, thereby permitting the control of engagement of the lock-up clutch 24. The relay valve 106 has: a spool 160; a spring 162 which is provided at one end of the spool 160 and which biases the spool 160 toward a CONTROL-INHIBIT position of the relay valve 106, i.e., position of the left-half spool 160 as seen in FIG. 4; a fluid chamber 164 which is provided at the other end of the spool 160, i.e., remote from the spring 162 and which receives the engaging pressure $P_{B2}$ of the brake B2 to bias the spool 160 toward a CONTROL-PERMIT position of the relay valve 106, i.e., position of the right-half spool 160 as seen in FIG. 4; and a fluid chamber 168 in which the spring 162 is accommodated and which receives an output pressure, $P_{MV4}$, of the solenoid valve S4 via a fluid passage 165a, 4–5 shift valve 166, and a fluid passage 165b to bias the spool 160 toward the CONTROL-INHIBIT position. The solenoid valve S4 primarily or normally serves as an engine-brake solenoid valve 182 (FIG. 5) which is operable when the engine brake is applied to the vehicle. For supplying the brakes B1 and B4 with the first line pressure $P_{L1}$ (i.e., forward-drive range pressure), an engine-brake hydraulic switching valve 170 is operated according to the output pressure $P_{MV4}$ of the solenoid valve S4 (182).

The 4–5 shift valve 166 is operated such that, when the automatic transmission 14 is shifted from the 4th position to the 5th position according to a prescribed combination of operation or non-operation of the solenoid valves S1 to S3, a spool 172 is moved against a biasing force of a spring 174, to a 5TH-SPEED position of the valve 166, i.e., position of the right-half spool 172 as seen in FIG. 4. While the spool 172 is placed in the 5TH-SPEED position, an input port 176 receiving the output pressure $P_{MV4}$ of the valve S4 communicates with an output port 178 which always communicates with the fluid chamber 168 of the solenoid-operated relay valve 106. Therefore, in the event that the solenoid valve S4 is operated when the transmission 14 is being operated in the 5TH-SPEED position, the output pressure $P_{MV4}$ of the solenoid valve S4 is supplied via the fluid passage 165a, 4–5 speed shift valve 166, and fluid passage 165b to the fluid chamber 168 of the solenoid-operated relay valve 106. Thus, irrespective of whether the engaging pressure $P_{B2}$ is being applied to the brake B2, the solenoid-operated relay valve 106 is placed in the CONTROL-INHIBIT position, so that the lock-up clutch 24 is forcedly placed in the full-released state.

FIG. 5 shows a diagrammatic view of important elements of the hydraulic control apparatus 8 in the first embodiment. The hydraulic control apparatus 8 includes a lock-up clutch error detecting device 184 which detects an operational error of the lock-up clutch 24; and a control device 186 (i.e., transmission control device 78) which operates the engine-brake solenoid valve S4 (182) and switches the 4–5 shift valve 166 to the 5TH-SPEED position, upon detection of an operational error by the detecting device 184, so that the output pressure $P_{MV4}$ of the solenoid valve S4 is supplied, as a "signal" pressure, through the 4–5 shift valve 166 to the lock-up clutch switching valve device 180 to forcibly place the lock-up clutch 24 in the full-released state. Thus, the hydraulic control apparatus 8 is capable of forcibly placing the lock-up clutch switching valve device 180 in a clutch-releasing position to place the lock-up clutch 24 in the full-released state, upon detection of an operational error of the lock-up clutch 24 by the error detecting device 184.

Hereinafter, there will described the operation of the transmission control device 78 of the hydraulic pressure control apparatus 8 by reference to the flow chart of FIG. 6.

First, at Step SS1, the CPU of the control device 78 reads in input signals from the various sensors. Steps SS2 to SS5 serve as a part of the lock-up clutch error detecting device 184. At Steps SS2 to SS5, the control device 78 makes a positive judgment that an operational error has occurred to the lock-up clutch 24, as a result of detecting the slipping or full-engaged state of the clutch 24 while the control device 78 operates the hydraulic control circuit 84 to place the clutch 24 neither in the full-engaged nor slipping state but in the full-released state.

At Step SS2, the CPU of the control device 78 judges whether an ENGAGE signal is present to place the lock-up clutch 24 in the full-engaged state, i.e., whether the maximum level of the output pressure $P_{SLU}$ is present to cause the control port 140 and discharge port 142 of the lock-up control valve 110 to fully communicate with each other. If a positive judgment is made at Step SS2, the current control cycle is ended. On the other hand, if a negative judgment is made, the control proceeds with Step SS3 to judge whether a SLIPPING-CONTROL signal is present to place the lock-up clutch 24 in the partial-engaged or slipping state. If a positive judgment is made at Step SS3, the current control cycle is ended. Meanwhile, if a negative judgment is made, the control proceeds with Step SS4 to judge whether the first throttle valve opening angle $\theta_{th}$ is greater than a reference value, e.g., not smaller than 40%. In the case where a negative judgment is made at Step SS4, the current control cycle is ended. Meanwhile, in the case where a positive judgment is made, the control proceeds with Step SS5 to judge whether the rotation speed ratio, $N_T/N_E$, of the torque converter 12 is greater than a reference value, e.g., not smaller than 0.8 (the rotation speed $N_E$ of the engine 10 is obtained from the sensor 58 and the rotation speed $N_T$ of the turbine runner 22 is obtained from the sensor 75. In the event that a negative judgment is made at Step SS5, the current control cycle is ended. Meanwhile, in the event that a positive judgment is made, the control of the CPU goes to Step SS6 to set a flag, F1, to one (i.e., F1=1) indicating that an operational error has occurred to the lock-up clutch 24.

Step SS6 is followed by Step SS7 to judge whether the automatic transmission 14 is being operated in the 1st or 2nd position, based on the current combination of operation or non-operation of the solenoid valves S1, S2, S3. Since the engaging pressure $P_{B2}$ of the brake B2 is not produced when the transmission 14 is operated in the 1st or 2nd position, then the solenoid relay valve 106 is placed in the CONTROL-INHIBIT position. If a positive judgment is made at Step SS7, the control goes to Step SS8 to inhibit shifting up the current speed position of the transmission 14. Subsequently, the control goes to Step SS9 to reset the flag F1 to zero (i.e., F1=0). Thus, the current control cycle is ended, and the control of the CPU returns to Step SS1 to start a new control cycle.

On the other hand, if a negative judgment is made at Step SS7, the control of the CPU proceeds with Steps SS10 to SS12, which correspond to the previously-mentioned control device 186. Specifically, at Step SS10, the control device 78 (186) judges whether the automatic transmission 14 is being operated in the 3rd or 4th position, based on the current combination of operation or non-operation of the solenoid valves S1, S2, S3. The engine-brake solenoid valve S4 is used, as needed, when the transmission 14 is operated in the 3rd or 4th position. Therefore, if a positive judgment is made at Step SS10, the control goes to Step SS11 to shift up the current speed position of the transmission 14 to the 5th position, and subsequently to Step SS12 to operate the solenoid valve S4. On the other hand, if a negative judgment is made at Step SS10, the control skips Step SS11 and directly goes to Step SS12 to operate the solenoid valve S4.

If the solenoid valve S4 is operated when the transmission 14 is operated in the 5th position, the output pressure $P_{MV4}$ is produced from the solenoid valve S4 with the 4–5 shift valve 166 being placed in the 5TH-SPEED position (i.e., position of the right-half spool 172 as seen in FIG. 4). Consequently, the output pressure $P_{MV4}$ is applied via the fluid passage 165a, input and output ports 176, 178 of the 4–5 shift valve 166, and fluid passage 165b to the fluid chamber 168 of the solenoid-operated relay valve 106, so that the relay valve 106 is placed in the CONTROL-INHIBIT position. Then, the control of the control device 78 returns to Step SS1.

It merges from the foregoing description that, in the present, first embodiment, even if the output pressure $P_{SLU}$ erroneously is produced from the linear solenoid valve SLU where the control device 78 is producing the RELEASE signal to place the lock-up clutch 24 in the full-released state, the output pressure $P_{SLU}$ is interrupted by the relay valve 106 and therefore is not supplied to the lock-up relay valve 108 or lock-up control valve 110, so that the lock-up clutch 24 is securely placed in the full-released state. Accordingly, the reduction of durability or life expectancy of the lock-up clutch 24 is effectively prevented.

Additionally, in the present embodiment, the engine-brake solenoid valve S4 which normally is not used while the transmission 14 is operated in the 5th position where the lock-up clutch 24 is placed and held in the full-engaged state, is used for forcibly placing and holding the clutch 24 in the full-released state when, for example, the linear solenoid valve SLU has failed. For achieving this function, it is not necessary to newly employ an exclusive solenoid valve, which results in providing the hydraulic control apparatus 8 having a simpler structure and a smaller size than those of an apparatus which would incorporate such an exclusive solenoid valve.

Figure 7:
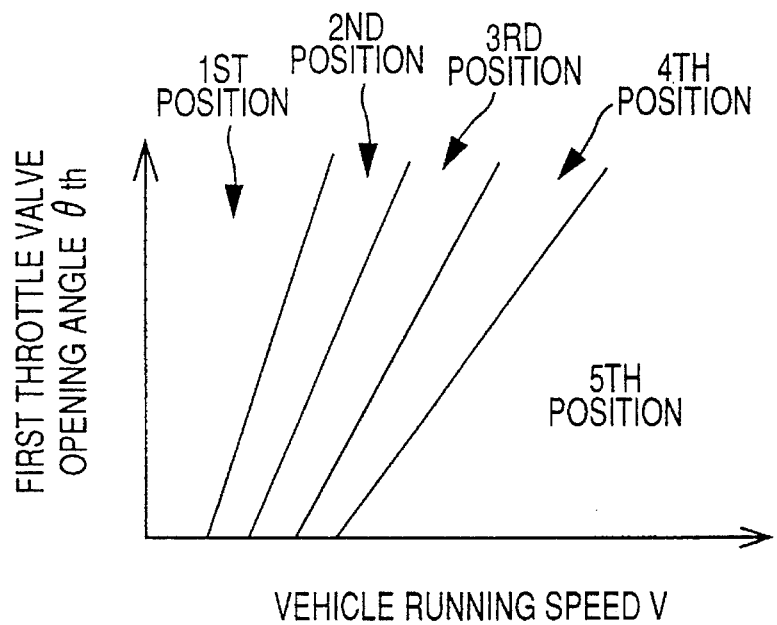
FIG. 7 is a view of a set of shift patterns utilized by the transmission control device for effecting the shift control of the automatic transmission of FIG. 2.
Figure 8:
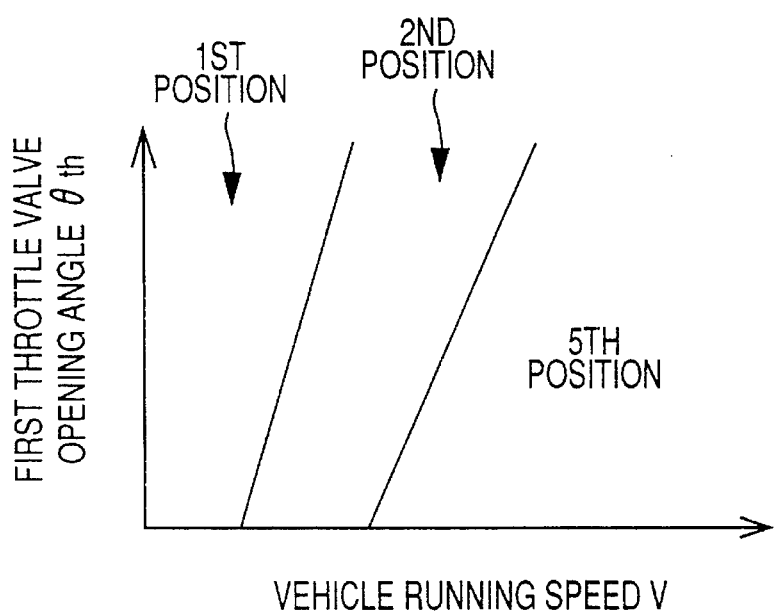
FIG. 8 is a view of another set of shift patterns used by the transmission control device for effecting a modified shift control of the transmission of FIG. 2.

FIG. 7 shows a set of shift patterns utilized by the transmission control device 78 for the shift control of the automatic transmission 14. While the flag F1 is set at F1=1, the control device 78 may utilize a second set of shift patterns as shown in FIG. 8. Since the respective ranges of the 1st and 2nd positions of the transmission 14 with respect to the vehicle running speed V are widened, the drivability of the motor vehicle is advantageously increased.

Figure 6:
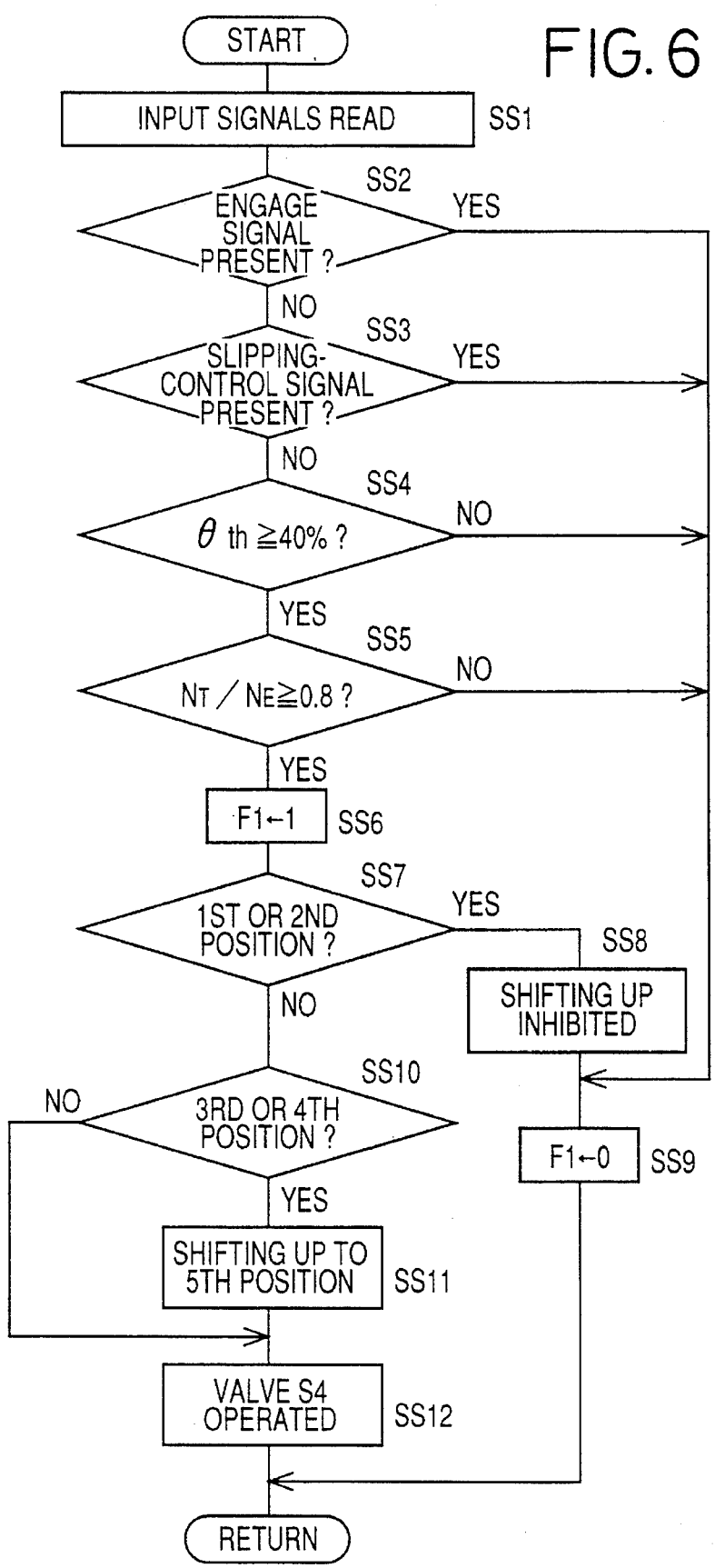
FIG. 6 is a flow chart representing a control routine carried out by a transmission control device of the control apparatus of FIG. 1.

The transmission control device 78 may carry out the routine represented by the flow chart of FIG. 9, in addition to the routine of FIG. 6.

At Step SR1, the CPU of the control device 78 reads in input signals, and subsequently at Step SR2 the CPU judges whether the flag F1 is placed at F=1. If a negative judgment is made at Step SR2, the current control cycle is ended. On the other hand, if a positive judgment is made, the control goes to Step SR3 to judge whether the automatic transmission 14 is being operated in one of the 1st, 2nd, and 5th positions, i.e., whether the lock-up clutch 24 is placed in one of the full-released and full-engaged states. If a negative judgment is made at Step SR3, the current control cycle is ended. Meanwhile, if a positive judgment is made, the control goes to Step SR4 to judge whether the first throttle valve opening angle $\theta_{th}$ is greater than a reference value, e.g., not smaller than 40%. In the case where a negative judgment is made at Step SR4, the current control cycle is ended. Meanwhile, in the case where a positive judgment is made, the control proceeds with Step SR5 to judge whether the rotation speed ratio, $N_T/N_E$, of the torque converter 12 is greater than a reference value, e.g., not smaller than 0.8. In the event that a negative judgment is made at Step SR5, the current control cycle is ended. Meanwhile, a positive judgment made at Step SR5 indicates that the operational error has not eliminated, i.e., remains with the lock-up clutch 24. Therefore, the control of the CPU goes to Step SR6 at which the control device 78 lowers the output power of the engine 10 by controlling the amount of injection of the fuel, opening angle of the second throttle valve 56, and/or timing of ignition of the fuel. According to the routine of FIG. 9, the lock-up clutch 24 is forcedly placed in the full-engaged state even if the slipping state of the lock-up clutch 24 remains after the solenoid-operated relay valve 106 has been placed in the CONTROL-INHIBIT position at Step SS12 of FIG. 6.

Although, in the first embodiment shown in FIGS. 1–9, the linear solenoid valve SLU, solenoid-operated relay valve 106, lock-up relay valve 108, and lock-up control valve 110 provide the lock-up clutch switching valve device 180, it is possible to provide the switching valve 180 by using the lock-up relay valve 108 and a solenoid valve for selectively placing the relay valve 108 in the ENGAGE ("ON") and RELEASE ("OFF") positions.

While in the first embodiment Steps SS2–SS5 of FIG. 6 are used as a part of the lock-up clutch error detecting device 184, it is possible to omit Step SS4. Likewise, Step SR4 may be omitted from the routine of FIG. 9.

In the first embodiment, the lock-up clutch error detecting device 184 detects, at Steps SS2–SS5 of FIG. 6, an operational error of the lock-up clutch 24 by identifying the slipping state of the clutch 24 based on the rotation speed ratio $N_T/N_E$ of the torque converter 12 while the control device 78 is producing the RELEASE signal to place the clutch 24 in the full-released state. However, it is possible to adapt the error detecting device 184 to detect an operational error of the lock-up clutch 24 by identifying the slipping state of the clutch 24 while the control device 78 is producing the ENGAGE signal to place the clutch 24 in the full-engaged state.

In the first embodiment, Step SR5 of FIG. 9 may be modified such that the CPU judges whether the rotation speed ratio $N_T/N_E$ of the torque converter 12 falls within, e.g., the range of 0.8 to 0.95 (i.e., $0.8<N_T/N_E<0.95$).

While in the first embodiment the engine-brake solenoid valve S4 is secondarily used for forcibly placing the lock-up clutch 24 in the full-released state upon detection of an operational error of the clutch 24, a different solenoid valve such as one of the valves S1–S3 may be used in place of the valve S4.

Although in the first embodiment the solenoid valve S4 is operated after the automatic transmission 14 has been shifted up to the 5th position, the valve S4 may be operated after the transmission 14 has been shifted down to the 1st or 2nd position.

Next, there will be described a second embodiment of the invention, by reference to FIGS. 10 through 13. The second embodiment also relates to the hydraulic control apparatus 8 of FIG. 1 for the automatic transmission 14 of FIG. 2. However, in the second embodiment, the control apparatus 8 controls the transmission 14 according to the table of FIG. 10, in place of the table of FIG. 3 used for the first embodiment. The transmission 14 is selectively operated in one of a single reverse drive position ("R") and five forward drive positions ("1st", "2nd", "3rd", "4th", and "5th" positions) according to the table of FIG. 10.

Figure 11:
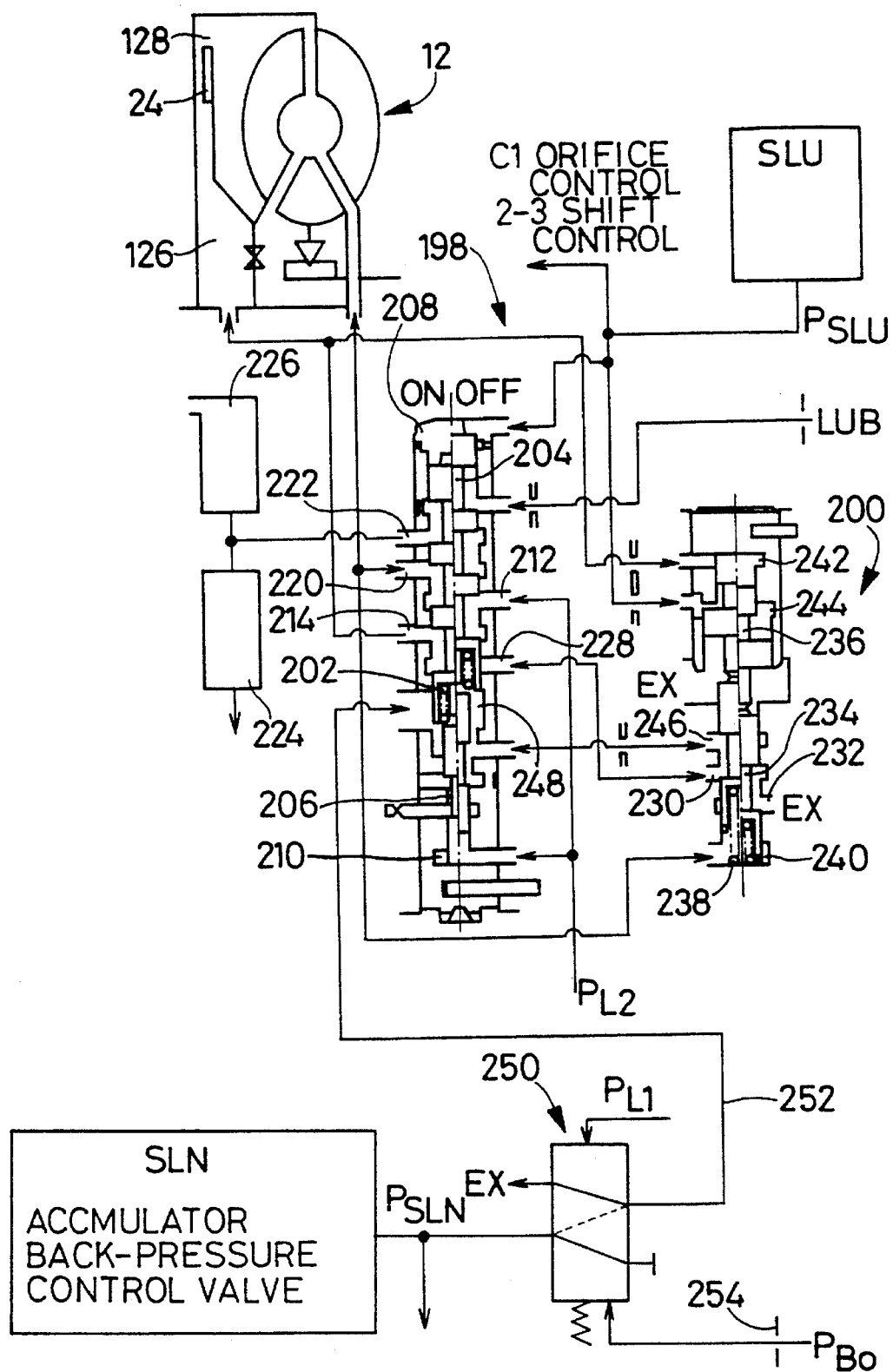
FIG. 11 is a view corresponding to FIG. 4, showing a pertinent part of a hydraulic control circuit of the hydraulic control apparatus as the second embodiment.

FIG. 11 shows a part of the hydraulic control circuit 84 (FIG. 1) of the hydraulic control apparatus 8 in accordance with the second embodiment. In FIG. 11, the linear solenoid valve SLU receives the modulator pressure $P_M$ (FIG. 4), and produces the output pressure $P_{SLU}$ corresponding to the control signal supplied from the electronic transmission control device 78 (FIG. 1) of the hydraulic control apparatus 8. The output pressure $P_{SLU}$ is supplied to a lock-up relay valve 198 and a lock-up control valve 200.

The lock-up relay valve 198 has: a first and a second spool 204, 206 which are abutable on each other; a spring 202 provided between the first and second spools 204, 206; a fluid chamber 208 which is provided at one end of the first spool 204 and receives the output pressure $P_{SLU}$ to bias the first spool 204 toward an ENGAGE ("ON") position of the relay valve 198, i.e., position of the left-half first spool 204 as seen in FIG. 11; and a fluid chamber 210 which receives the second line pressure $P_{L2}$ to bias the first spool 204 toward a RELEASE ("OFF") position of the relay valve 198, i.e., position of the right-half first spool 204 as seen in FIG. 11. While the first spool 204 is placed in the RELEASE position, the second line pressure $P_{L2}$ received at an input port 212 is supplied via a RELEASE port 214 to the RELEASE fluid chamber 126 of the torque converter 12 and simultaneously the working fluid in the ENGAGE fluid chamber 128 of the torque converter 12 is discharged via an ENGAGE port 220 and a discharge port 222 of the relay valve 198 to a cooler by-pass valve 224 or a fluid cooler 226. On the other hand, while the first spool 204 is placed in the ENGAGE position, the second line pressure $P_{L2}$ received at the input port 212 is supplied via the ENGAGE port 220 to the ENGAGE fluid chamber 128 of the torque converter 12 and simultaneously the working fluid in the RELEASE fluid chamber 126 is discharged via the RELEASE port 214 and a discharge port 228 of the relay valve 198 and subsequently via a control port 230 and a discharge port 232 of the lock-up control valve 200.

In the event that the output pressure $P_{SLU}$ is not higher than a prescribed pressure level, the first spool 204 is moved to the RELEASE position because of the thrust due to the second line pressure $P_{L2}$, so as to place the lock-up clutch 24 in the full-released state. On the other hand, in the event that the output pressure $P_{SLU}$ is greater than the prescribed pressure level, the first spool 204 is moved to the ENGAGE position because of the thrust due to the output pressure $P_{SLU}$, so as to place the lock-up clutch 24 in the full-engaged state or partial-engaged (i.e., slipping) state. The full engagement or degree of partial engagement (i.e., amount of slipping) of the lock-up clutch 24 is controlled by the lock-up control valve 200 which is operated according to the level or magnitude of the output pressure $P_{SLU}$ of the linear solenoid valve SLU.

While the lock-up relay valve 198 is placed in the ENGAGE position, the lock-up control valve 200 controls the slipping amount of the lock-up clutch 24 according to the output pressure $P_{SLU}$ of the linear solenoid valve SLU. The control valve 200 has: a spool 234; a plunger 236 which is abutable on the spool 234 for giving thrust to move the spool 234 to a DISCHARGE position of the control valve 200, i.e., position of the right-half spool 234 as seen in FIG. 11; a spring 238 for giving thrust to move the spool 234 to a SUPPLY position of the control valve 200, i.e., position of the left-half spool 234 as seen in FIG. 11; a fluid chamber 240 in which the spring 238 is accommodated and which receives the hydraulic pressure from the ENGAGE fluid chamber 128 of the torque converter 12 to bias the spool 234 toward the SUPPLY position; a fluid chamber 242 which is provided at one end of the plunger 236 and receives the hydraulic pressure from the RELEASE fluid chamber 126 of the torque converter 12 to bias the spool 234 toward the DISCHARGE position; and a fluid chamber 244 which is provided at an intermediate portion of the plunger 236 and receives the output pressure $P_{SLU}$. While the spool 234 is placed in the DISCHARGE position, the control port 230 communicates with the discharge port 232, thereby increasing the engaging torque of the lock-up clutch 24. On the other hand, while the spool 234 is placed in the SUPPLY position, the control port 230 communicates with a supply port 246 receiving the second line pressure $P_{L2}$, so that the second line pressure $P_{L2}$ is supplied to the RELEASE fluid chamber 126 of the torque converter 12, thereby decreasing the engaging torque of the lock-up clutch 24.

Thus, the lock-up control valve 200 controls the pressure difference between the hydraulic pressures of the ENGAGE and RELEASE fluid chambers 128, 126 of the torque converter 12, i.e., engaging torque of the lock-up clutch 24, according to the output pressure $P_{SLU}$ of the linear solenoid valve SLU. As the output pressure $P_{SLU}$ increases above the prescribed pressure level, the engaging torque of the lock-up clutch 24 increases, so that the lock-up clutch 24 is placed in the completely or fully engaged state. For placing the lock-up clutch 24 in the full-released state, the linear solenoid valve SLU is operated by the transmission control valve 78 to decrease the output pressure $P_{SLU}$ down to below the prescribed pressure level. Meanwhile, for placing the lock-up clutch 24 in the full-engaged state, the linear solenoid valve SLU is operated to increase the output pressure $P_{SLU}$ up to a maximum or upper-limit pressure level. For placing the lock-up clutch 24 in the partial-engaged or slipping state, the linear solenoid valve SLU is operated so that the output pressure $P_{SLU}$ falls within the pressure range from the prescribed pressure level to the maximum pressure level.

The fluid chamber 248 of the lock-up relay valve 198 in which the spring 202 is accommodated, is connected via a fluid passage 252 to a selector valve 250 which receives the output pressure $P_{SLN}$ of the linear solenoid valve SLN serving as an accumulator back-pressure control valve. The linear solenoid valve SLN primarily or normally serves for controlling the back pressures of the accumulators which control the respective engaging pressures of the brake Bo, clutch C2, brake B2, and brake B3 associated with the automatic transmission 14. In the second embodiment, the valve SLN is secondarily used for forcibly placing the lock-up clutch 24 in the full-released state, when the lock-up clutch switching valve device (SLU, 198, 200) has failed.

The selector valve 250 is normally placed in an open position indicated in solid line in FIG. 11, based on the first line pressure $P_{L1}$ corresponding to the first throttle valve opening angle $\theta_{th}$, so that the fluid passage 252 communicates with a drain indicated at "EX". Meanwhile, upon production of the engaging pressure, $P_{Bo}$, of the brake Bo to establish the 5th position of a forward-drive range ("D" range) of the automatic transmission 14, the pressure $P_{Bo}$ is supplied via an orifice 254 to the selector valve 250, so that the valve 250 is placed in a closed position indicated in broken line in FIG. 11. Consequently, the output pressure $P_{SLN}$ of the linear solenoid valve SLN can be supplied to the fluid chamber 248 of the lock-up relay valve 198, so that the first spool 204 of the valve 198 may be placed in the RELEASE ("OFF") position. Thus, the lock-up clutch 24 can forcedly be placed in the full-released state. The orifice 254 serves for raising the hydraulic pressure of the fluid chamber 248 after the engaging of the brake Bo has been completed, for the purpose of preventing the interference between the accumulator back-pressure control of the linear solenoid valve SLN and the forced releasing of the lock-up clutch 24.

Figure 12:
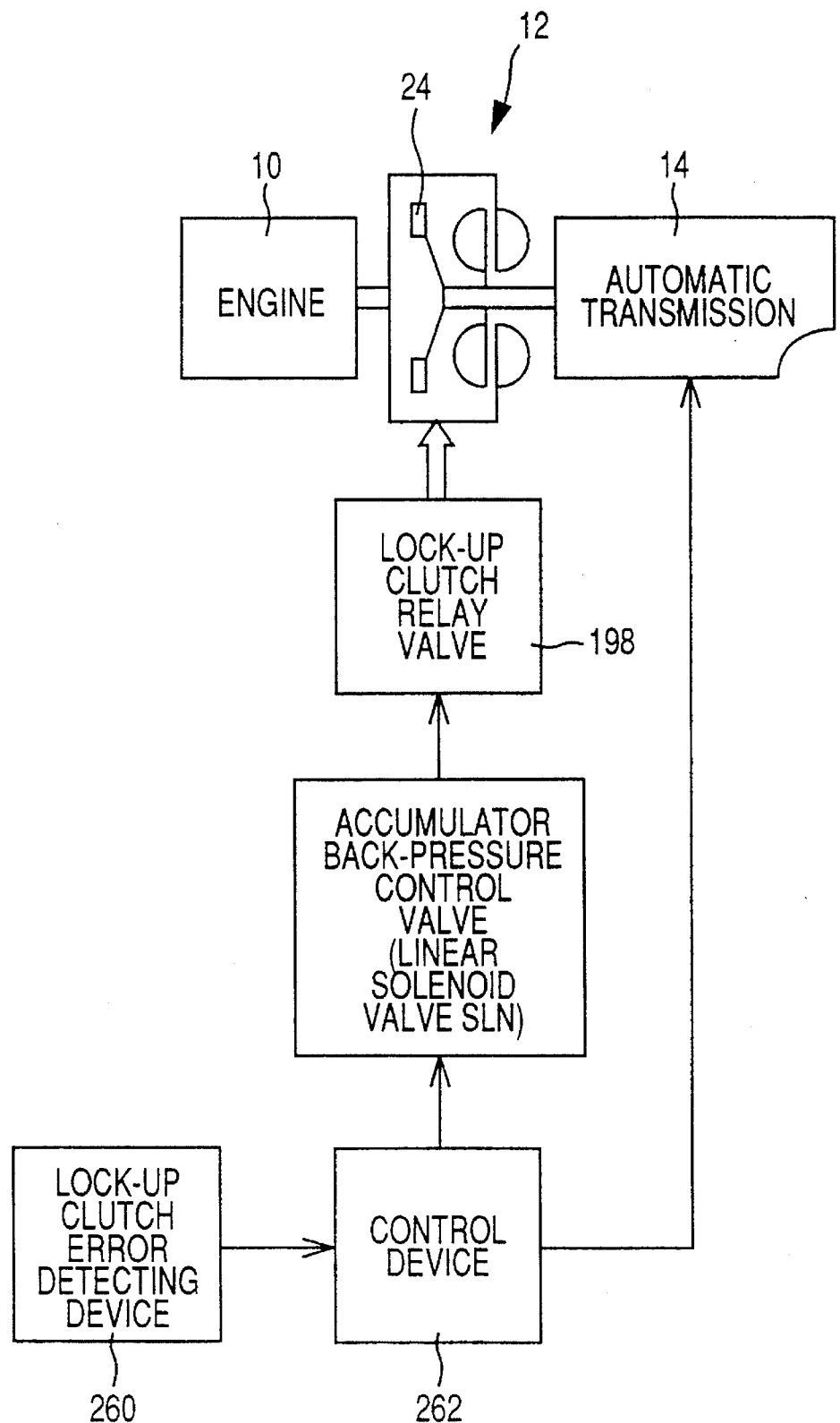
FIG. 12 is a diagrammatic view corresponding to FIG. 5, showing important elements of the hydraulic control apparatus as the second embodiment.

FIG. 12 shows a diagrammatic view of important elements of the hydraulic control apparatus 8 in accordance with the second embodiment. The control apparatus 8 includes a lock-up clutch error detecting device 260 which detects an operational error of the lock-up clutch 24; and a control device 262 (i.e., transmission control device 78) which operates the linear solenoid valve SLN serving as the accumulator back-pressure control valve and shifts the automatic transmission 14 up to the 5th position, upon detection of an operational error by the detecting device 260, so that the engaging pressure $P_{Bo}$ of the brake Bo is produced and used to place the lock-up relay valve 198 in the RELEASE position, thereby placing the lock-up clutch 24 in the full-released state. Thus, the control apparatus 8 is capable of forcibly placing the lock-up relay valve 198 in the RELEASE position, by utilizing the output pressure $P_{SLN}$ of the linear solenoid valve SLN, and thereby placing the lock-up clutch 24 in the full-released state, upon detection of an operational error of the lock-up clutch 24 by the error detecting device 260.

Figure 13:
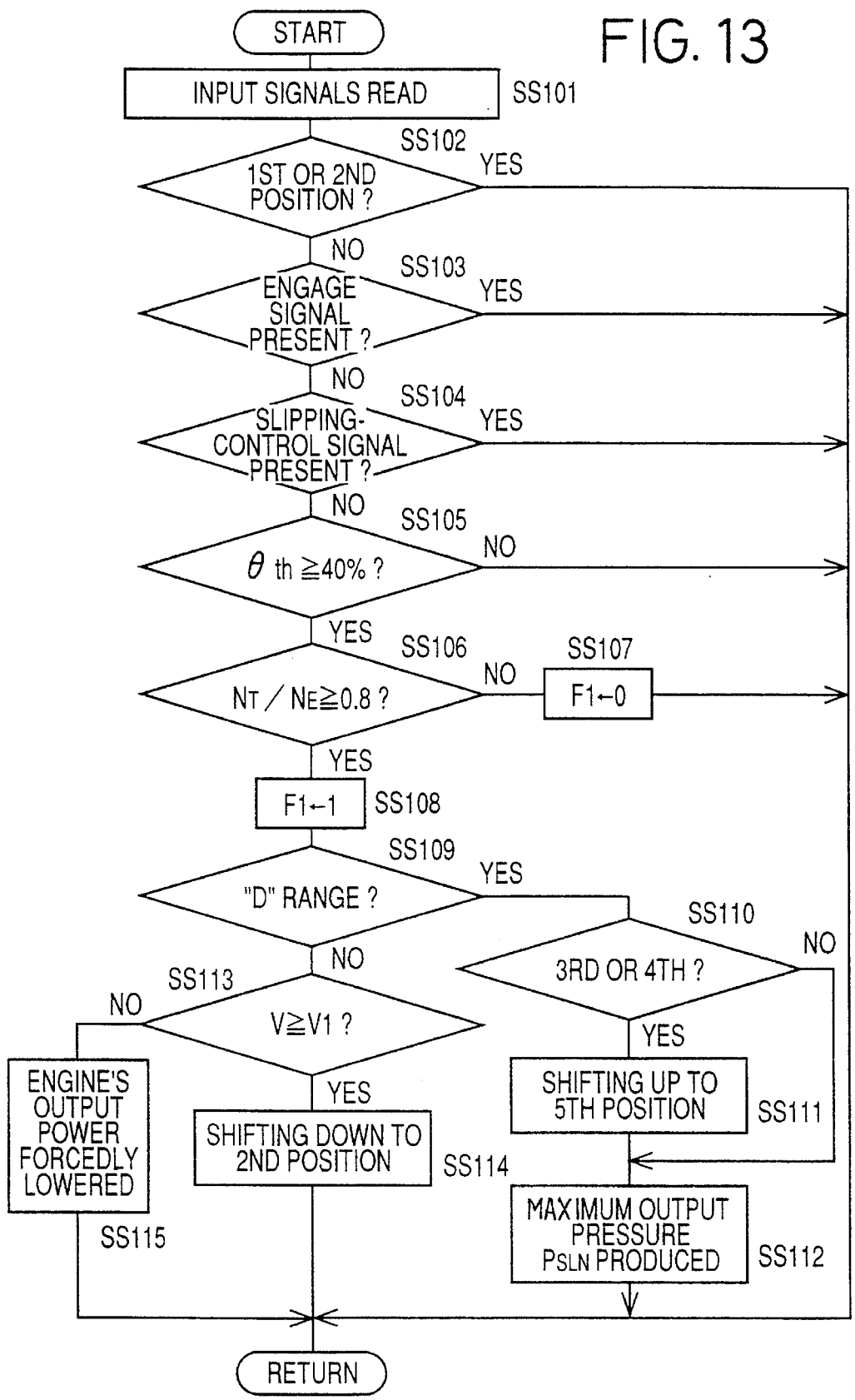
FIG. 13 is a flow chart corresponding to FIG. 6, representing a control routine carried out by a transmission control device of the hydraulic control apparatus as the second embodiment.

There will described the operation of the transmission control device 78 of the hydraulic control apparatus 8 in accordance with the second embodiment, by reference to the flow chart of FIG. 13.

First, at Step SS101, the CPU of the control device 78 reads in input signals from the various sensors such as 58, 64, 66, 74, 75. Step SS101 is followed by Step SS102 to judge whether the automatic transmission 14 is being operated in the 1st or 2nd position, based on the current combination of operation or non-operation of the solenoid valves S1, S2, S3. If a positive judgment is made, i.e., if the transmission 14 is being placed in the 1st or 2nd position, the lock-up clutch 24 is by no means placed in the full-engaged or slipping state, according to a set of shift patterns (FIG. 7) pre-stored in the ROM. Therefore, the current control cycle is ended. On the other hand, if a negative judgment is made at Step SS102, the control of the CPU goes to Step SS103. Steps SS103 to SS106 serve as a part of the lock-up clutch error detecting device 260. At Steps SS103 to SS106, the control device 78 makes a positive judgment that an operational error has occurred to the lock-up clutch 24, as a result of detecting the full engagement or partial engagement (i.e., slipping) of the clutch 24 while the control device 78 is supplying a RELEASE signal to place the clutch 24 in the full-released state.

At Step SS103, the CPU of the control device 78 judges whether an ENGAGE signal is present to place the lock-up clutch 24 in the full-engaged state, i.e., whether the maximum pressure level of the output pressure $P_{SLU}$ is present to cause the control port 230 and discharge port 232 of the lock-up control valve 200 to fully communicate with each other. If a positive judgment is made at Step SS103, the current control cycle is ended. On the other hand, if a negative judgment is made, the control proceeds with Step SS104 to judge whether a SLIPPING-CONTROL signal is present to place the lock-up clutch 24 in the slipping state. If a positive judgment is made at Step SS104, the current control cycle is ended. Meanwhile, if a negative judgment is made, the control proceeds with Step SS105 to judge whether the first throttle valve opening angle $\theta_{th}$ is greater than a reference value, e.g., not smaller than 40%. In the case where a negative judgment is made at Step SS105, the current control cycle is ended since the rotation speed ratio $N_T/N_E$ of the torque converter 12 is considerably small. Meanwhile, in the case where a positive judgment is made, the control proceeds with Step SS106 to judge whether the rotation speed ratio $N_T/N_E$ is greater than a reference value, e.g., not smaller than 0.8. This reference value is used for identifying that the lock-up clutch 24 is being placed in the full-engaged or slipping state.

In the event that a negative judgment is made at Step SS106, the current control cycle is ended since the negative result of Step SS106 is not inconsistent with the results of Steps SS103 to SS105. Therefore, the control of the CPU goes to Step SS107 to reset a flag, F1, to zero (i.e., F1=0), and the current control cycle is ended. On the other hand, a positive judgment made at Step SS106 is inconsistent with the results of Steps SS103 to SS105. Hence, the control of the CPU goes to Step SS108 to set the flag F1 to one (F1=1) indicating that an operational error has occurred to the lock-up clutch 24. Step SS108 is followed by Step SS109 to judge whether the shift lever 72 is currently being shifted to the "D" (drive) range.

If a positive judgment is made at Step SS109, the control of the CPU goes to Steps SS110 to SS112 serving as part of the control device 262. In this case, it can be judged that the motor vehicle is running forward in a normal manner. At Step SS110, the CPU judges whether the automatic transmission 14 is being operated in the 3rd or 4th position, based on the current combination of operation or non-operation of the solenoid valves S1, S2, S3. While the transmission 14 is operated in the 3rd or 4th position, the engaging pressure $P_{Bo}$ of the brake Bo is not produced, so that the output pressure $P_{SLN}$ of the linear solenoid valve SLN cannot be supplied via the selector valve 250 to the fluid chamber 248 of the lock-up relay valve 198. Therefore, if a positive judgment is made at Step SS110, the control goes to Step SS111 to shift up the current position of the transmission 14 to the 5th position, thereby switching the selector valve 250 as indicated in broken line in FIG. 11, and subsequently to Step SS112 to operate the linear solenoid valve SLN to produce a maximum or upper-limit output pressure $P_{SLN}$. On the other hand, if a negative judgment is made at Step SS110, the control skips Step SS111 and directly goes to Step SS112 to operate the valve SLN in the same manner, since the selector 250 has been switched. Consequently, the output pressure $P_{SLN}$ is supplied to the fluid chamber 248 of the lock-up relay valve 198, so that the lock-up clutch 24 is forcedly placed and held in the full-released state. Then, the control of the control device 78 returns to Step SS101.

If a negative judgment is made at Step SS109, the control of the CPU goes to Step SS113. In this case, it can be judged that although the RELEASE signal is present the lock-up clutch 24 is being placed in the full-engaged or slipping state and simultaneously the shift lever 72 is currently shifted to a "3" range of the automatic transmission 14. Since the "3" range is a manually selected range and does not cover the 5th position, the transmission 14 cannot physically be shifted up to the 5th range in the "3" range. Therefore, the transmission 14 is rather shifted down to a lower speed position. Specifically, at Step SS113, the CPU judges whether the vehicle running speed V is not greater than a reference value, $V_1$. The reference value $V_1$ corresponds to a speed range suitable for shifting the transmission 14 down to the 2nd position. If a positive judgment is made at Step SS113, the control goes to Step SS114 to shift down the transmission 14 to the 2nd position. On the other hand, if a negative judgment is made at Step SS113, the shifting of the transmission 14 down to the 2nd position is not appropriate, therefore the control goes to Step SS115 at which the control device 78 forcibly lowers the output power of the engine 10 by regulating the amount of injection of the fuel to the engine 10, controlling the opening angle of the second throttle valve 56, and/or controlling the timing of ignition of the fuel, so as to place the clutch 24 in the full-released state. Additionally, the flag F1 is reset to zero (F1=0).

It merges from the foregoing description that, in the second embodiment, even if the lock-up clutch 24 is being placed in the slipping or full-engaged state because of an operational error of, e.g., the linear solenoid valve SLU where the control device 78 is producing the RELEASE signal to place the lock-up clutch 24 in the full-released state, the output pressure $P_{SLN}$ of the linear solenoid valve SLN is supplied to the fluid chamber 248 of the lock-up relay valve 198 via the selector valve 250 switched by the engaging pressure $P_{Bo}$ of the brake Bo, so that the lock-up clutch 24 is forcedly placed in the full-released state. Accordingly, the reduction of durability or life expectancy of the lock-up clutch 24 is effectively prevented.

Additionally, in the second embodiment, the linear solenoid valve SLN which normally is not used while the transmission 14 is operated in the 5th position where the lock-up clutch 24 is placed and held in the full-engaged state, is used for forcibly placing and holding the clutch 24 in the full-released state when an operational error has occurred to the lock-up clutch 24. Thus, the hydraulic control apparatus 8 enjoys a simpler structure and a smaller size than those of a similar apparatus which additionally incorporates an exclusive solenoid valve for achieving the same function.

Furthermore, in the second embodiment, the engaging pressure $P_{Bo}$ of the brake Bo is supplied via the orifice or restrictor 254 to the selector valve 250, the linear solenoid valve SLN can properly control the back pressures of the accumulators on one hand and, on the other hand, forcibly place the lock-up clutch 24 in the full-released state, without causing any interference of the two functions.

In the second embodiment, too, the hydraulic control apparatus 8 or transmission control device 78 utilizes the set of shift patterns of FIG. 7 for the shift control of the automatic transmission 14, like the first embodiment. While the flag F1 is set at F1=1, the control device 78 may utilize the second set of shift patterns of FIG. 8.

Additionally, in the second embodiment, too, the transmission control device 78 may carry out the routine of FIG. 9, in addition to the routine of FIG. 13. According to the routine of FIG. 9, the reduction of durability of the lock-up clutch 24 is effectively prevented even if the slipping state of the clutch 24 remains because of the fixing or sticking of the spool 204 of the lock-up relay valve 198 to the ENGAGE position.

Figure 14:
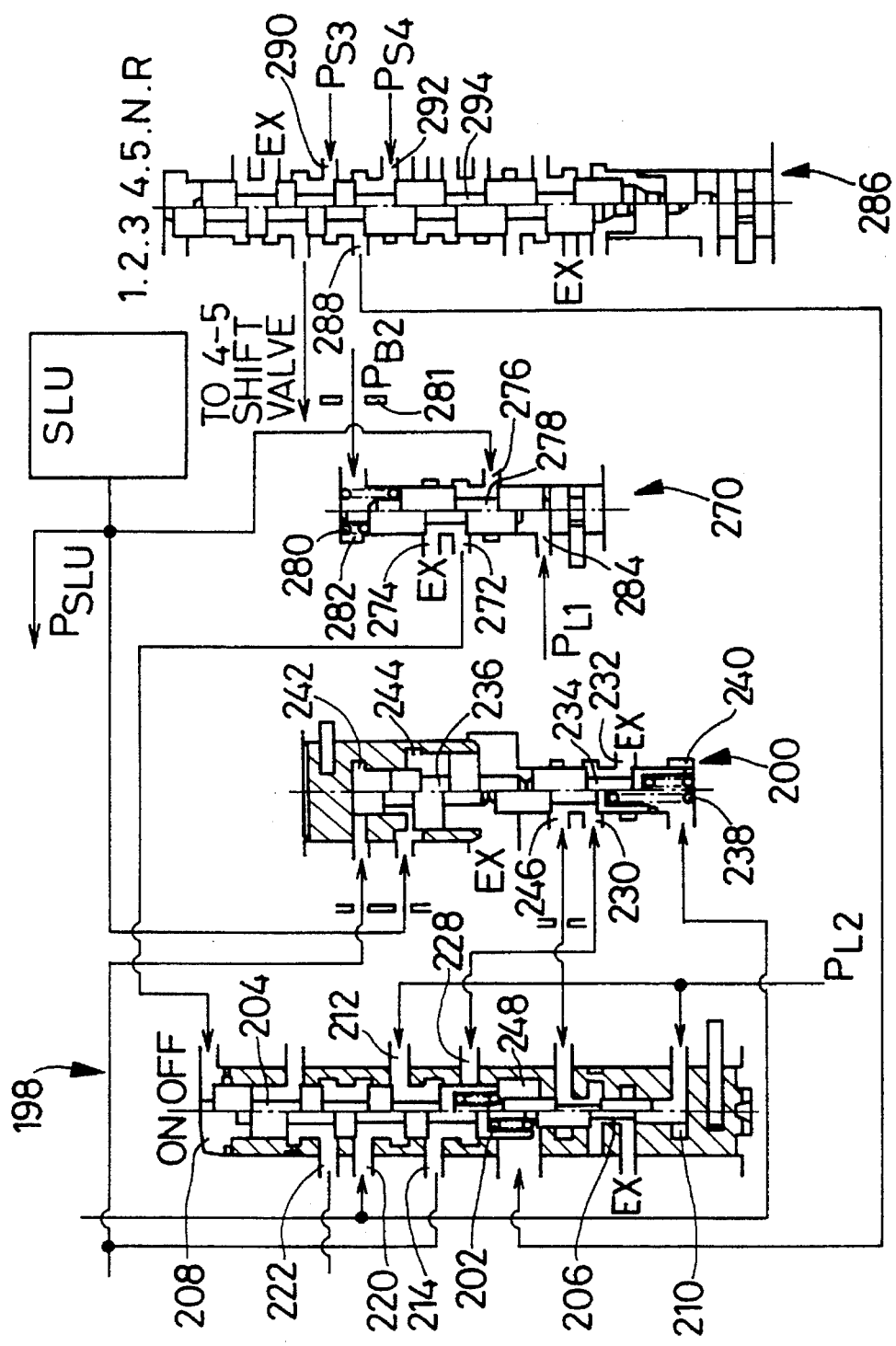
FIG. 14 is a view corresponding to FIG. 11, showing a pertinent part of a hydraulic control circuit of a hydraulic control apparatus as a third embodiment of the invention.

Hereinafter there will be described a third embodiment of the present invention by reference to FIGS. 14 through 16. The third embodiment relates to a modified form of the hydraulic control circuit 84 of the hydraulic control apparatus 8 in accordance with the second embodiment shown in FIGS. 10–13. In FIG. 14, a selector valve 270 is provided between the linear solenoid valve SLU and the fluid chamber 208 of the lock-up relay valve 198.

The selector valve 270 has an output port 272 connected to the fluid chamber 208 of the lock-up relay valve 198; a drain port 274; an input port 276 receiving the output pressure $P_{SLU}$ of the linear solenoid valve SLU; a spool 278 which is selectively movable between a RELEASE position where the spool 278 causes the output port 272 to communicate with the drain port 274, and an ENGAGE position where the spool 278 causes the output port 272 to communicate with the input port 276; a spring 280 for biasing the spool 278 toward the ENGAGE position; a fluid chamber 282 in which the spring 280 is accommodated and which receives an engaging pressure, $P_{B2}$, of the brake B2, via an orifice 281, for biasing the spool 278 toward the ENGAGE position (the engaging pressure $P_{B2}$ is produced while the automatic transmission 14 is operated in one of the 3rd, 4th, and 5th positions); and a fluid chamber 284 which receives the first line pressure $P_{L1}$ for biasing the spool 278 toward the RELEASE position. Therefore, only when the automatic transmission 14 is operated in one of the 3rd, 4th, or 5th position, the output pressure $P_{SLU}$ is supplied to the fluid chamber 208 of the lock-up relay valve 198, so that the valve 198 is placed in the ENGAGE ("ON") position based on the output pressure $P_{SLU}$.

The hydraulic control circuit 84 additionally includes a 3–4 shift valve 286 which is selectively switchable for shifting the automatic transmission 14 between the 3rd and 4th positions. The 3–4 shift valve 286 has an output port 288 communicating with the fluid chamber 248 of the lock-up relay valve 198; a first input port 290 receiving an output pressure, $P_{S3}$, of the solenoid valve S3; a second input port 292 receiving an output pressure, $P_{S4}$, of the solenoid valve S4; and a spool 294 which is selectively movable between a first position where the spool 294 causes the output port 288 to communicate with the first input port 290 while the transmission 14 is operated in one of the 1st, 2nd, and 3rd positions, and a second position where the spool 294 causes the output port 288 to communicate with the second input port 292 while the transmission 14 is operated in one of the 4th and 5th positions. The solenoid valve S3 produces the output pressure $P_{S3}$ for switching the 4–5 shift valve (FIG. 4) and thereby shifting the transmission 14 from the 4th position to the 5th position, and the solenoid valve S3 is not used while the transmission is operated in one of the 1st, 2nd, and 3rd positions. The solenoid valve S4 produces the output pressure $P_{S4}$ for applying the engine brake to the motor vehicle when the transmission 14 is operated in one of the the 1st, 2nd, and 3rd positions, and the solenoid valve S4 is not used while the transmission is operated in one of the 4th and 5th positions.

Figure 15:
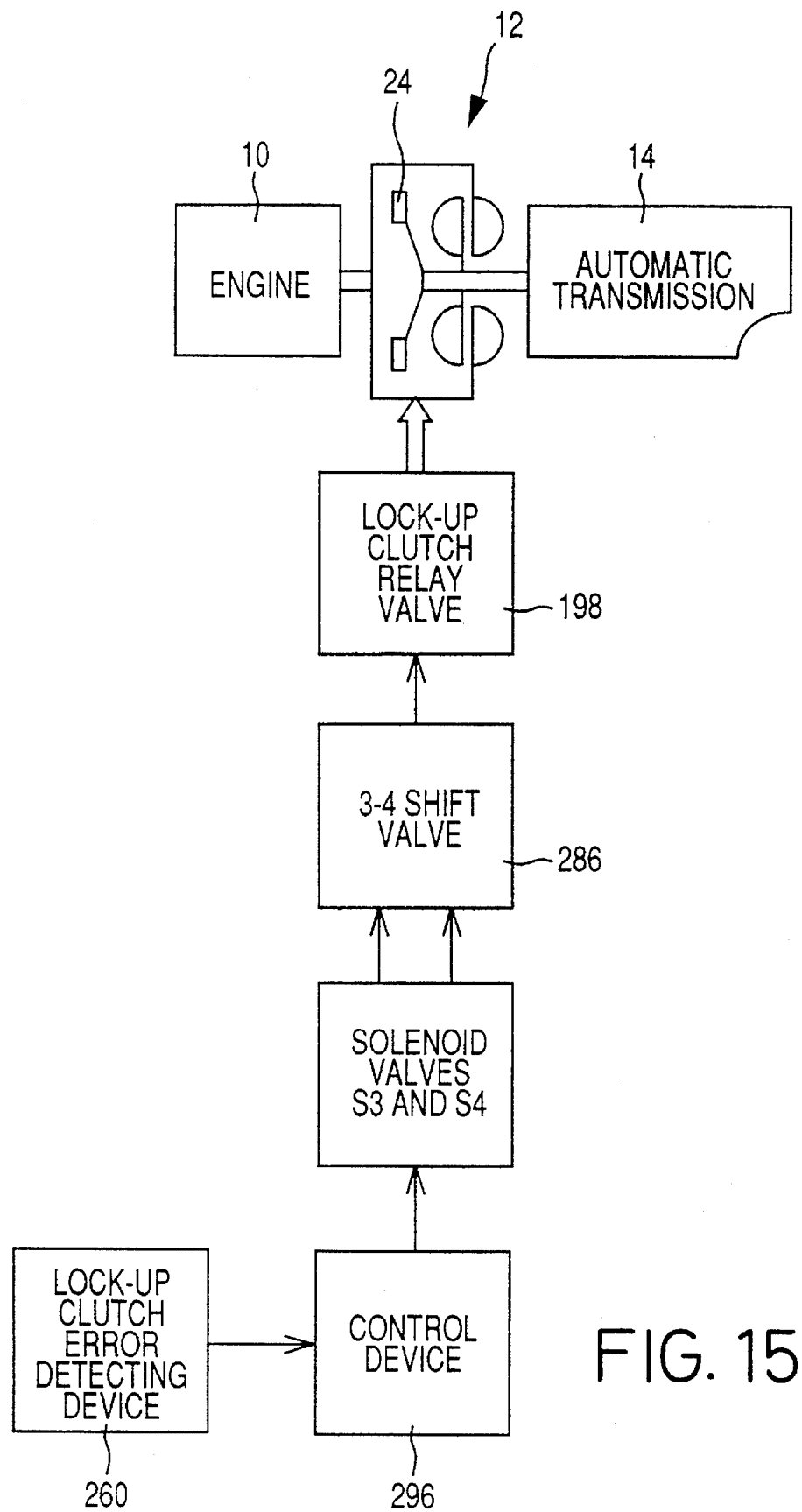
FIG. 15 is a diagrammatic view corresponding to FIG. 12, showing important elements of the hydraulic control apparatus as the third embodiment.

FIG. 15 shows a diagrammatic view of important elements of the hydraulic control apparatus 8 in accordance with the third embodiment. The control apparatus 8 includes the lock-up clutch error detecting device 260 which detects an operational error of the lock-up clutch 24; and a control device 296 (i.e., transmission control device 78) which operates the solenoid valve S3 when the transmission 14 is being operated in the 3rd position, or operates the solenoid valve S4 when the transmission 14 is being operated in the 4th or 5th position, and moves the spool 294 of the 3–4 shift valve 286 to the first or second position, upon detection of an operational error by the detecting device 260, so that the output pressure $P_{S3}$ or $P_{S4}$ of the solenoid valve S3 or S4 is supplied via the 3–4 shift valve 286 to the lock-up relay valve 198 serving as the lock-up clutch switching valve device so as to place the valve 198 in the RELEASE position. Thus, the hydraulic control apparatus 8 is capable of forcibly placing the lock-up relay valve 198 in the RELEASE position and thereby placing the lock-up clutch 24 in the full-released state, upon detection of an operational error of the lock-up clutch 24 by the error detecting device 260.

There will be described the operation of the transmission control electronic device 78 of the hydraulic control apparatus 8 in accordance with the third embodiment, by reference to the flow chart of FIG. 16. The flow chart of FIG. 16 is different from the flow chart of FIG. 13 for the second embodiment, with respect to the following steps: At Step SS201 following Step SS108, the CPU of the control device 78 judges whether the automatic transmission 14 is being operated in the 3rd position. If a positive judgment is made, the control proceeds with Step SS202 to operate the solenoid valve S3 by deenergizing the solenoid (No. 3) of the valve S3 to an "OFF" state. Normally the valve S3 is not used in the 3rd position where the solenoid No. 3 remains in an "ON" state. Consequently, the solenoid valve S3 produces the output pressure $P_{S3}$, which is supplied to the fluid chamber 248 of the lock-up relay valve 198 to forcibly place the lock-up clutch 24 in the full-released state.

On the other hand, if a negative judgment is made at Step SS201, it means that the automatic transmission 14 is being operated in the 4th or 5th position, therefore the control of the CPU proceeds with Step SS203 to operate the solenoid valve S4 by deenergizing the solenoid (No. 4) of the valve S4 to an "OFF" state. Normally the valve S4 is not used in the 4th or 5th position where the solenoid No. 4 remains in an "ON" state. Consequently, the solenoid valve S4 produces the output pressure $P_{S4}$, which is supplied to the fluid chamber 248 of the lock-up relay valve 198 to forcibly place the lock-up clutch 24 in the full-released state. In the third embodiment, Steps SS201 through SS203 correspond to a part of the control device 296 of FIG. 15.

As is apparent from the foregoing description, in the third embodiment, even if the lock-up clutch 24 remains in the slipping or full-engaged state where the control device 78 is producing the RELEASE signal to place the lock-up clutch 24 in the full-released state, the lock-up clutch 24 is forcedly placed in the full-released state. Thus, the lock-up clutch 24 is prevented from slipping while the motor vehicle is running in such conditions under which the clutch 24 should be placed in the full-released state. Accordingly, the reduction of durability of the clutch 24 is effectively prevented.

Besides, in the third embodiment, the engine-brake solenoid valve S4 which normally is used while the transmission 14 is operated in one of the 1st, 2nd, and 3rd positions, and the solenoid valve S3 which normally is used while the transmission 14 is operated in one of the 4th and 5th positions, are secondarily used for forcibly placing the lock-up clutch 24 in the full-released state when an operational error has occurred to the clutch 24. Thus, the hydraulic control apparatus 8 enjoys a lower weight, a smaller size (e.g., smaller occupied space), and a lower production cost than those of an apparatus which would incorporate an exclusive fail-safe solenoid valve for achieving the same function.

Further, in the third embodiment, the fluid chamber 248 of the lock-up relay valve 198 selectively receives, via the 3–4 shift valve 286, the output pressure $P_{S3}$ of the solenoid valve S3 and the output pressure $P_{S4}$ of the engine-brake solenoid valve S4. Therefore, it is not necessary to shift the automatic transmission 14 up to the 5th position, for forcibly placing the lock-up clutch 24 in the full-released state upon detection of an operational error of the clutch 24.

Figure 17:
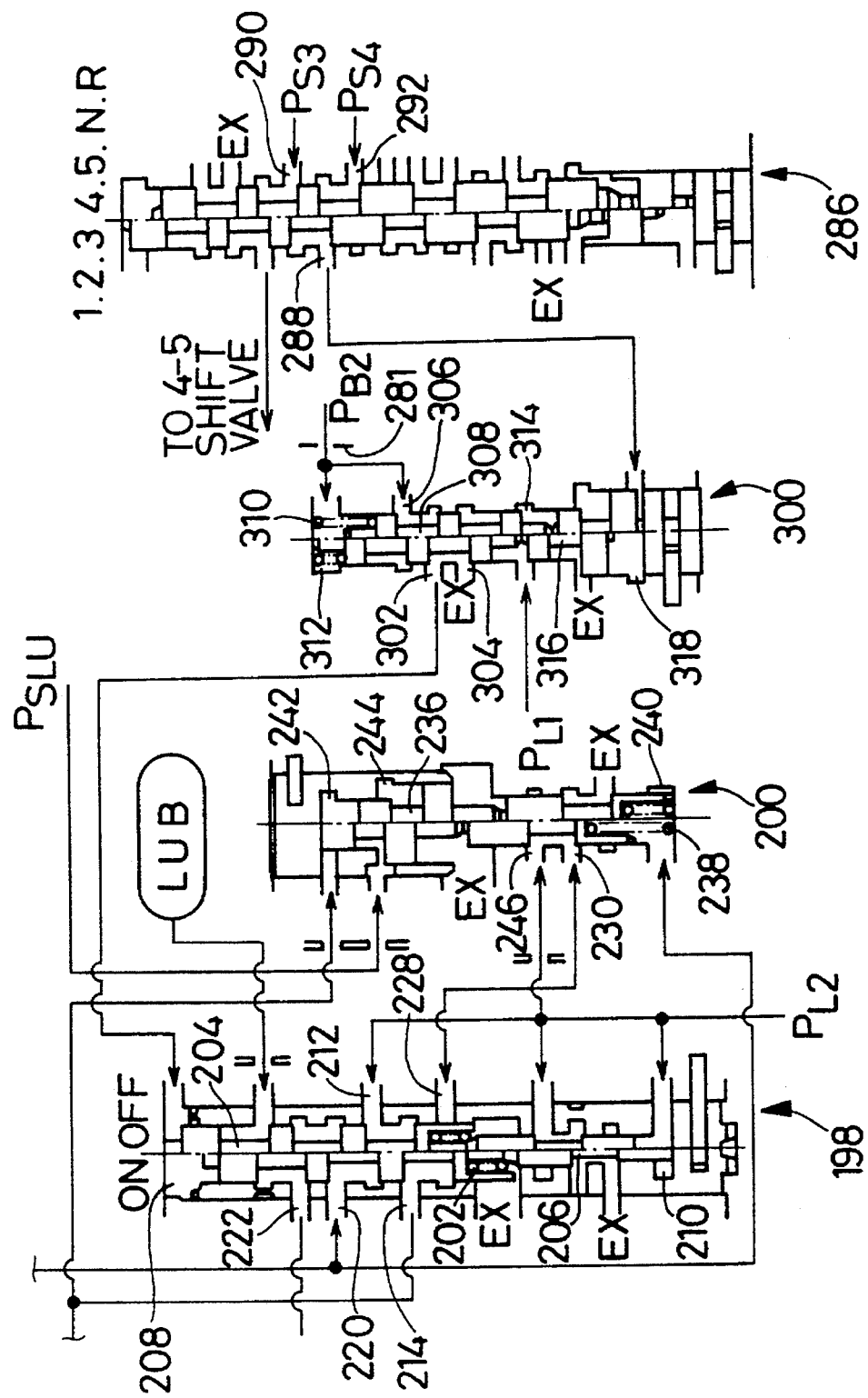
FIG. 17 is a view corresponding to FIG. 11, showing a pertinent part of a hydraulic control circuit of a hydraulic control apparatus as a fourth embodiment of the invention.
Figure 18:
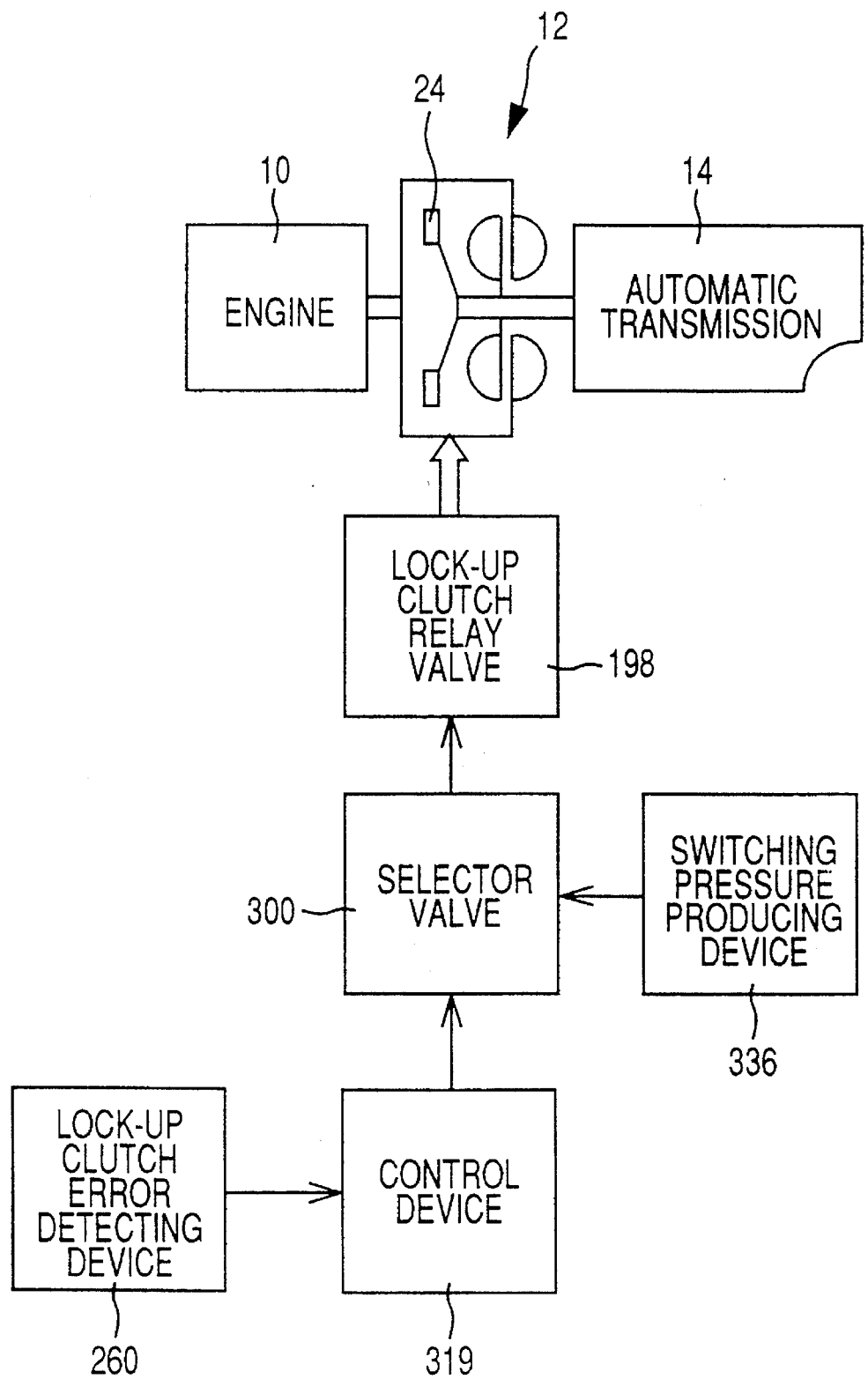
FIG. 18 is a diagrammatic view corresponding to FIG. 12, showing important elements of the hydraulic control apparatus as the fourth embodiment.

Next there will be described a fourth embodiment of the present invention by reference to FIGS. 17 and 18. The fourth embodiment relates to another modified form of the hydraulic control circuit 84 of the hydraulic control apparatus 8 in accordance with the second embodiment shown in FIGS. 10–13. In the fourth embodiment, the fluid chamber 208 of the lock-up relay valve 198 receives, via a selector valve 300, the engaging pressure $P_{B2}$ of the brake B2 which normally is produced when the automatic transmission 14 is being operated in one of the 3rd, 4th, and 5th positions, so that the valve 198 is placed in the ENGAGE position based on the engaging pressure $P_{B2}$.

The selector valve 300 has an output port 302 connected to the fluid chamber 208 of the lock-up relay valve 198; a drain port 304; an input port 306 receiving the output pressure $P_{B2}$ of the brake B2; a spool 308 which is selectively movable between a RELEASE position where the spool 308 causes the output port 302 to communicate with the drain port 304, and an ENGAGE position where the spool 308 causes the output port to communicate with the input port 306; a spring 310 for biasing the spool 308 toward the ENGAGE position; a fluid chamber 312 in which the spring 310 is accommodated and which receives the engaging pressure $P_{B2}$ of the brake B2, via an orifice 281, for biasing the spool 308 toward the ENGAGE position; a fluid chamber 314 which receives the first line pressure $P_{L1}$ for biasing the spool 308 toward the RELEASE position; a plunger 316 which is abutable on the spool 308; and a fluid chamber 318 which is provided at one end of the plunger 316 and which selectively receives the output pressure $P_{B3}$ of the solenoid valve S3 or the output pressure $P_{B4}$ of the engine-brake solenoid valve S4 from the output port 288 of the 3–4 shift valve 286 (FIG. 14).

Therefore, when the automatic transmission 14 is being operated in one of the 3rd, 4th, and 5th positions, the lock-up relay valve 198 is placed in the ENGAGE ("ON") position. Meanwhile, when the output pressure $P_{B3}$ of the solenoid valve S3 or the output pressure $P_{B4}$ of the engine-brake solenoid valve S4 is supplied from the output port 288 of the 3–4 shift valve 286 to the fluid chamber 318 of the selector valve 300, the valve 198 is placed in the RELEASE ("OFF") position, so that the lock-up clutch 24 is forcedly placed in the full-released state.

Figure 16:
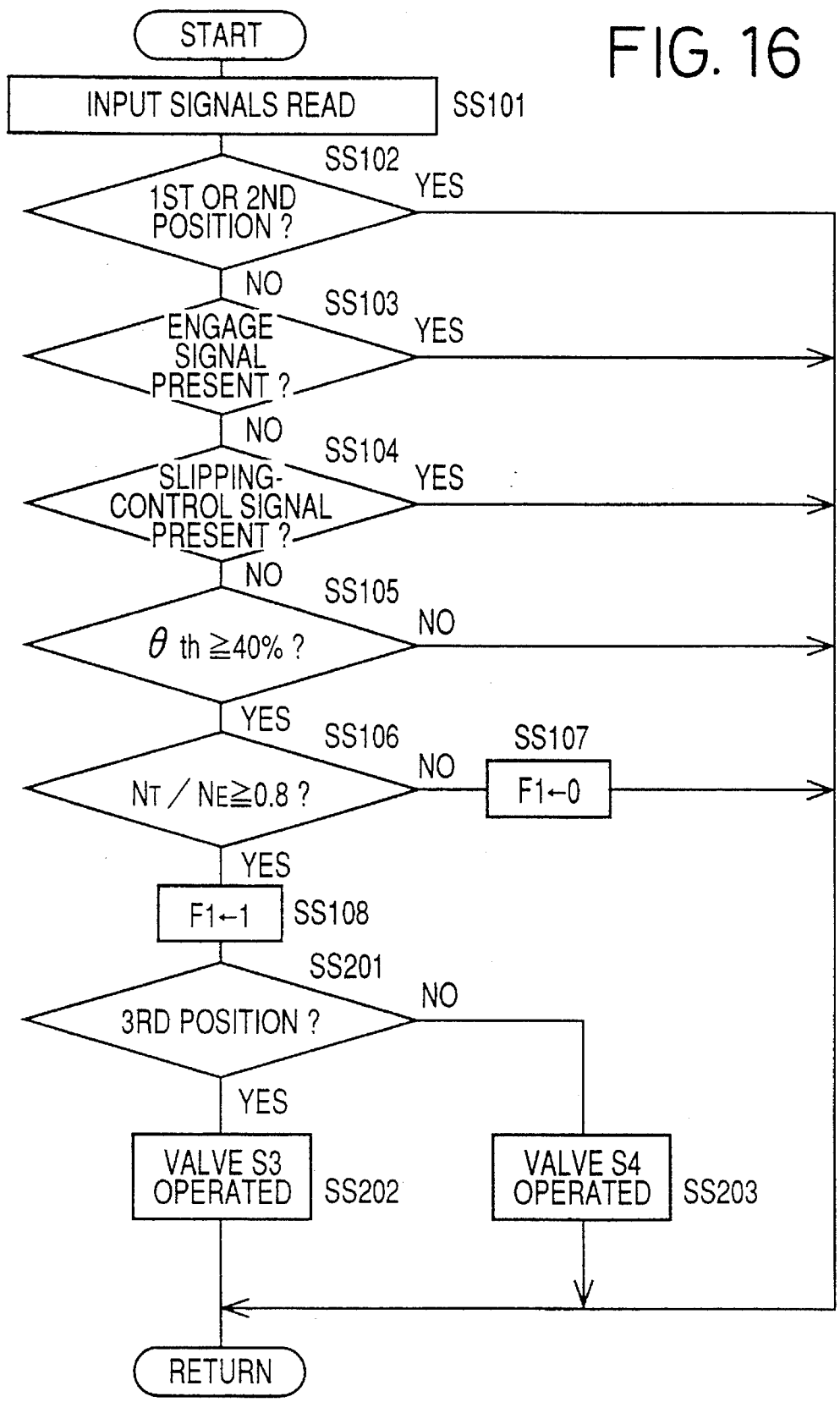
FIG. 16 is a flow chart corresponding to FIG. 13, representing a control routine carried out by a transmission control device of the hydraulic control apparatus as the third embodiment.

In the fourth embodiment, the transmission control device 78 operates the hydraulic control circuit 84 according to the same flow chart as that of FIG. 16 for the third embodiment. Therefore, the present embodiment enjoys the same advantages as those of the third embodiment. FIG. 18 shows a diagrammatic view of important elements of the hydraulic control apparatus 8 in accordance with the fourth embodiment. The control apparatus 8 includes the lock-up clutch error detecting device 260 which detects an operational error of the lock-up clutch 24; and a control device 319 (i.e., transmission control device 78) which operates the solenoid valve S3 when the transmission 14 is being operated in the 3rd position, or operates the solenoid valve S4 when the transmission 14 is being operated in the 4th or 5th position, and places the 3–4 shift valve 286 to the first or second position, upon detection of an operational error by the detecting device 260, so that the output pressure $P_{S3}$ or $P_{S4}$ of the solenoid valve S3 or S4 is supplied to the selector valve 300 to place the selector valve 300 in the RELEASE position. Consequently, the engaging pressure $P_{B2}$ of the brake B2 is disconnected or inhibited from being supplied via the selector valve 300 to the lock-up relay valve 198 serving as the lock-up clutch switching valve device, so that the relay valve 198 is placed in the RELEASE position. Thus, the hydraulic control apparatus 8 is capable of forcibly placing the lock-up clutch 24 in the full-released state, upon detection of an operational error of the clutch 24 by the error detecting device 260. In the fourth embodiment, the brake B2 and/or a valve device (not shown) which produces the engaging pressure $P_{B2}$ of the brake B2 serves as a switching pressure producing device 336 which produces a switching pressure to place the lock-up relay valve 198 in the ENGAGE position.

Figure 19:
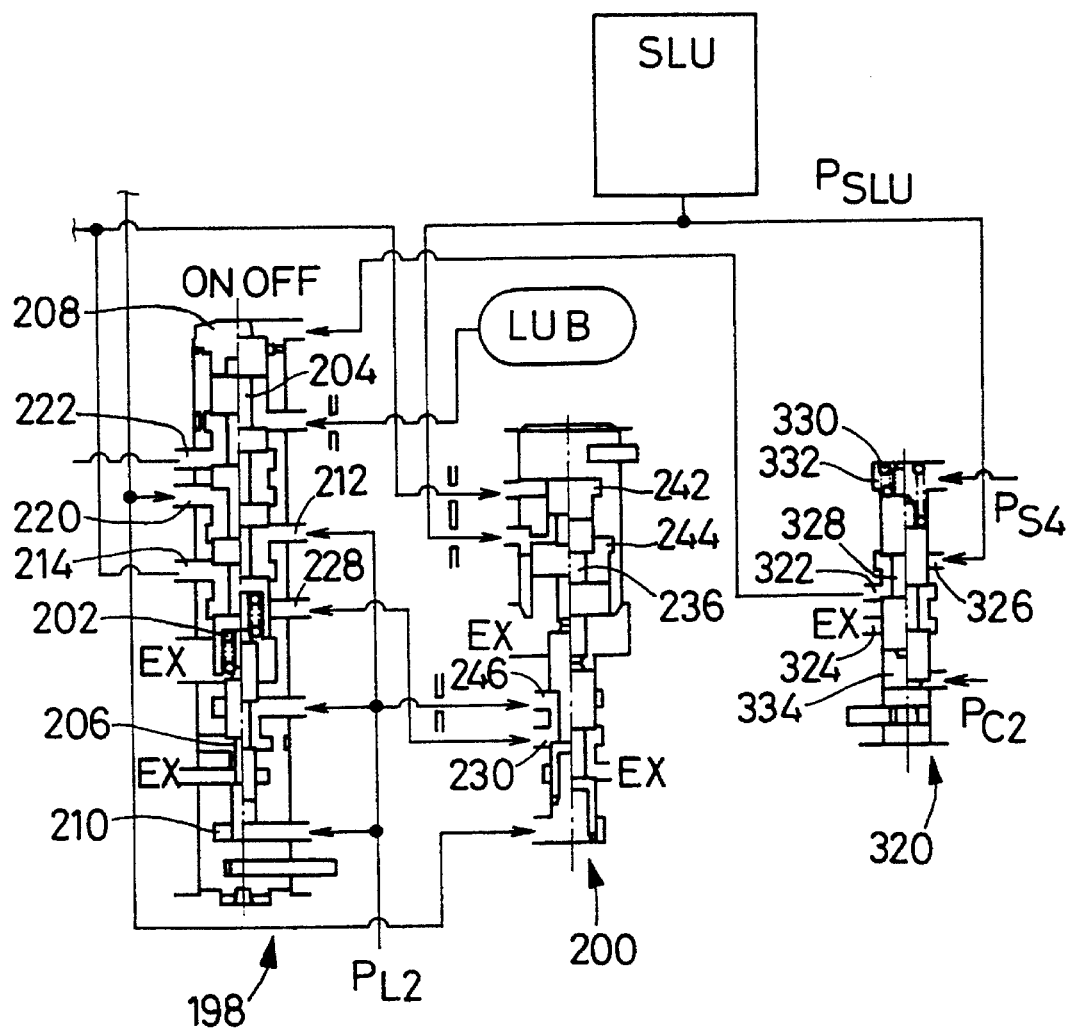
FIG. 19 is a view corresponding to FIG. 11, showing a pertinent part of a hydraulic control circuit of a hydraulic control apparatus as a fifth embodiment of the invention.
Figure 20A:
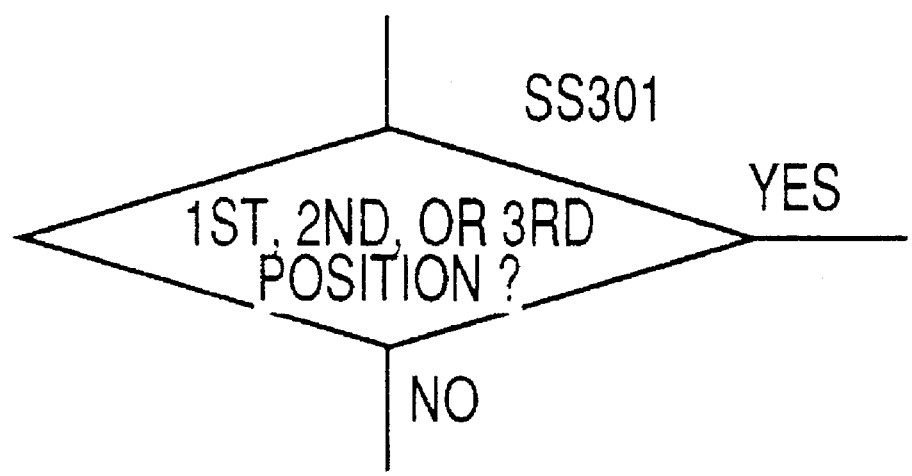
FIG. 20(a) shows Step SS301 carried out in place of Step SS102 of FIG. 13 by a transmission control device of a hydraulic control apparatus as a fifth embodiment of the invention.
Figure 20B:
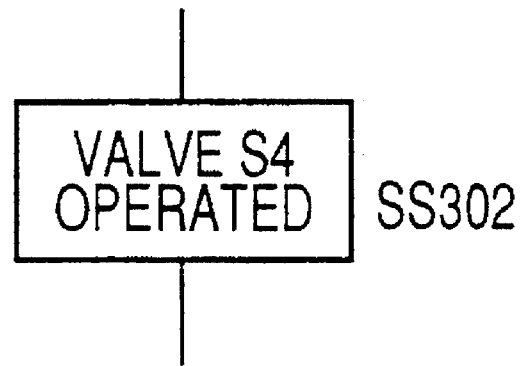
FIG. 20(b) shows Step SS302 carried out in place of Step SS109 of FIG. 13 in the hydraulic control apparatus as the fifth embodiment.

Referring next to FIGS. 19, 20(a), and 20(b), there will be described a fifth embodiment of the present invention. The fifth embodiment relates to yet another modified form of the hydraulic control circuit 84 of the hydraulic control apparatus 8 in accordance with the second embodiment shown in FIGS. 10–13. In the fifth embodiment, the hydraulic control circuit 84 includes a selector valve 320 provided between the linear solenoid valve SLU and the fluid chamber 208 of the lock-up relay valve 198, for forcibly placing the lock-up clutch 24 in the full-released state.

The selector valve 320 has an output port 322 connected to the fluid chamber 208 of the lock-up relay valve 198; a drain port 324; an input port 326 receiving the output pressure $P_{SLU}$ of the linear solenoid valve SLU; a spool 328 which is selectively movable between a RELEASE position where the spool 328 causes the output port 322 to communicate with the drain port 324, and an ENGAGE position where the spool 328 causes the output port 322 to communicate with the input port 326; a spring 330 for biasing the spool 328 toward the RELEASE position; a fluid chamber 332 in which the spring 330 is accommodated and which receives the output pressure $P_{S4}$ of the engine-brake solenoid valve S4, for biasing the spool 328 toward the RELEASE position; and a fluid chamber 334 which receives, directly or via no orifice, the engaging pressure, $P_{C2}$, of the clutch C2 for biasing the spool 328 toward the ENGAGE position (the clutch C2 is placed in an engaged state only when the automatic transmission 14 is being operated in the 4th or 5th position). Therefore, if the output pressure $P_{S4}$ of the solenoid valve S4 is supplied to the fluid chamber 332 of the selector valve 320 when the transmission 14 is being operated in the 4th or 5th position, the output pressure $P_{SLU}$ of the linear solenoid valve SLU is prevented from being supplied to the fluid chamber 208 of the lock-up relay valve 198, so that the valve 198 is placed in the RELEASE ("OFF") position and the lock-up clutch 24 is forcedly placed in the full-released state.

In the fifth embodiment, the transmission control device 78 operates the hydraulic control circuit 84 according to a modified arrangement of the flow chart of FIG. 16 wherein Step SS102 and Steps SS201–203 of FIG. 16 are replaced by Step SS301 of FIG. 20(a) and Step SS302 of FIG. 20(b), respectively. Specifically, at Step SS301, the CPU of the control device 78 judges whether the automatic transmission 14 is being operated in one of the 1st, 2nd, and 3rd positions, and at Step SS302 the control device 78 operates the solenoid valve S4 by deenergizing the solenoid No. 4 of the valve S4 to the "OFF" state. According to this modified routine, the error detecting device 260 detects an operational error of the lock-up clutch 24 only when the automatic transmission 14 is being operated in the 4th or 5th position. Upon detection of an error of the clutch 24, the clutch 24 is forcedly placed in the full-released state. Thus, the hydraulic control apparatus 8 in accordance with the fifth embodiment enjoys the same advantages as those of the apparatus 8 in accordance with the preceding embodiments. In the fifth embodiment, Step SS302 corresponds to the control device 319 of FIG. 18, and the linear solenoid valve SLN corresponds to the switching pressure producing device 336 of FIG. 18.

Figure 21:
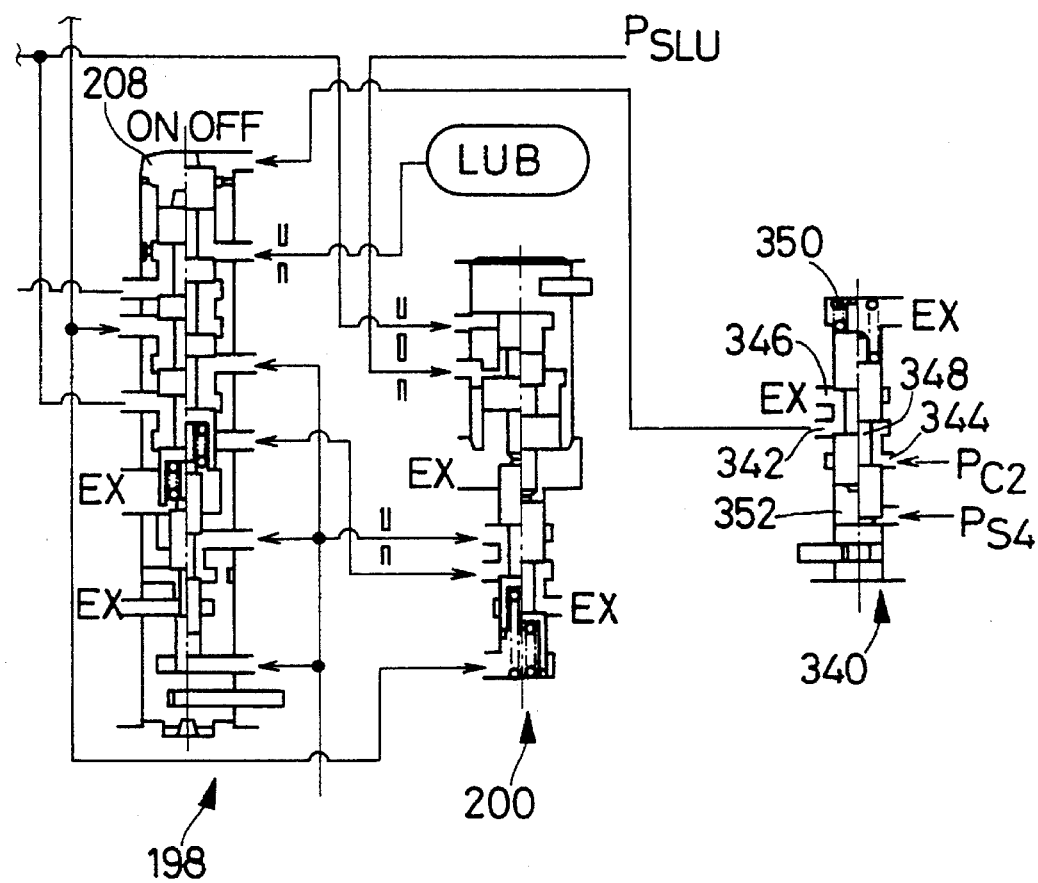
FIG. 21 is a view corresponding to FIG. 11, showing a pertinent part of a hydraulic control circuit of a hydraulic control apparatus as a sixth embodiment of the invention.

Referring next to FIG. 21, there will be described a sixth embodiment of the present invention. The sixth embodiment relates to a further modified form of the hydraulic control circuit 84 of the hydraulic control apparatus 8 in accordance with the second embodiment shown in FIGS. 10–13. In the sixth embodiment, the fluid chamber 208 of the lock-up relay valve 198 receives, via a selector valve 340, the engaging pressure $P_{C2}$ of the clutch C2 which is placed in the engaged state only when the automatic transmission 14 is being operated in the 4th or 5th position.

The selector valve 340 has an output port 342 communicating with the fluid chamber 208 of the lock-up relay valve 198; a drain port 346; an input port 344 receiving, directly or via no orifice, the engaging pressure $P_{C2}$ of the clutch C2; a pool 348 which is selectively movable between a RELEASE position where the spool 328 causes the output port 342 to communicate with the drain port 346, and an ENGAGE position where the spool 348 causes the output port 342 to communicate with the input port 344; and a spring 350 for biasing the spool 348 toward the ENGAGE position; a fluid chamber 352 in which the spring 350 is accommodated and which receives the output pressure $P_{S4}$ of the engine-brake solenoid valve S4, for biasing the spool 348 toward the RELEASE position.

In the sixth embodiment, the transmission control device 78 operates the hydraulic control circuit 84 in the same manner as that for the fifth embodiment, i.e., according to the modified flow chart of FIG. 16 wherein Step SS102 and Steps SS201–293 of FIG. 16 are replaced by Step SS301 of FIG. 20(a) and Step SS302 of FIG. 20(b), respectively. Thus, the hydraulic control apparatus 8 in accordance with the sixth embodiment enjoys the same advantages as those of the apparatus 8 in accordance with the fifth embodiment. In the sixth embodiment, the clutch C2 and/or a shift valve (not shown) which produces the engaging pressure $P_{C2}$ of the clutch C2 corresponds to the switching pressure producing device 336 of FIG. 18.

Figure 22:
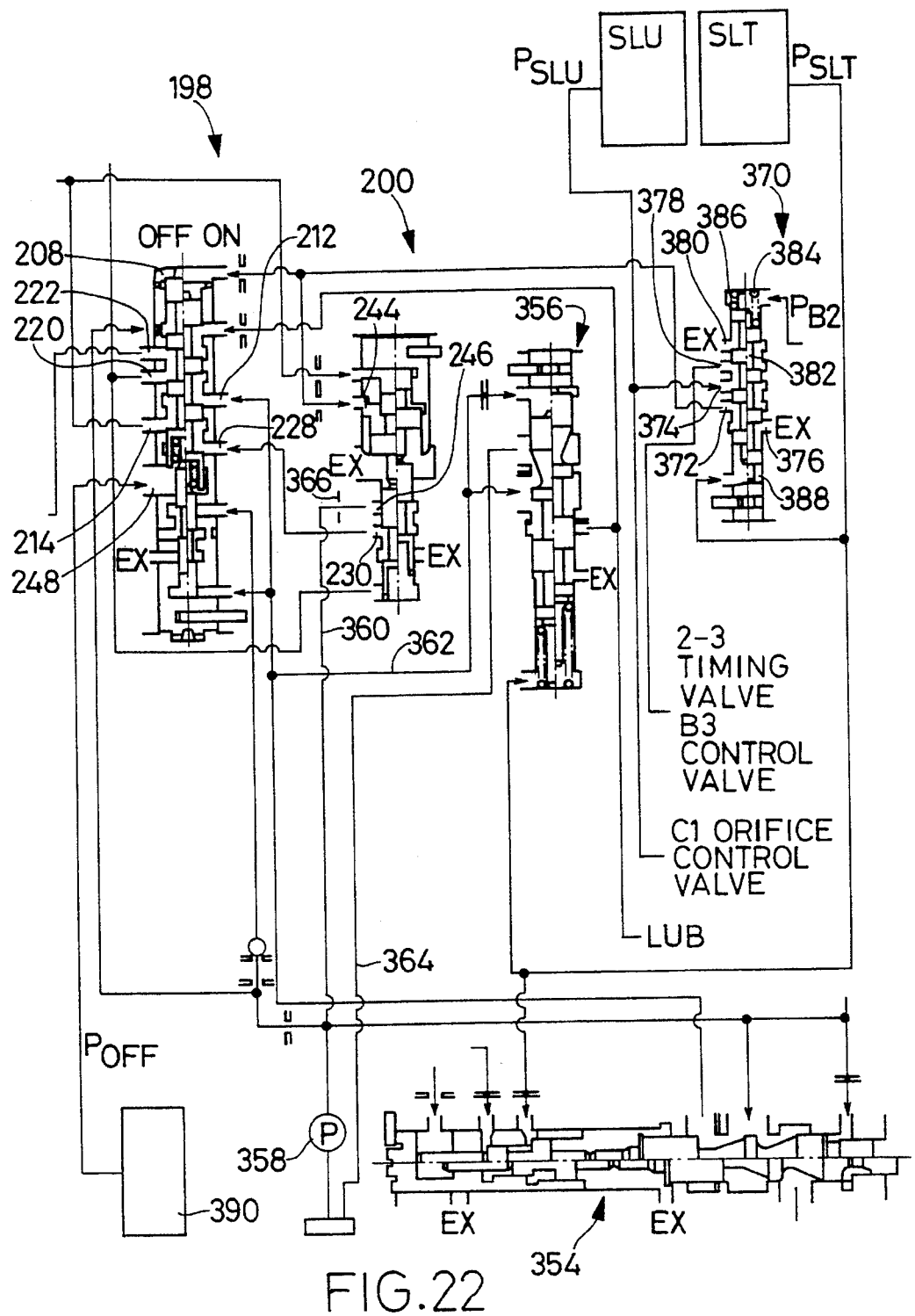
FIG. 22 is a view corresponding to FIG. 11, showing a pertinent part of a hydraulic control circuit of a hydraulic control apparatus as a seventh embodiment of the invention.
Figure 23:
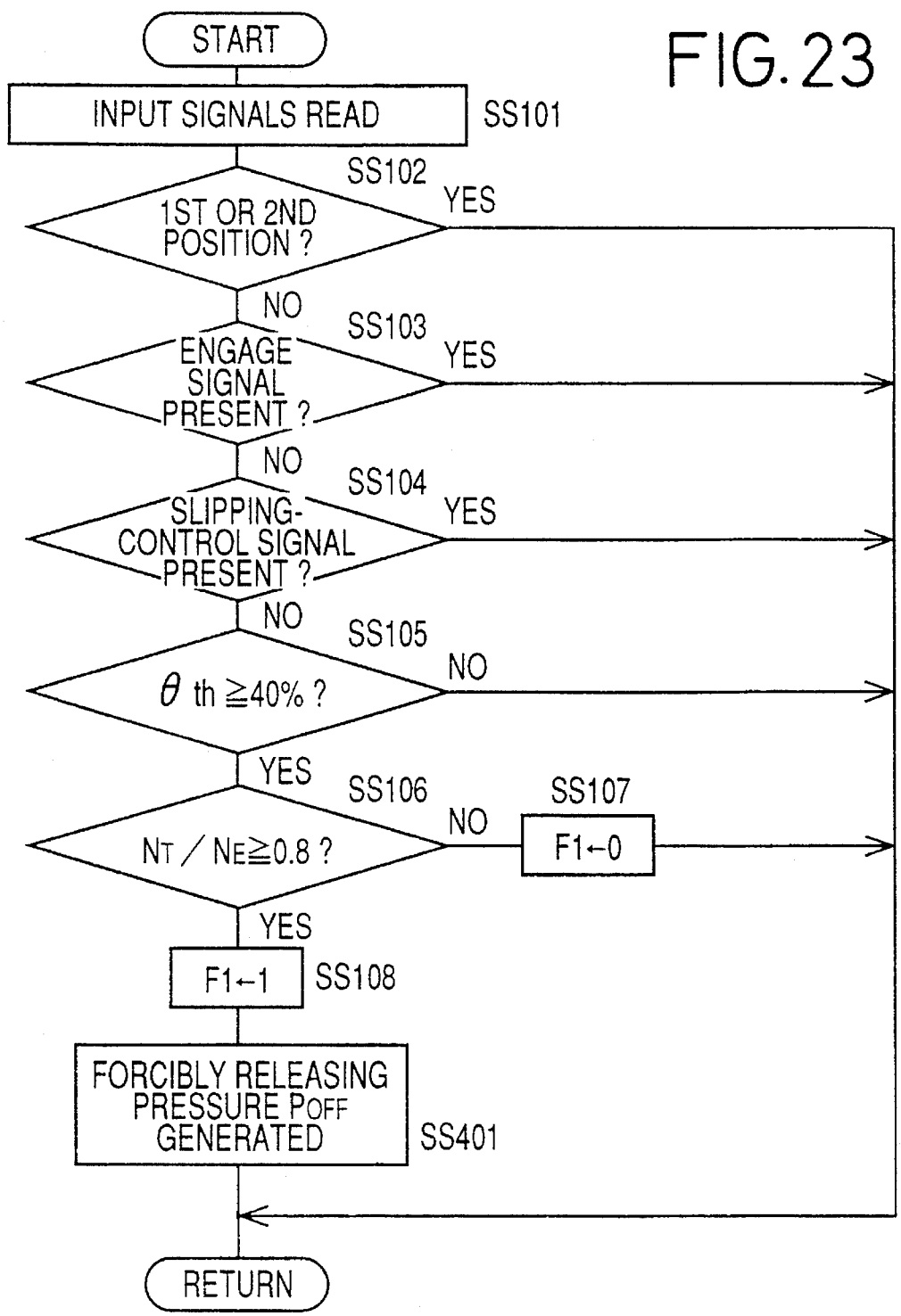
FIG. 23 is a flow chart representing a control routine carried out by a transmission control device of the hydraulic control apparatus as the seventh embodiment.
Figure 24:
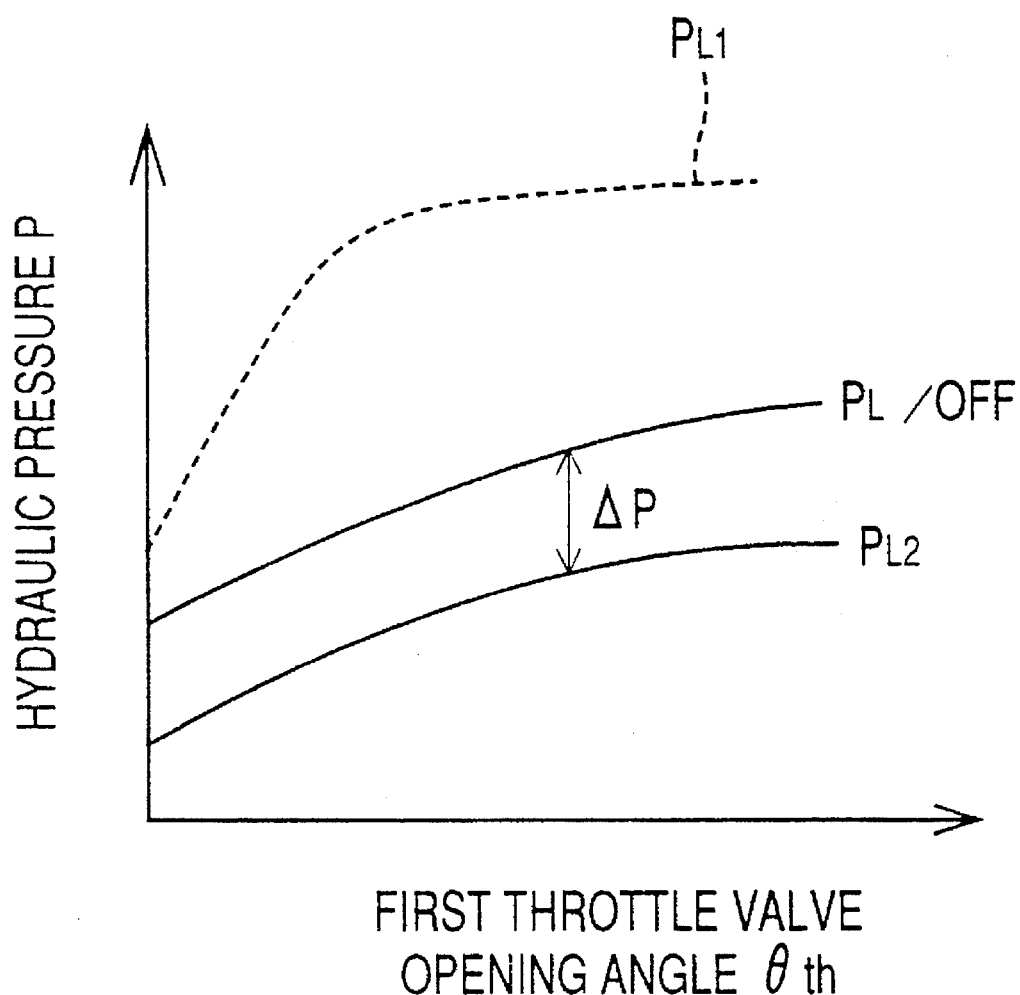
FIG. 24 is a graph representing the characteristic of the hydraulic pressure P which may be obtained according to the control routine of FIG. 23.

Referring next to FIG. 22 through 24, there will be described a seventh embodiment of the present invention. The seventh embodiment relates to another modified form of the hydraulic control circuit 84 of the hydraulic control apparatus 8 in accordance with the second embodiment shown in FIGS. 10–13. In the seventh embodiment, the hydraulic control circuit 84 includes a first and a second pressure regulator valve 354, 356 for formulating a first and a second line pressure, $P_{L1}$ and $P_{L2}$, respectively. A pressurized working fluid such as an oil is fed from a fluid pump 358 which is driven or rotated by the engine 10, to a first line passage 360, which partly flows into a second line passage 362 to formulate the second line pressure $P_{L2}$ corresponding to the output pressure $P_{SLT}$ of the linear solenoid valve SLT (hereinafter, referred to as the THROTTLE pressure $P_{SLT}$). The working fluid flowing from the first pressure regulator valve 354 into the second line passage 362, partly flows into a return passage 364 via the second pressure regulator valve 356. Consequently, the second line pressure $P_{L2}$ is lower than the first line pressure $P_{L1}$ and has a pressure level corresponding to the THROTTLE pressure $P_{SLT}$.

The input port 112 of the lock-up relay valve 198 receives the second line pressure $P_{L2}$, like the hydraulic control circuit 84 for the second embodiment shown in FIG. 11. However, the supply port 146 of the lock-up control valve 200 receives the first line pressure $P_{L1}$ via an orifice 366, unlike the second embodiment. The orifice 366 serves for buffering an abrupt and great pressure increase of the RELEASE fluid chamber 126 of the torque converter 12, when the first line pressure $P_{L1}$ is supplied into the RELEASE fluid chamber 126 for eliminating the slipping or full-engaged state of the lock-up clutch 24 resulting from the sticking of the lock-up relay valve 198 to the ENGAGE position even though the linear solenoid valve SLU is producing a minimum or lower-limit output pressure $P_{SLU}$ corresponding to the control signal supplied from the transmission control device 78.

In the seventh embodiment, the hydraulic control circuit includes a selector valve 370 which has: a first output port 372 communicating with the fluid chamber 208 of the lock-up relay valve 198; an input port 374 receiving the output pressure $P_{SLU}$ of the linear solenoid valve SLU; a second output port communicating with a 2–3 timing valve and a B3 control valve (both not shown); a first and a second drain port 376, 380; a spool 382 which is selectively movable between an ENGAGE position where the spool 382 causes the first output port 372 to communicate with the input port 374 and simultaneously causes the second output port 378 to communicate with the second drain port 380, and a RELEASE position where the spool 382 causes the first output port 372 to communicate with the first drain port 376 and simultaneously causes the second output port 378 to communicate with the input port 374; a spring 384 for biasing the spool 382 toward the ENGAGE position; a fluid chamber 386 in which the spring 384 is accommodated and which receives the engaging pressure $P_{B2}$ of the brake B2 for biasing the spool 382 toward the ENGAGE position (the brake B2 is placed in the engaged state when the automatic transmission 14 is operated in one of the 3rd, 4th, and 5th positions); and a fluid chamber 388 which receives the THROTTLE pressure $P_{SLT}$ (used for regulation of the line pressures $P_{L1}$, $P_{L2}$), for biasing the spool 382 toward the RELEASE position. Therefore, when the transmission 14 is being operated in the 1st or 2nd position, the lock-up clutch 24 is placed in the full-released state, and the output pressure $P_{SLU}$ is supplied to the 2–3 timing valve and B3 control valve. On the other hand, when the transmission 14 is being operated in the 3rd, 4th, or 5th position, the lock-up clutch 24 is placed in the full-released, slipping, or full-engaged state according to the output pressure $P_{SLU}$ corresponding to the control signal supplied from the control device 78.

In the seventh embodiment, the hydraulic control circuit 84 further includes a forced-releasing pressure producing valve 390 which produces and supplies a forcibly releasing pressure, $P_{OFF}$, to the fluid chamber 248 of the lock-up relay valve 198. The forcibly releasing pressure producing valve 390 may have the same construction as that of the selector valve 250 of the second embodiment shown in FIG. 11 or that of the 3–4 shift valve 286 of the third embodiment shown in FIG. 14.

FIG. 23 shows a flow chart according to which the transmission control device 78 operates the hydraulic control circuit 84. The routine of FIG. 23 is different from that of FIG. 16 in that Step SS201–SS203 of FIG. 16 are replaced by Step SS401 of FIG. 23. At Step SS401, the control device 78 operates, upon detection of an operational error of the lock-up clutch 24 at Steps SS103–SS106, the forcibly releasing pressure producing valve 390 to forcibly place the lock-up relay valve 198 in the RELEASE position and thereby place the lock-up clutch in the full-released state. Therefore, the hydraulic control apparatus 8 enjoys the same advantages as those of the preceding embodiments.

In the case where the lock-up clutch 24 remains in the slipping or full-engaged state because of the sticking of the lock-up relay valve 198 to the ENGAGE ("ON") position although the linear solenoid valve SLU is producing the minimum output pressure $P_{SLU}$ based on the control signal from the transmission control device 78, the clutch 24 may not be released, even if the forcibly releasing pressure $P_{OFF}$ is supplied to the fluid chamber 248 of the lock-up relay valve 198. In the seventh embodiment, however, even in this case, the first line pressure $P_{L1}$ is supplied to the RELEASE fluid chamber 126 of the torque converter 12 via the orifice 366, supply port 246 and control port 230 of the lock-up control valve 200, and discharge port 228 and RELEASE port 214 of the lock-up relay valve 198 in the order of description. Consequently, a pressure difference is produced between the RELEASE fluid chambers 126 receiving the first line pressure $P_{L1}$ and the ENGAGE fluid chamber 128 receiving the second line pressure $P_{L2}$. Thus, the lock-up clutch 24 eventually is placed in the full-released state with high reliability.

Additionally, in the seventh embodiment, when the automatic transmission 14 is being operated in the 1st or 2nd position, the supplying of the output pressure $P_{SLU}$ of the linear solenoid valve SLU to the fluid chamber 208 of the lock-up relay valve 198 and the fluid chamber 244 of the lock-up control valve 200 is inhibited by the selector valve 370. Therefore, the second line pressure $P_{L2}$ is supplied to the RELEASE fluid chamber 126 of the torque converter 12, so that the lock-up clutch 24 is securely released.

In the seventh embodiment, the transmission control device 78 may operate, when producing the forcibly releasing pressure $P_{OFF}$ at Step SS401 of FIG. 23, the linear solenoid valve SLU so as to provide a pressure difference, $\Delta P$, between a hydraulic pressure, $P_{L/OFF}$, of the RELEASE fluid chamber 126 and a hydraulic pressure, $P_{L/ON}$, of the ENGAGE fluid chamber 128 (i.e., second line pressure $P_{L2}$), as shown in FIG. 24. The second line pressure $P_{L2}$ is regulated, i.e., increased or decreased according to the opening angle $\theta_{th}$ of the first throttle valve 52. Therefore, the hydraulic pressure $P_{L/OFF}$ or pressure difference $\Delta P$ may be regulated according to a data map pre-stored in the ROM of the control device 78 based on the opening angle $\theta_{th}$. Furthermore, the control device 78 may be adapted to operate, by comparing the engine rotation speed $N_E$ and the turbine rotation speed $N_T$ with each other, the linear solenoid valve SLU to provide a minimum pressure $P_{L/OFF}$ while simultaneously maintaining the full-released state of the lock-up clutch 24 (where the ratio $N_T/N_E$ is approximately zero).

In the seventh embodiment, in the case where the forcibly releasing pressure producing valve 390 has a construction similar to the selector valve 250 for the second embodiment shown in FIG. 11, Step SS401 of FIG. 23 is constituted by Steps SS109–SS115 of FIG. 13. Alternatively, in the case where the forcibly releasing pressure producing valve 390 has a construction similar to the 3–4 shift valve 286 for the fourth embodiment shown in FIG. 17, Step SS401 of FIG. 23 is constituted by Steps SS201–SS203 of FIG. 16.

In the seventh embodiment, the hydraulic control circuit 84 may be adapted such that the output pressure $P_{SLU}$ of the linear solenoid valve SLU is directly supplied to the fluid chamber 244 of the lock-up control valve 200, without providing the selector valve 370 therebetween.

In each of the third to sixth embodiments, too, the routine of FIG. 9 which is optionally used for the first or second embodiment may be carried out in addition to the specific control routine for each embodiment. In these cases, too, Step SR5 may be modified such that the CPU of the transmission control device 78 judges whether the rotation speed ratio $N_T/N_E$ of the torque converter 12 falls within, e.g., the range of 0.8 to 0.95.

In each of the second to seventh embodiments, Step SS104 may be omitted.

Figure 25:
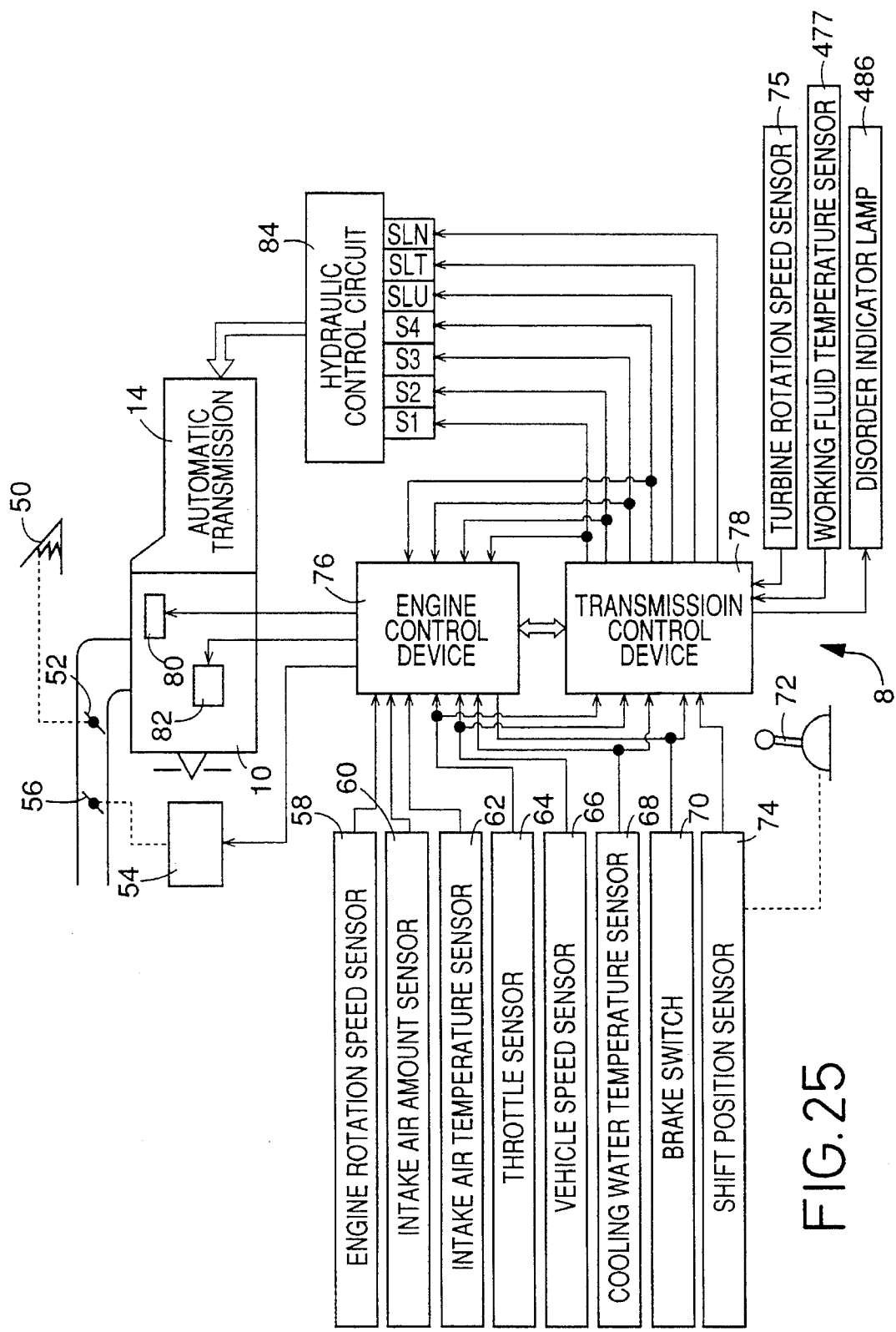
FIG. 25 is a diagrammatic view corresponding to FIG. 1, showing an electronic arrangement of a hydraulic control apparatus as an eighth embodiment of the present invention.

Hereinafter there will be described an eighth embodiment of the present invention, by reference to FIGS. 25 through 30. The eighth embodiment relates to the hydraulic control apparatus 8 shown in FIG. 25. The apparatus 8 of FIG. 25 is different from the apparatus 8 in accordance with the first embodiment shown in FIG. 1, in that the apparatus 8 of FIG. 25 additionally includes a working fluid temperature sensor 477 for detecting a temperature, $T_{OIL}$, of a working fluid (e.g., oil) used in the hydraulic control circuit 84. The working fluid temperature sensor 477 supplies an electric signal indicative of the detected working fluid temperature $T_{OIL}$ to the electronic transmission control device 78. Furthermore, in the eighth embodiment, a disorder indicator lamp 486 is connected to the control device 78. The control device 78 operates the automatic transmission 14 according to the same table as that used for the second embodiment shown in FIG. 10.

Figure 26:
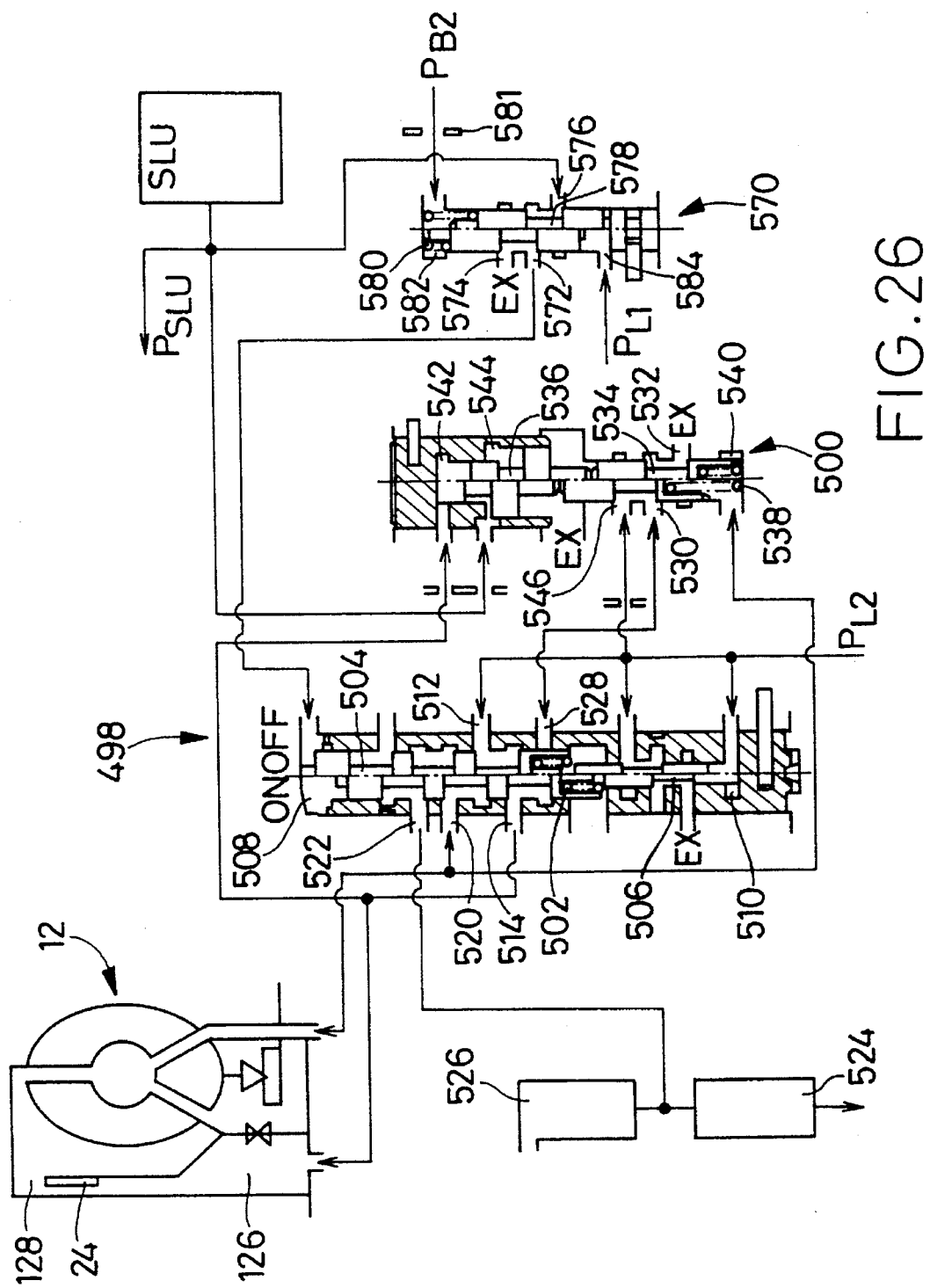
FIG. 26 is a view corresponding to FIG. 4, showing a pertinent part of a hydraulic control circuit of the hydraulic control apparatus as the eighth embodiment.
Figure 27:
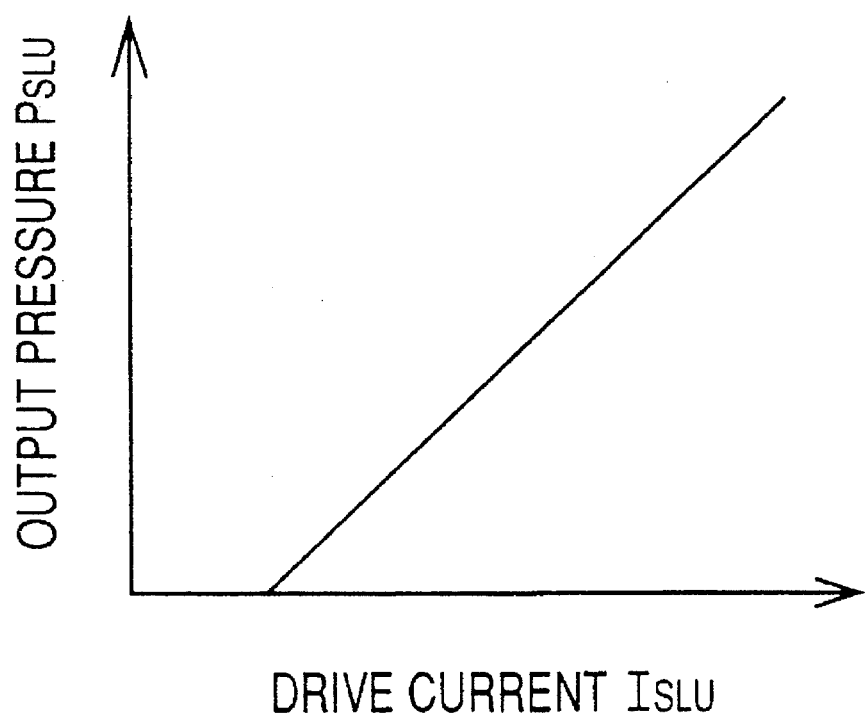
FIG. 27 is a graph showing the characteristic of the output pressure $P_{SLU}$ of a linear solenoid valve, SLU, employed in the hydraulic control circuit of FIG. 26.

FIG. 26 shows a part of the hydraulic control circuit 84 of the hydraulic control apparatus 8 in accordance with the eighth embodiment. In FIG. 26, the linear solenoid valve SLU receives the modulator pressure $P_M$ (FIG. 4), and produces the output pressure $P_{SLU}$ corresponding to the control signal supplied from the transmission control device 78. FIG. 27 shows a characteristic curve representing the relationship between the drive current, $I_{SLU}$, supplied to the valve SLU, and the output pressure $P_{SLU}$ of the valve SLU. The output pressure $P_{SLU}$ is supplied to a lock-up relay valve 498 and a lock-up control valve 500. Since the two valves 498 and 500 have the same constructions as those of the lock-up relay valve 198 and lock-up control valve 200 of the hydraulic control circuit 84 for the third embodiment shown in FIG. 14, the description of those elements are omitted. Additionally, since a cooler by-pass valve 524 and an oil cooler 526 are the same as the valve 224 and cooler 226 shown in FIG. 11, the description of those elements are also omitted. The respective parts or elements of the hydraulic control circuit 84 for the eighth embodiment are designated by numerals greater by 400 than the corresponding parts or elements of the hydraulic control circuit 84 for the third embodiment.

In the eighth embodiment, the hydraulic control circuit 84 additionally includes a solenoid-operated relay valve 570 provided between the linear solenoid valve SLU and the fluid chamber 508 of the lock-up relay valve 498. The selector valve 570 has an output port 572 connected to the fluid chamber 508 of the lock-up relay valve 498; a drain port 574; an input port 576 receiving the output pressure $P_{SLU}$ of the linear solenoid valve SLU; a spool 578 which is selectively movable between a RELEASE position where the spool 578 causes the output port 572 to communicate with the drain port 574, and an ENGAGE position where the spool 578 causes the output port 572 to communicate with the input port 576; a spring 580 for biasing the spool 578 toward the ENGAGE position; a fluid chamber 582 in which the spring 580 is accommodated and which receives the engaging pressure, $P_{B2}$, of the brake B2, via an orifice 581, for biasing the spool 578 toward the ENGAGE position (the engaging pressure $P_{B2}$ is produced when the automatic transmission 14 is being operated in one of the 3rd, 4th, and 5th positions); and a fluid chamber 584 which receives the first line pressure $P_{L1}$ for biasing the spool 578 toward the RELEASE position. Therefore, only when the automatic transmission 14 is operated in one of the 3rd, 4th, or 5th position, the output pressure $P_{SLU}$ is supplied to the fluid chamber 508 of the lock-up relay valve 498, so that the valve 498 is placed in the ENGAGE ("ON") position based on the pressure $P_{SLU}$. Since the second line pressure $P_{L2}$ is regulated or formulated by lowering the first line pressure $P_{L1}$, the first line pressure $P_{L1}$ is higher than the second line pressure $P_{L2}$.

Figure 28:
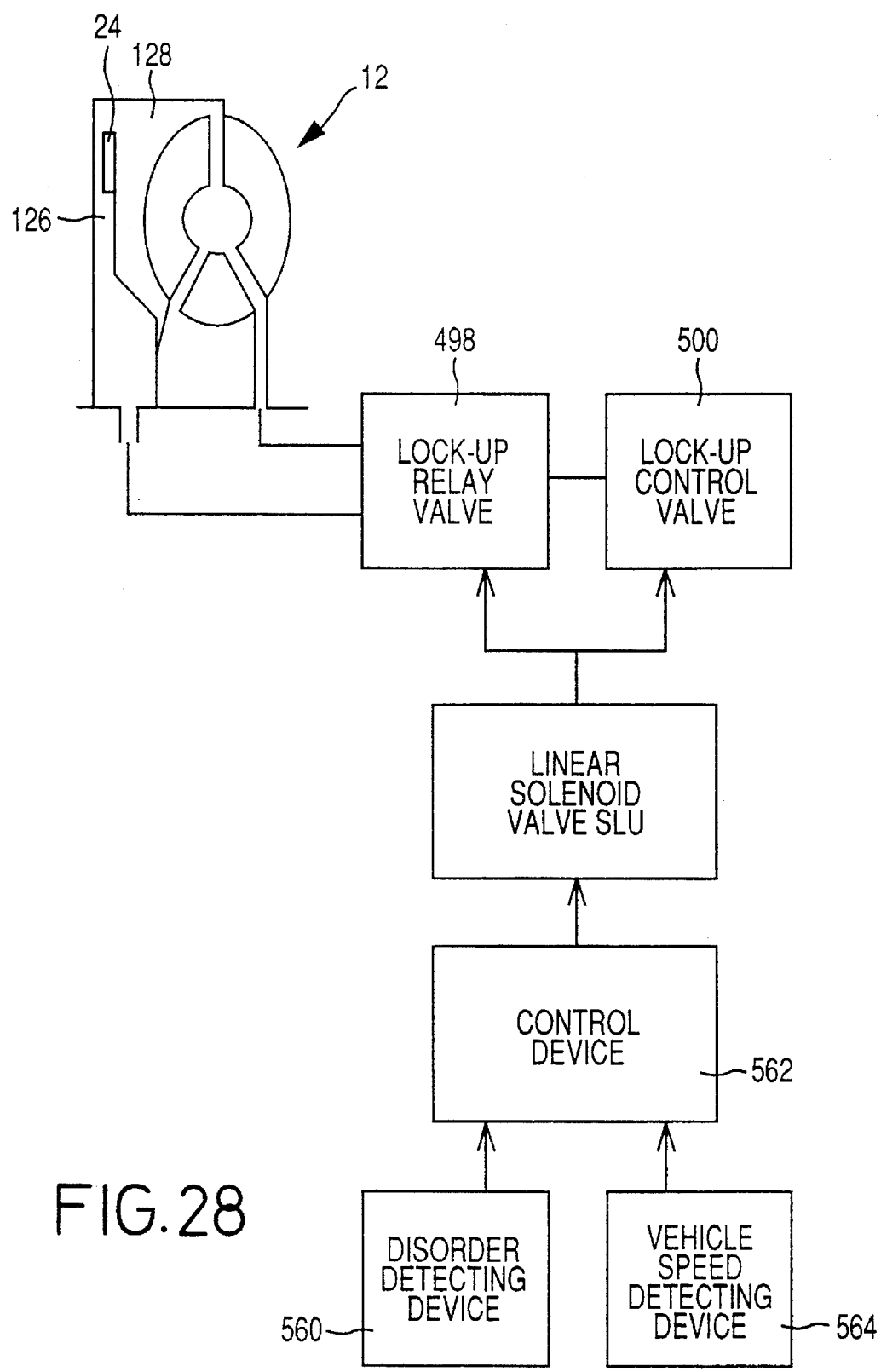
FIG. 28 is a diagrammatic view corresponding to FIG. 5, showing important elements of the hydraulic control apparatus as the third embodiment.

FIG. 28 shows a diagrammatic view of important elements of the hydraulic control apparatus 8 in accordance with the eighth embodiment. The control apparatus 8 includes a disorder detecting device 560 which detects a disorder of the lock-up relay valve 498, i.e., sticking of the valve 498 to the ENGAGE ("ON") position (i.e., left-half first spool 504 seen in FIG. 26); and a control device 562 (i.e., transmission control device 78) which operates the linear solenoid valve SLU such that when the vehicle running speed V detected by the vehicle speed sensor 66 serving as a vehicle speed detecting device 564 is higher than a reference value, $\beta$, the lock-up control valve 500 lowers the hydraulic pressure, $P_{L/OFF}$, in the RELEASE fluid chamber 126 of the torque converter 12 and, on the other hand, when the vehicle speed V is not higher than the reference value $\beta$, the lock-up control valve 500 raises the hydraulic pressure $P_{L/OFF}$ in the RELEASE fluid chamber 126.

There will be described the operation of the transmission control device 78 of the hydraulic control apparatus 8 in accordance with the eighth embodiment, by reference to the flow chart of FIG. 29. At Step SS501, the CPU of the control device 78 reads in input signals supplied from the sensors such as 58, 66, 74, and 477. Step SS501 is followed by Step SS502 to judge whether the shift lever 72 is currently shifted to one of the "D" (drive) range and the "R" (reverse) range, based on the detection signal $P_{sh}$ from the shift position sensor 74. A negative judgment made at Step SS502 indicates that the clutch C1 is not being placed in the engaged state, i.e., that an engine stall is not imminent. Therefore, the current control cycle is ended. On the other hand, if a positive judgment is made at Step SS502, the control of the CPU goes to Step SS503 to judge whether a flag, F, is currently set at one (i.e., F=1), which indicates that the control device 78 has detected a disorder of the lock-up relay valve 498, i.e., sticking of the valve 498 to the ENGAGE ("ON") position. The disorder of the valve 498 results from, e.g., the fixing of the first spool 504 to the ENGAGE position on the left-hand side as seen in FIG. 26 because of dust contained in the working fluid.

Figure 29:
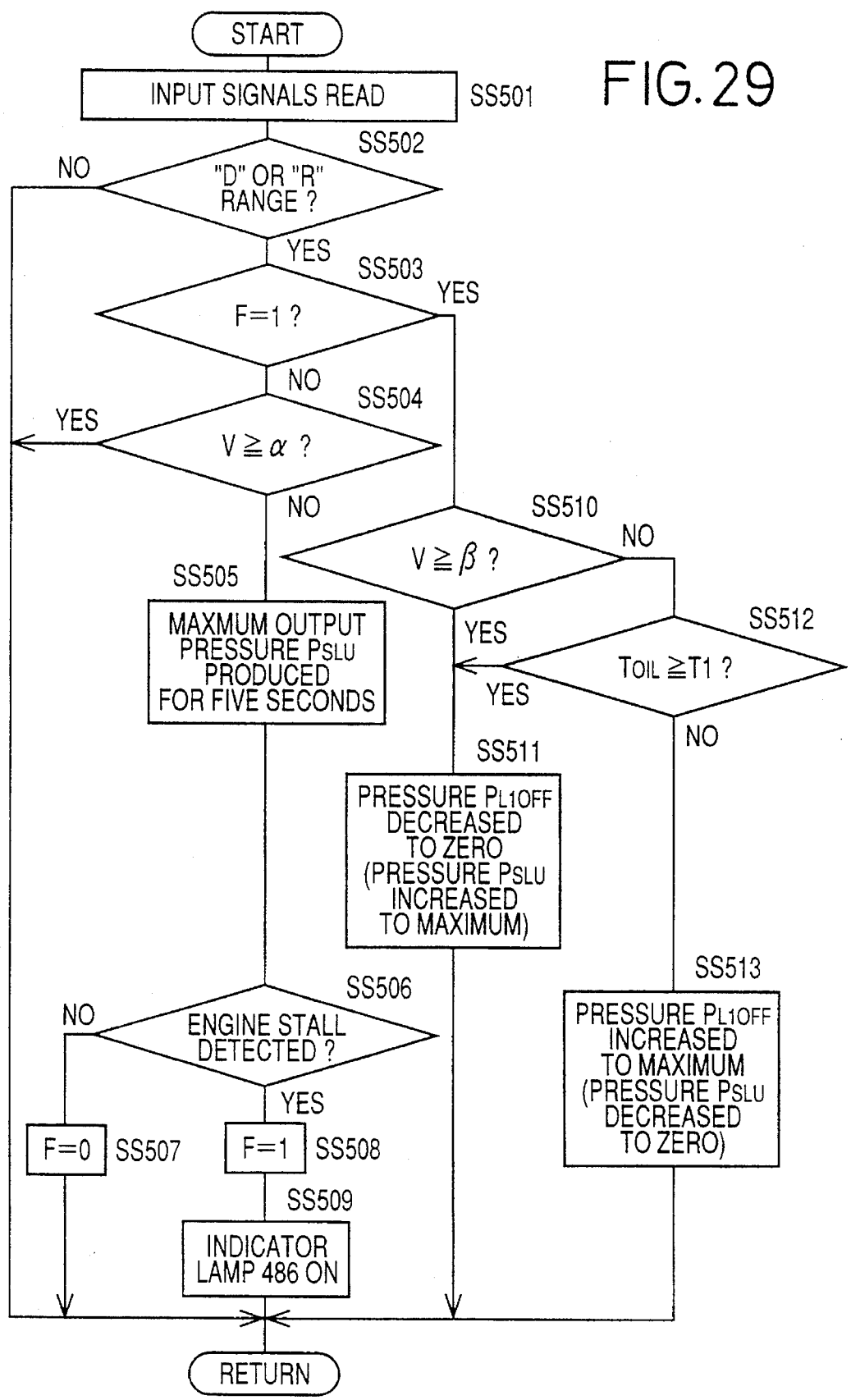
FIG. 29 is a flow chart representing a control routine carried out by a transmission control device of the hydraulic control apparatus as the eighth embodiment.

Since the flag F is reset to zero (i.e., F=0) by the initialization of the control device 78, a negative judgment is made at Step SS503 immediately after beginning of the hydraulic control operation according to the routine of FIG. 29. In this case, the control of the CPU goes to Steps SS504 through SS506 corresponding to a part of the disorder detecting device 560. Specifically, at Step SS504, the CPU judges whether the vehicle running speed V is not lower than a reference value, $\alpha$, based on the detection signal V supplied from the vehicle speed sensor 66. The reference value $\alpha$ is pre-determined at, e.g., several kilometers per hour which indicates that the motor vehicle is in an almost stopped condition in which the vehicle suffers from no problem even if an engine stall would occur.

If a positive judgment is made at Step SS504, an engine stall should not occur. Therefore, the current control cycle is ended. On the other hand, if a negative judgment is made at Step SS504, the control of the CPU goes to Step SS505 to supply a maximum drive current $I_{SLU}$ to the linear solenoid valve SLU so that the valve SLU produces the maximum output pressure $P_{SLU}$ for a predetermined period of time, e.g., five seconds. Step SS505 is followed by Step SS506 to judge whether an engine stall has occurred, by identifying that the engine rotation speed $N_E$ has become smaller than a reference value, e.g., several hundred rotations per minute. When the maximum output pressure $P_{SLU}$ is supplied from the linear solenoid valve SLU to the lock-up control valve 500, the spool 534 is moved to the CONTROL-PERMIT position on the right-hand side as seen in FIG. 26, so that the control port 530 communicates with atmospheric pressure. In this case, the solenoid-operated relay valve 570 is switched to the RELEASE position on the left-hand side as seen in FIG. 26. If the lock-up relay valve 498 is normally operable, the first spool 504 is moved to the RELEASE ("OFF") position on the right-hand side in FIG. 26, so that the lock-up clutch 24 is placed in the full-released state. However, if the first spool 504 is stuck because of, e.g., dust to the ENGAGE ("ON") position, the RELEASE fluid chamber 126 of the torque converter 12 is held in communication with atmospheric pressure, so that an engine stall may occur. The CPU makes a positive judgment if the occurrence of an engine stall is identified within a predetermined period of time, $T_A$, following the commencement of production of the maximum output pressure $P_{SLU}$ at Step SS505, as shown in FIG. 30.

If a negative judgment is made at Step SS506, the control of the CPU proceeds with Step SS507 to reset the flag F to zero, i.e., F=0. On the other hand, if a positive judgment is made at Step SS506, it means that the lock-up relay valve 498 is suffering from a disorder such as a so-called "valve sticking" that the first spool 504 is fixed to the ENGAGE position. In this case, the control goes to Step SS508 to set the flag F to one, i.e., F=1, and subsequently to Step SS509 to light the disorder indicator lamp 486. Then, the current control cycle is ended. If, with the lock-up relay valve 498 suffering from this disorder, the output pressure $P_{SLU}$ is decreased to the minimum pressure level, the hydraulic pressure $P_{L/OFF}$ of the RELEASE fluid chamber 126 becomes equal to the second line pressure $P_{L2}$, i.e., equal to the hydraulic pressure $P_{L/ON}$ of the ENGAGE fluid chamber 128, so that the lock-up clutch 24 is placed in the partial-engaged state, i.e., slipping state.

At Step SS503 in the following control cycle, a positive judgment is made, and the control of the CPU goes to Steps SS510 through SS513 corresponding to a part of the control device 562 of FIG. 28. Specifically, at Step SS510, the CPU judges whether the vehicle running speed V is not lower than a reference value, $\beta$. The reference value $\beta$ is pre-determined at about 30 to 40 km/h which indicates the vehicle running speed at which the lock-up clutch 24 is allowed to be placed in the fully engaged state.

A positive judgment made at Step SS510 means that the motor vehicle is running at a considerably high speed. In this case, the control of the CPU goes to Step SS511 to operate the linear solenoid valve SLU to produce the maximum output pressure $P_{SLU}$, so that the RELEASE fluid chamber 126 communicates with atmospheric pressure. Thus, the current control cycle is ended. Therefore, the motor vehicle is driven with the lock-up clutch 24 being placed in the full-engaged state. In this condition, the drivability of the vehicle is not satisfactory. However, since the vehicle running speed is high, an engine stall is effectively prevented.

On the other hand, if a negative judgment is made at Step SS510, the control of the control device 78 goes to Step SS512 to judge whether the temperature $T_{OIL}$ of the working fluid of the hydraulic control circuit 84 is not lower than a reference value, $T_1$, based on the detection signal supplied from the sensor 477. The reference value $T_1$ corresponds to the upper-limit of a permissible temperature range within which the working fluid is suitably used. In the event that a positive judgment is made at Step SS512, the control goes to Step SS511, so that the lock-up clutch 24 is placed in the full-engaged state and simultaneously the working fluid is discharged from the hydraulic control circuit 84, which therefore is cooled. However, if a negative judgment is made at Step SS512, the control goes to Step SS513 to operate the linear solenoid valve SLU to produce the minimum output pressure $P_{SLU}$, so that the hydraulic pressure $P_{L/OFF}$ of the RELEASE fluid chamber 126 is increased up to a level equal to the second line pressure $P_{L2}$. Thus, the lock-up clutch 24 is placed in the slipping state. Therefore, the motor vehicle can be started, and the intolerability or breaking down of the vehicle is prevented.

If the lock-up relay valve 498 fails because of the sticking of the first spool 504 to the ENGAGE position, an engine stall may occur even in the case where the motor vehicle is being driven in the "D" range. In the eighth embodiment, however, when the engine 10 is started with the shift lever 74 being shifted to the "P" or "N" range, and subsequently the shift lever 72 is shifted to the "D" or "R" range, Steps SS504–SS506 are carried out to detect a disorder of the lock-up relay valve 498. While the vehicle is running in a low speed range, Step SS513 is implemented to place the lock-up clutch 24 in the slipping state, thereby enabling the vehicle to start. Meanwhile, when the vehicle is running in a high speed range, Step SS511 is effected to place the clutch 24 in the full-engaged state.

It emerges from the foregoing description that, in the eighth embodiment, Steps SS504–SS506 corresponding to a part of the disorder detecting device 560 are carried out to detect a disorder of the lock-up relay valve 498, i.e., sticking of the valve 498 to the ENGAGE position and, if the disorder is detected, Steps SS510–SS513 are carried out to operate the linear solenoid valve SLU to produce the output pressure $PS_{LU}$ such that the lock-up control valve 500 decreases the hydraulic pressure $P_{L/OFF}$ of the RELEASE fluid chamber 126 when the vehicle running speed V is not lower than the reference value β and such that the same 500 increases the hydraulic pressure $P_{L/OFF}$ when the vehicle speed V is lower than the reference value β.

Even if the lock-up relay valve 498 becomes out of order, i.e., is stuck to the ENGAGE position, the pressure $P_{L/OFF}$ of the RELEASE fluid chamber 126 is decreased and accordingly the lock-up clutch 24 is forcedly placed in the full-engaged state, when the vehicle running speed V is high. Thus, the reduction of durability of the lock-up clutch 24 due to the slipping of the clutch 24 is effectively prevented. Meanwhile, when the vehicle speed V is low, the pressure $P_{L/OFF}$ is increased and therefore the clutch 24 is not placed in the full-engaged state. Thus, the vehicle can be driven in an almost normal manner.

While at Steps SS504–SS506 of FIG. 29 the disorder of the lock-up relay valve 498 is detected by identifying the occurrence of an engine stall, it is possible to detect the disorder of the valve 498 by a different manner. For example, in the case where a position sensor is employed for detecting the current position of the first spool 504 of the lock-up relay valve 498, the transmission control device 78 may be adapted to detect a disorder of the valve 498 based on the position signal supplied from the position sensor and the drive current $I_{SLU}$ supplied to the linear solenoid valve SLU. Alternatively, the control device 78 may be adapted to detect a disorder of the valve 498 by comparing the engine and turbine rotation speeds $N_E$, $N_T$ when the pressure $P_{L/OFF}$ of the RELEASE fluid chamber 126 is reduced to zero with the shift lever 72 being shifted to the "N" or "P" range.

Furthermore, the control device 78 may be adapted to detect a disorder of the lock-up relay valve 498 by obtaining two or more successive positive judgments at Step SS506 following two or more successive implementations of Step SS505.

In the routine of FIG. 29, Steps SS504–SS506 may be carried out periodically, i.e., at pre-determined considerably long intervals of time.

In the hydraulic control circuit 84 for the eighth embodiment, the output pressure $P_{SLU}$ of the linear solenoid valve SLU may be supplied directly to the fluid chamber 508 of the lock-up relay valve 498, without being relayed by the solenoid-operated relay valve 570.

Although in the hydraulic control circuit 84 for the eighth embodiment the output pressure $P_{SLU}$ of the linear solenoid valve SLU is supplied to both the fluid chamber 508 of the lock-up relay valve 498 and the fluid chamber 544 of the lock-up control valve 500, different control pressures may be supplied to the valves 498 and 500, independently of each other. In this case, the disorder detecting device 560 can detect a failure of the solenoid of a solenoid-operated valve which supplies the control pressure to the fluid chamber 508 of the lock-up relay valve 498. In this case, the disorder detecting device 560 can detect not only a disorder of the valve 498 itself (e.g., sticking of the first spool 504) but also a disorder of the solenoid valve which produces the control pressure to control the switching of the valve 498.

In the hydraulic control circuit 84 for the eighth embodiment, the supply port 546 of the lock-up control 500 may be adapted to receive the first line pressure $P_{L1}$ in place of the second line pressure $P_{L2}$. In this case, at Step SS513 of FIG. 29, the first line pressure $P_{L1}$ higher than the second line pressure $P_{L2}$ is supplied to the RELEASE fluid chamber 126 of the torque converter 12, so that the lock-up clutch 24 is placed in the full-released state with high reliability. Consequently the durability of the lock-up clutch 24 is effectively improved.

It is to be understood that the present invention may be embodied with other changes, improvements, and modifications that may occur to those skilled in the art without departing from the spirit and scope of the invention defined in the appended claims.

What is claimed is:

1. A hydraulic control apparatus for an automatic transmission of a motor vehicle, the transmission including a lock-up clutch, the apparatus comprising:

a lock-up clutch switching valve device which is operable for selectively placing a lock-up clutch in a fully released, a partially engaged, and a fully engaged state thereof;

a hydraulic pressure producing device which produces a hydraulic pressure;

an abnormality detecting device which detects an abnormality of at least one of the lock-up clutch and said lock-up clutch switching valve device; and a control device which, when said abnormality detecting device detects said abnormality, operates said hydraulic pressure producing device for one of applying said hydraulic pressure, and inhibiting said hydraulic pressure from being applied, to at least one of the lock-up clutch and said lock-up clutch switching valve device for forcibly placing the lock-up clutch in one of said partially engaged and fully engaged states thereof.

2. A hydraulic control apparatus according to claim 1, wherein said abnormality detecting device comprises lock-up clutch error detecting means for detecting, as said abnormality, an operational error of the lock-up clutch.

3. A hydraulic control apparatus according to claim 1, wherein said lock-up clutch switching valve device comprises a lock-up relay valve which is switchable between a first position thereof where said lock-up relay valve permits the lock-up clutch to be placed in said fully released state thereof and a second position thereof where said lock-up relay valve permits the lock-up clutch to be placed in one of said fully engaged and partially engaged states thereof;

said abnormality detecting device comprising lock-up relay valve disorder detecting means for detecting, as said abnormality, a disorder of said lock-up relay valve by identifying that said lock-up relay valve is stuck to said second position thereof, said control device comprising first operating means for operating, when said lock-up relay valve disorder detecting means detects said disorder of said lock-up relay valve, said hydraulic pressure producing device for one of applying said hydraulic pressure, and inhibiting said hydraulic pressure from being applied, to the lock-up clutch for forcibly placing the lock-up clutch in said one of said partially engaged and fully engaged states thereof.

4. A hydraulic control apparatus according to claim 3, wherein said lock-up relay valve is operable between said first position where said lock-up relay valve permits said hydraulic pressure to be applied to a first fluid chamber of the lock-up clutch for placing the lock-up clutch in said fully released state thereof and said second position where said lock-up relay valve permits said hydraulic pressure to be applied to a second fluid chamber of the lock-up clutch for placing the lock-up clutch in said one of said fully engaged and partially engaged states thereof, said lock-up clutch switching valve device further comprising:

a lock-up control valve which is operable for regulating a hydraulic pressure of said first fluid chamber of the lock-up clutch and thereby controlling a degree of the engagement of the lock-up clutch; and a vehicle speed sensor which detects a running speed of the motor vehicle, when said lock-up relay valve disorder detecting means detects said disorder of said lock-up relay valve and simultaneously when the vehicle running speed detected by said vehicle speed sensor is higher than a reference value, said first operating means of said control device operating said lock-up control valve to decrease said hydraulic pressure of said first fluid chamber of the lock-up clutch for forcibly placing the lock-up clutch in said fully engaged state thereof.

5. A hydraulic control apparatus according to claim 4, wherein said lock-up relay valve disorder detecting means comprises means for operating said lock-up control valve to decrease said hydraulic pressure of said first fluid chamber of the lock-up clutch and, upon detection of an engine stall, identifying that said lock-up relay valve is stuck to said second position thereof.

6. A hydraulic control apparatus according to claim 4, wherein said control device further comprises first operating means for operating, when said lock-up relay valve disorder detecting means detects said disorder of said lock-up relay valve and simultaneously when the vehicle running speed detected by said vehicle speed sensor is not higher than said reference value, said lock-up control valve to increase said hydraulic pressure of said first fluid chamber of the lock-up clutch for forcibly placing the lock-up clutch in said partially engaged state thereof.

7. A hydraulic control apparatus for an automatic transmission of a motor vehicle, the transmission including a lock-up clutch having a first and a second fluid chamber, the apparatus comprising:

a lock-up relay valve which is switchable between a first position where said lock-up relay valve permits a working fluid to be supplied to said first fluid chamber of the lock-up clutch and permits the lock-up clutch to be placed in a fully released state thereof and a second position where said lock-up relay valve permits said working fluid to be supplied to said second fluid chamber of the lock-up clutch and permits the lock-up clutch to be placed in one of a fully engaged and a partially engaged state thereof;

a lock-up control valve which is operable for regulating a hydraulic pressure of said first fluid chamber of the lock-up clutch and thereby controlling a degree of the engagement of the lock-up clutch;

a lock-up relay valve disorder detecting device which detects a disorder of said lock-up relay valve by identifying that said lock-up relay valve is stuck to said second position thereof;

a vehicle speed sensor which detects a running speed of the motor vehicle; and a control device which, when said lock-up relay valve disorder detecting device detects said disorder of said lock-up relay valve and simultaneously when the vehicle running speed detected by said vehicle speed sensor is higher than a reference value, operates said lock-up control valve to decrease said hydraulic pressure of said first fluid chamber of the lock-up clutch for forcibly placing the lock-up clutch in said fully engaged state thereof.

8. A hydraulic control apparatus according to claim 7, wherein said lock-up relay valve disorder detecting means comprises means for operating said lock-up control valve to decrease said hydraulic pressure of said first fluid chamber of the lock-up clutch and, upon detection of an engine stall, identifying that said lock-up relay valve is stuck to said second position thereof.

9. A hydraulic control apparatus according to claim 7, wherein said control device further comprises means for operating, when said lock-up relay valve disorder detecting means detects said disorder of said lock-up relay valve and simultaneously when the vehicle running speed detected by said vehicle speed sensor is not higher than said reference value, said lock-up control valve to increase said hydraulic pressure of said first fluid chamber of the lock-up clutch for forcibly placing the lock-up clutch in said partially engaged state thereof.

* * * * *